United States Patent
Li et al.

(10) Patent No.: US 10,345,604 B2
(45) Date of Patent: Jul. 9, 2019

(54) OPTICAL FIBERS AND OPTICAL SYSTEMS COMPRISING THE SAME

(71) Applicant: Corning Incorporated, Corning, NY (US)

(72) Inventors: Ming-Jun Li, Horseheads, NY (US); Anping Liu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/874,363

(22) Filed: Jan. 18, 2018

(65) Prior Publication Data

US 2018/0210212 A1     Jul. 26, 2018

Related U.S. Application Data

(60) Provisional application No. 62/449,706, filed on Jan. 24, 2017.

(51) Int. Cl.
| | |
|---|---|
| G02B 6/14 | (2006.01) |
| G02B 27/09 | (2006.01) |
| G02B 6/036 | (2006.01) |

(52) U.S. Cl.
CPC ....... *G02B 27/0994* (2013.01); *G02B 6/0365* (2013.01); *G02B 6/03605* (2013.01);
(Continued)

(58) Field of Classification Search
None
See application file for complete search history.

(56) References Cited

U.S. PATENT DOCUMENTS

| | | | |
|---|---|---|---|
| 6,519,403 B1 | 2/2003 | Hirano et al. | |
| 6,987,783 B2 * | 1/2006 | Fajardo | H01S 3/063 |
| | | | 372/10 |

(Continued)

FOREIGN PATENT DOCUMENTS

| | | |
|---|---|---|
| EP | 0127408 A1 | 12/1984 |
| JP | 2012159749 A | 8/2012 |
| KR | 1020621 B1 | 3/2011 |

OTHER PUBLICATIONS

Deng et al; "All-Fier Bessel Beam Generator Based on M-Type Optical Fiber"; Proceeding of SPIE; 8924; (2013); 89240F-1-89240F-89240F-4.

(Continued)

*Primary Examiner* — Tina M Wong
(74) *Attorney, Agent, or Firm* — Smit Kapadia; Svetlana Z. Short

(57) ABSTRACT

An optical fiber for converting a Gaussian laser beam into a Bessel laser beam may include a first segment optically coupled to a second segment with a transition region, the first segment having a first outer diameter greater than a second outer diameter of the second segment. The first segment may include a first core portion with a first cladding portion extending around the first core portion. The first core portion may have an annular core region with a relative refractive index relative to the first cladding portion. The second segment may include a second core portion with a second cladding portion extending around the second core portion. The second core portion has a relative refractive index relative to the second cladding portion and the relative refractive index of the first annular core region may be substantially equal to the relative refractive index of the second core portion.

18 Claims, 9 Drawing Sheets

(52) U.S. Cl.
CPC ...... *G02B 6/03611* (2013.01); *G02B 27/0927* (2013.01); *G02B 6/03688* (2013.01); *G02B 6/14* (2013.01)

(56) References Cited

U.S. PATENT DOCUMENTS

| | | | |
|---|---|---|---|
| 7,526,165 B2* | 4/2009 | Nielsen | G02B 6/02004 359/341.1 |
| 7,535,634 B1 | 5/2009 | Savchenkov et al. | |
| 7,742,665 B2* | 6/2010 | Digonnet | G02B 6/02304 359/333 |
| 8,213,758 B2* | 7/2012 | Dong | C03B 37/01217 385/123 |
| 8,358,888 B2 | 1/2013 | Ramachandran | |
| 8,818,151 B1* | 8/2014 | Ward | G02B 6/264 264/1.28 |
| 2018/0029919 A1* | 2/2018 | Schnitzler | B23K 26/53 |
| 2018/0189991 A1* | 7/2018 | McKinney | G06T 11/60 |
| 2018/0210212 A1* | 7/2018 | Li | G02B 27/0994 |

OTHER PUBLICATIONS

Deng et al; "Annular Arrayed-Waveguide Fiber for Autofocusing Airy-Like Beams"; Optics Letters; vol. 41, No. 4; 2016; pp. 824-827.

International Search Report and Written Opinion of the International Searching Authority; PCT/US2018/014187 dated Jun. 19, 2018; 13 Pages; European Patent Office.

Borghi et al; "M2 Factor of Bessel-Gauss Beam"; Optics Letters; vol. 22, No. 5; (1997) pp. 262-264.

Duocastella et al; "Bessel and Annular Beams for Materials Processing"; Laser Photonics Rev. 6, No. 5 (2012) pp. 607-621.

Siegman "New Developments in Laser Resonators"; Proc. SPIE 1224, Optical Resonators; (1990); 14 Pages.

Yan et al; "Fiber Structure to Convert a Gaussian Beam to Higher-Order Optical Orbital Angular Momentum Modes"; Optics Letters; vol. 37, No. 16; (2012) pp. 3294-3296.

\* cited by examiner

OPTICAL FIBERS AND OPTICAL SYSTEMS COMPRISING THE SAME

This application claims the benefit of priority under 35 U.S.C. § 119 of U.S. Provisional Application Ser. No. 62/449,706 filed on Jan. 24, 2017, the content of which is relied upon and incorporated herein by reference in its entirety.

BACKGROUND

Field

The present specification generally relates to optical fibers and, more specifically, to optical fibers for converting a Gaussian laser beam into a Bessel laser beam and laser delivery systems comprising the same.

Technical Background

Bessel laser beams may be desirable for material processing applications since a "perfect" Bessel laser beam does not diffract (spread out) as it propagates along a beam axis. Accordingly, when a Bessel laser beam is focused, the depth of focus can be more than ten times greater than for a conventional Gaussian laser beam. For example, a Gaussian laser beam with a 1.06 micrometers (µm) wavelength can be focused to about a 1 µm diameter focal spot and has a depth of focus of about 1 µm. In contrast, a Bessel laser beam having the same wavelength (1.06 µm) can achieve the same focal spot diameter (1 µm) and have a depth of focus of more than 10 µm. Such an increase in the depth of focus is desirable for laser characterization techniques, laser processing techniques, etc.

Conventional laser systems generate a Gaussian laser beam, which unlike a Bessel laser beam, diffracts while propagating along a beam axis. A Bessel laser beam may be generated or converted from a Gaussian laser beam using free-space optics systems such as an annular aperture, an axicon prism, or a combination thereof. However, free-space optics systems are bulky and have low alignment tolerances and high cost.

Accordingly, a need exists for alternative apparatuses for converting a Gaussian laser beam into a Bessel laser beam.

SUMMARY

According to one embodiment, an optical fiber with a first segment is optically coupled to a second segment with a transition region. The first segment has a first outer diameter $D_0$ and the second segment has a second outer diameter $d_0$ that is less than the first outer diameter $D_0$. The first segment includes a first core portion with a radius $R_1$ from an axial centerline of the optical fiber. The first core portion has a first annular core region centered on the axial centerline of the optical fiber, an inner radius $R_0$ and a first radial thickness $T_{AC}=R_1-R_0$. A first cladding portion with an outer radius $R_4$, an inner radius $R_1$ and a radial thickness $T_{CL}=R_4-R_1$ extends around the first core portion. The first annular core region has a relative refractive index $\Delta_{AC}$ % relative to the first cladding portion. The second segment includes a second core portion with a radius $r_1$ from the axial centerline of the optical fiber. At least a portion of the second core portion is optically coupled to the first annular core region and the radius $R_1$ is greater than the radius $r_1$. A second cladding portion with an outer radius $r_4$, an inner radius $r_1$ and a radial thickness $t_{cl}=r_4-r_1$ extends around the second core portion. The radial thickness $t_{cl}$ of the second cladding portion is less than the radial thickness $T_{CL}$ of the first cladding portion. The second core portion has a relative refractive index $\Delta_c$ % relative to the second cladding portion, wherein $\Delta_{AC}$ % is substantially equal to $\Delta_c$ %.

In another embodiment, an optical fiber with a first segment optically coupled to a second segment with a transition region comprises the first segment having a first annular core region centered on the axial centerline of the optical fiber and disposed around a channel extending through at least a portion of the first segment. A first cladding portion extends around the first annular core region. The second segment includes a second core portion optically coupled to the first annular core region and a second cladding portion extending around the second core portion.

In another embodiment, an optical fiber with a first segment optically coupled to a second segment with a transition region comprises the first segment having a first cladding portion with a first outer cladding region and a first low-index trench disposed between a first core portion and the first outer cladding region. The second segment has a second cladding portion with a second outer cladding region and a second low-index trench disposed between the second core portion and the second outer cladding region. The first low-index trench is spaced apart from the first core portion by a first inner cladding portion and the second low-index trench is spaced apart from the second core portion by a second inner cladding portion.

In another embodiment, an optical fiber with a first segment optically coupled to a second segment with a transition region comprises the first segment having a first central core region disposed within a first annular core region. The first central core region is spaced apart from the first annular core region by a first low-index core region. The second segment has a second central core region disposed within a second annular core region and the second central core region is spaced apart from the second annular core region by a second low-index core region.

Additional features and advantages of the optical fibers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
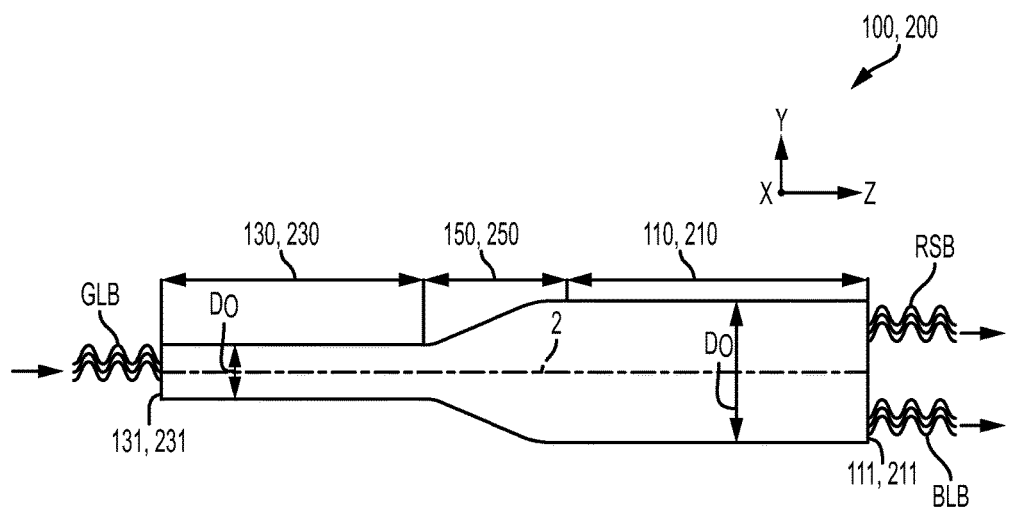
FIG. 1A schematically depicts a side view of an optical fiber according to one or more embodiments shown and described herein.

The optical fibers described herein may be utilized to convert a conventional Gaussian laser beam into a Bessel laser beam. A Bessel beam is one form of a non-diffracting beam or a weakly diffracting beam (also referred to herein quasi-non-diffracting beam), i.e., a beam having low beam divergence as mathematically defined below. A focused non-diffracting beam or a quasi-non-diffracting beam forms a laser focal line. The formation of the laser focal line is described in also a greater detail below.

Laser beam divergence refers to the rate of enlargement of the beam cross section in the direction of beam propagation (i.e., the Z direction). As used herein, the phrase "beam cross section" refers to the cross section of the laser beam along a plane perpendicular to the direction of propagation of the laser beam, for example, along the X-Y plane. One example of the beam cross section discussed herein is the beam spot of the focused laser beam formed by the optical fiber in conjunction with at least one focusing element (or focusing surface) on a surface situated in X-Y plane (i.e., a cross-section of the laser focal line).

Diffraction is one factor that leads to divergence of laser beams. Other factors include focusing or defocusing caused by the optical systems through which laser beams propagate, or refraction and scattering at interfaces. Laser beams provided by an optical fibers described herein and focused to form a laser focal line may have a small cross-section, low divergence, and weak diffraction. The divergence of a laser beam is characterized by the Rayleigh range $Z_R$, which is related to the variance $\sigma^2$ of the intensity distribution and beam propagation factor $M^2$ of the laser beam. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the laser beam having a time-averaged intensity profile I(x,y,z) are given by the following expressions:

$$\bar{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (1)$$

$$\bar{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the laser beam as a function of position z in the direction of beam propagation.

For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x,y,z) with Fourier transform $\tilde{I}(v_x, v_y)$ (where $v_x$ and $v_y$ are spatial frequencies in the X-direction and Y-direction, respectively), the near field and far field variances in the x-direction and y-direction are given by the following expressions:

$$\sigma_{0x}^2(z) = \frac{\int_{-\infty}^{\infty}\int_{-\infty}^{\infty} x^2 I(x, y, z) dx dy}{\int_{-\infty}^{\infty}\int_{-\infty}^{\infty} I(x, y, z) dx dy} \quad (3)$$

$$\sigma_{0y}^2(z) = \frac{\int_{-\infty}^{\infty}\int_{-\infty}^{\infty} y^2 I(x, y, z) dx dy}{\int_{-\infty}^{\infty}\int_{-\infty}^{\infty} I(x, y, z) dx dy} \quad (4)$$

$$\sigma_{\infty x}^2 = \frac{\int_{-\infty}^{\infty}\int_{-\infty}^{\infty} v_x^2 \tilde{I}(v_x, v_y) dv_x dv_y}{\int_{-\infty}^{\infty}\int_{-\infty}^{\infty} \tilde{I}(v_x, v_y) dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y) dv_x dv_y}{\int_{-\infty}^{\infty}\int_{-\infty}^{\infty} \tilde{I}(v_x, v_y) dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x,y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x,y,z)$ for an arbitrary optical beam (where $I(x,y,z) \equiv |\tilde{u}(x,y,z)|^2$) and the spatial-frequency distribution $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(z) = \sigma_{0x}^2(z_{0x}) + \lambda^2 \sigma_{\infty x}^2 (z-z_{0x})^2 \quad (7)$$

$$\sigma_y^2(z) = \sigma_{0y}^2(z_{0y}) + \lambda^2 \sigma_{\infty y}^2 (z-z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the beam. Equations (7) and (8) indicate that $\sigma_x^2(z)$ and $\sigma_y^2(z)$ increase quadratically with z in either direction from the minimum values associated with the waist position of the beam. In Gaussian beam that is rotationally symmetric around the beam propagation axis Z, $\sigma_{0x}(z)=\sigma_{0y}(z)$, and the waist position $\sigma_{0x}=\sigma_{0y}$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi \sigma_{0x} \sigma_{\infty x} \quad (9)$$

$$M_y^2 = 4\pi \sigma_{0y} \sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z-z_{0x})^2 \quad (11)$$

$$\sigma_y^2(z) = \sigma_{0y}^2(z_{0y}) + \frac{\lambda^2 M_y^4}{(4\pi\sigma_{0y})^2}(z-z_{0y})^2 \quad (12)$$

which can be rewritten as:

$$\sigma_x^2(z) = \sigma_{0x}^2(z_{0x})\left[1 + \frac{(z-z_{0x})^2}{Z_{Rx}^2}\right] \quad (13)$$

$$\sigma_y^2(z) = \sigma_{0y}^2(z_{0y})\left[1 + \frac{(z-z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2 \lambda} \quad (15)$$

$$Z_{Ry} = \frac{4\pi\sigma_{0y}^2}{M_y^2 \lambda} \quad (16)$$

If the laser beam is rotationally symmetric around the beam propagation axis the Rayleigh range $Z_{Rx}=Z_{Ry}$.

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the direction of propagation than laser beams with small Rayleigh ranges.

The formulas above can be applied to any laser beam (not just Gaussian beams) by using the intensity profile I(x,y,z) that describes the laser beam. In the case of the $TEM_{00}$ mode of a Gaussian beam, the intensity profile is given by:

$$I(x, y) = \frac{\sqrt{\pi}}{2} w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a TEM$_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2 \lambda} = \frac{\pi w_0^2}{\lambda} \quad (22)$$

$$Z_{Ry} = \frac{4\pi\sigma_{0y}^2}{M_y^2 \lambda} = \frac{\pi w_0^2}{\lambda} \quad (23)$$

$$w^2(z) = w_0^2 + \frac{\lambda^2}{(\pi w_0)^2}(z-z_0)^2 = w_0^2 \left[1 + \frac{(z-z_0)^2}{Z_R^2}\right] \quad (24)$$

As stated above, if the laser beam is rotationally symmetric around the beam propagation axis the Rayleigh range $Z_R = Z_{Rx} = Z_{Ry}$. Also, it is further noted that for rotationally symmetric Gaussian beams, $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For an axisymmetric Gaussian beam, Equation (17) shows that spot size is equal to $w_o$, which from Equation (18) corresponds to $2\sigma_{0x}$ or $2\sigma_{0y}$. In such axisymmetric beam cross sections $\sigma_{0x} = \sigma_{0y}$.

Spot size can be similarly defined for non-axisymmetric beam cross sections where, unlike an axisymmetric beam, $\sigma_{0x} \neq \sigma_{0y}$. As a result, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \quad (25)$$

$$w_{oy} = 2\sigma_{0y} \quad (26)$$

The lack of axial (i.e. arbitrary rotation angle) symmetry for a non-axisymmetric beam means that the results of a calculation of values of $\sigma_{0x}$ and $\sigma_{0y}$ will depend on the choice of orientation of the x-axis and y-axis. For example, in some embodiments, the x-axis may be the long axis 116 of the non-axisymmetric beam spot 114 and the y-axis may be the short axis 115. In other embodiments, the x-axis may be the short axis 115 and the y-axis may be the long axis 116. ISO 11146-1:2005(E) refers to these reference axes as the principal axes of the power density distribution (Section 3.3-3.5) and in the following discussion we will assume that the x and y axes are aligned with these principal axes. Further, an angle $\phi$ about which the x-axis and y-axis may be rotated in the cross-sectional plane (e.g., an angle of the x-axis and y-axis relative to reference positions for the x-axis and y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0

As noted above, laser beam divergence can be characterized by the Rayleigh range. Low divergence correlates with large values of the Rayleigh range and weak diffraction of the laser beam.

For symmetric beams, Rayleigh range is the same in the X-direction and Y-direction and is expressed, for a beam with a Gaussian intensity distribution, by Equation (22) or Equation (23). For axisymmetric beams, the Rayleigh ranges $Z_{Rx}$ and $Z_{Ry}$ are equal. For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. For non-axisymmetric beams the values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of of $Z_{Ry}$ being denoted $Z_{Ry,min}$. The formulas that characterize the Rayleigh ranges of Gaussian beam (Equation (22) or Equation (23)), for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \quad (29)$$

$$Z_{Ry,min} = \frac{4\pi\sigma_{0,min}^2}{M_y^2 \lambda} \quad (30)$$

For an axially symmetric Gaussian beams $Z_{R,\,min} = Z_{Rx,\,min} = Z_{Ry,\,min}$.

Since divergence of the laser beam occurs over a shorter distance in the direction having the smallest Rayleigh range, the intensity distribution of the laser is preferably controlled so that the $Z_{R,\,min}$ is as large as possible.

In different embodiments described herein, $Z_{R,min}$ is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for $Z_{R,min}$ specified herein are achievable for different laser wavelengths through adjustment of the spot size parameter $w_{o,min}$ defined in Equation (27). For example, in different embodiments described herein, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

The Rayleigh range of the laser beam formed by employing the embodiments of the optical fibers described herein may be greater than the Rayleigh range of a Gaussian beam having the same wavelength. Accordingly, the ratio of $Z_{R,min}$ to the Rayleigh range $Z_R$ of a Gaussian beam (as specified in either of Equations (22) or (23)), at a common wavelength λ, may be greater than or equal to 2, greater than or equal to 5, greater than or equal to 10, greater than or equal to 25, greater than or equal to 50, greater than or equal to 100, greater than or equal to 250, greater than or equal to 500, greater than or equal to 1000, in the range from 2 to 1500, in the range from 5 to 1250, in the range from 10 to 1000, in the range from 25 to 1000, in the range from 100 to 1000, or the like.

Non-diffracting or quasi non-diffracting laser beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to 1/e² of the maximum intensity. A criterion for Rayleigh range based on the effective spot size $w_{o,eff}$ can be specified non-diffracting or quasi non-diffracting beams (e.g., Bessel beams) for forming damage regions, as follows:

$$Z_{R,min} > F_D \frac{\pi w_{0,eff}^2}{\lambda} \qquad (31)$$

Where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. In some embodiments $F_D$ may be greater 1000, or even greater than 2000 (i.e., the laser beam is essentially non-diffracting). By comparing Equation (31) to Equation (22) or (23), one can see that for a non-diffracting or quasi non-diffracting beam the distance, $Z_{R,min}$ in Equation (31), over which the effective beam size (i.e., the effective spot size) doubles, is $F_D$ times the distance expected if a typical Gaussian beam profile were used.

The dimensionless divergence factor $F_D$ provides a criterion for determining whether or not a laser beam is quasi-non-diffracting. As used herein, a laser beam is considered quasi-non-diffracting if the characteristics of the laser beam satisfy Equation (31) with a value of $F_D \geq 10$. As the value of $F_D$ increases, the laser beam approaches a more nearly perfectly non-diffracting state.

Beams with Gaussian intensity profiles when focused to small enough spot sizes (such as spot sizes in the range of microns, such as about 1-5 microns or about 1-10 microns are highly diffracting and diverge significantly over short propagation distances. To achieve low divergence, it is desirable to control or optimize the intensity distribution of the laser beam to reduce diffraction. Laser beams may be non-diffracting or quasi non-diffracting such as, for example Bessel beams.

The following terminology will be used in conjunction with the optical fibers described herein.

The term "refractive index profile" or "relative refractive index profile," as used herein, is the relationship between the refractive index or the relative refractive index and the radius R (or r) of the fiber.

The term "relative refractive index," as used herein, is defined as:

$$\Delta(r) \% = 100 \times \frac{(n(r)^2 - n_{REF}^2)}{2n(r)^2},$$

where is n(r) is the refractive index at radius r (or R) of the optical fiber, unless otherwise specified, and r=0 corresponds to the axial centerline of the fiber. The relative refractive index is defined at 1550 nm unless otherwise specified. In the embodiments described herein, the reference index $n_{REF}$ is the refractive index of the outer cladding. As used herein, the relative refractive index is represented by Δ and its values are given in units of "%," unless otherwise specified. In cases where the refractive index of a region is less than the reference index $n_{REF}$, the relative index percent is negative and is referred to as having a depressed region, a depressed-index, or a low-index. In cases where the refractive index of a region is greater than the reference index $n_{REF}$, the relative index percent is positive and the region can be said to be raised or to have a positive index.

Unless otherwise specified, the characters 'R', 'T', and 'V' are used in reference to the radius, radial thickness and volume (described below), respectively, for the first segment of the optical fiber and the characters 'r', 't' and 'v' are used in reference to the radius, radial thickness and volume, respectively, for the second segment of the optical fiber. The subscript 'CH' refers to the 'channel' in the first segment of the optical fiber. The subscripts 'AC' and 'ac' refer to the 'annular core region' in the first segment and the second segment, respectively, of the optical fiber. The subscripts 'C' and 'c' refer to the 'core portion' in the first segment and the second segment, respectively, of the optical fiber. The subscripts 'CL' and 'cl' refer to the 'cladding potion' in the first segment and the second segment, respectively, of the optical fiber. The subscripts 'OCL' and 'ocl' refer to the 'outer cladding portion' in the first segment and the second segment, respectively, of the optical fiber. The subscripts 'ICL' and 'icl' refer to the 'inner cladding portion' in the first segment and the second segment, respectively, of the optical fiber. The subscripts 'LIT' and 'lit' refer to the 'low-index trench' in the first segment and the second segment, respectively, of the optical fiber. The subscripts 'LIC' and 'lic' refer to the 'low-index core region' in the first segment and the second segment, respectively, of the optical fiber. The subscripts 'CC' and 'cc' refer to the 'central core region' in the first segment and the second segment, respectively, of the optical fiber.

The term "trench," as used herein, refers to a region of the optical fiber that is, in radial cross section, surrounded by regions having relatively higher refractive indexes.

The term "up-dopant," as used herein, refers to a dopant which raises the refractive index of glass relative to pure, undoped silica glass ($SiO_2$). The term "down-dopant," as used herein, is a dopant which has a propensity to lower the refractive index of glass relative to pure, undoped $SiO_2$. An up-dopant may be present in a region of an optical fiber having a negative relative refractive index when accompanied by one or more other dopants which are not up-dopants (e.g., down-dopants). Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants (e.g., up-dopants). Likewise, one or more other dopants which are not down-dopants may be present in a region of an optical fiber having a negative relative refractive index.

The term "Gaussian laser beam," as used herein, refers to a beam of monochromatic electromagnetic radiation that has a Gaussian intensity profile (Gaussian profile) and whose transverse magnetic and electric field amplitude profiles are given by a Gaussian function. The Gaussian laser beam may be axisymmetric or non-axisymmetric, i.e., the Gaussian laser beam may have an axisymmetric beam cross section or a non-axisymmetric beam cross section that forms a non-axisymmetric beam spot with a long axis and a short axis. The term "Bessel laser beam," as used herein, refers to a beam of monochromatic electromagnetic radiation with an amplitude (Bessel profile) described by a Bessel function of the first kind. The Bessel laser beam may be axisymmetric or non-axisymmetric, i.e., the Bessel laser beam may have an axisymmetric beam cross section or a non-axisymmetric beam cross section that forms a non-axisymmetric beam spot with a long axis and a short axis. The term hybrid Gauss-Bessel laser beam (or "hybrid" Gauss-Bessel laser beam") as used herein, refers to a beam of electromagnetic radiation that has a combination of a Gaussian profile and a Bessel profile.

The term ""diffraction-free" beam", as used herein, refers to non-diffracting and quasi non-diffracting beams, such as, for example Bessel beams.

The terms "micrometers", "microns" and "m" are used interchangeably herein.

Reference will now be made in detail to embodiments of optical fibers and laser delivery systems comprising the same, examples of which are illustrated in the accompanying drawings. FIG. 1A schematically depicts a side view of one embodiment of an optical fiber. The optical fibers described herein may be used to convert a conventional Gaussian laser beam into a Bessel laser beam. The optical fibers generally comprise a first segment coupled to a second segment with a transition region. The first segment has a larger diameter than the second segment. In embodiments, the first segment includes a first core portion with a first annular core region centered on an axial centerline of the optical fiber and a first cladding portion extending around the first core portion. The first annular core region has a greater relative refractive index relative to the first cladding portion. The second segment has a second core portion and a second cladding region extending around the second core portion. At least a portion of the second core portion is optically coupled to the first annular portion and has a greater relative refractive index relative to the second cladding portion. The second segment supports propagation of a Gaussian laser beam and the first segment supports propagation of a Bessel laser beam. A Gaussian laser beam propagating through the second segment is converted into a Bessel laser beam as it passes through the transition region and into the first segment. For example, a laser light source emitting an output beam with a Gaussian profile may be optically coupled to the second segment of the optical fiber and the Gaussian profile of the output beam is converted into a Bessel profile as the output beam propagates through the transition region and the first segment. The structure and composition of various embodiments of optical fibers that convert a Gaussian laser beam into a Bessel laser beam will be described in more detail herein with specific reference to the appended drawings.

Figure 2:
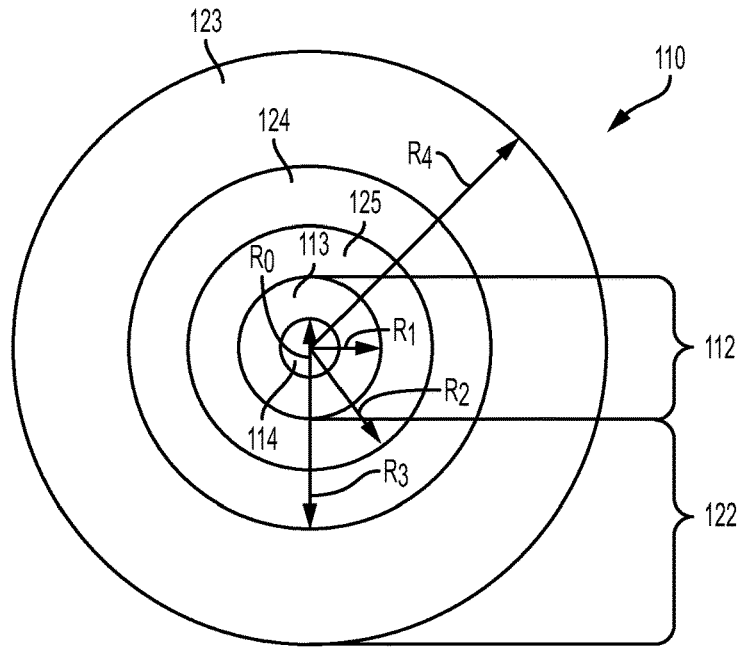
FIG. 2 schematically depicts a radial cross section of a first segment of the optical fiber of FIG. 1A according to one or more embodiments shown and described herein.
Figure 3:
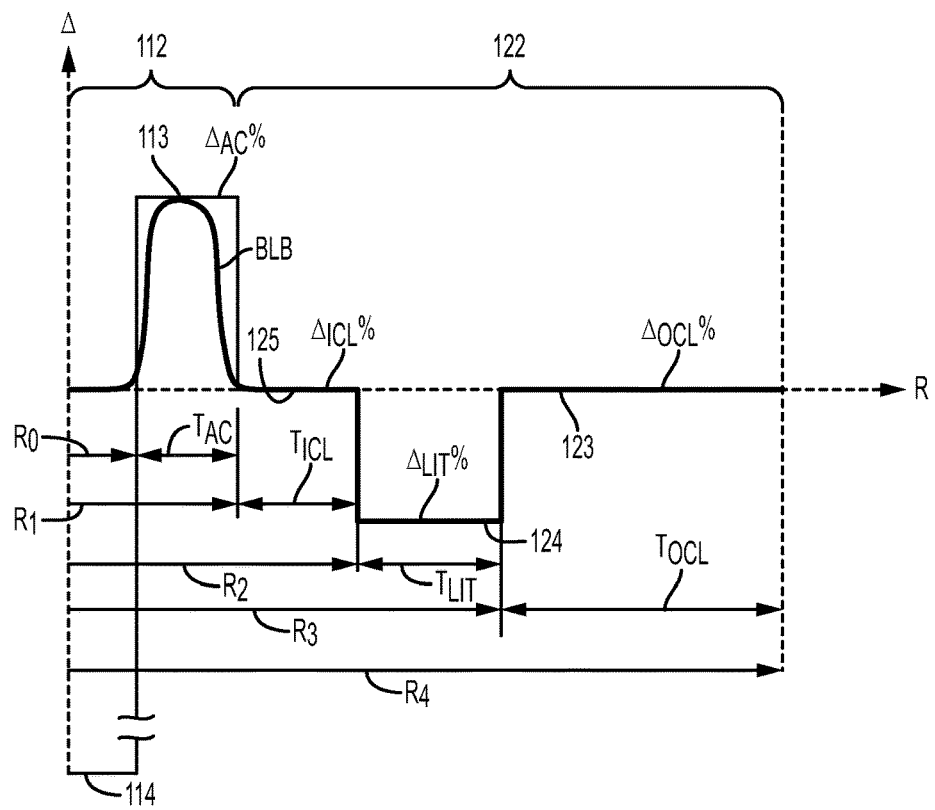
FIG. 3 graphically depicts the relative refractive index profile of the first segment of the optical fiber of FIG. 2 as a function of the radius R of the glass portion of the optical fiber according to one or more embodiments shown and described herein.
Figure 4:
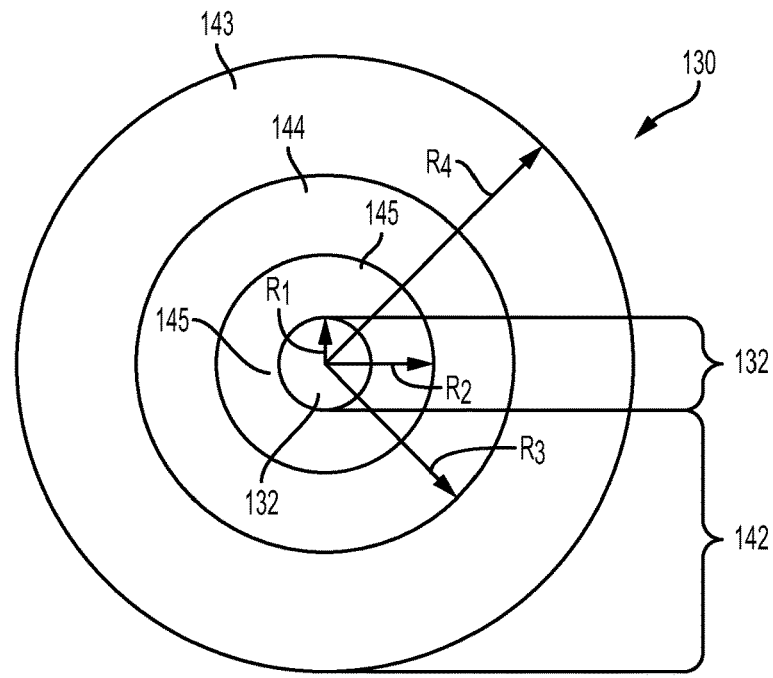
FIG. 4 schematically depicts a radial cross section of a second segment of the optical fiber of FIG. 1A according to one or more embodiments shown and described herein.
Figure 5:
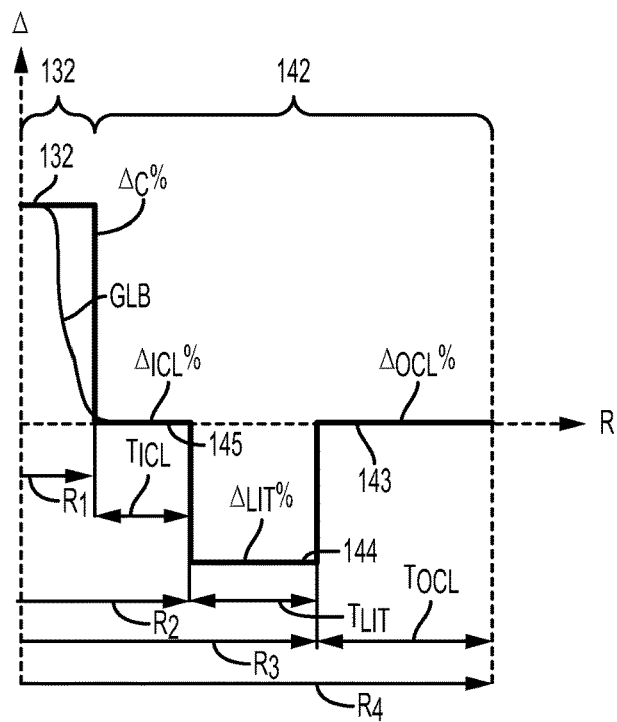
FIG. 5 graphically depicts the relative refractive index profile of the second segment of the optical fiber of FIG. 4 as a function of the radius r of the glass portion of the optical fiber according to one or more embodiments shown and described herein.

Referring to FIGS. 1A and 2-5, one embodiment of an optical fiber 100 with a first segment 110 optically coupled to a second segment 130 with a transition region 150 is shown. A side view of at least a portion of the optical fiber 100 is shown in FIG. 1A, radial cross sections of the first segment 110 and the second segment 130 of the optical fiber 100 are shown in FIGS. 2 and 4, respectively, and corresponding relative refractive index profiles for the first segment 110 and second segment 130 are shown in FIGS. 3 and 5, respectively. The first segment 110 has a first outer diameter '$D_0$' and the second segment 130 has a second outer diameter 'do' (FIG. 1A). The first outer diameter $D_0$ is greater than the second outer diameter do. In embodiments, the first outer diameter $D_0$ may be from about 0.2 millimeters (mm) to about 5.0 mm, the second outer diameter $d_0$ may be from about 0.1 to about 4.5 mm, and the length of the transition region 150 may be from about 0.5 mm to about 20 mm. In embodiments, the first outer diameter $D_0$ is from about 0.4 mm to about 1.0 mm, the second outer diameter $d_0$ is from about 0.2 mm to about 0.9 mm, and the length of the transition region 150 is from about 1 mm to about 10 mm. In other embodiments, the first outer diameter $D_0$ is from about 150 μm to about 250 μm, the second outer diameter $d_0$ is from about 75 μm to about 225 μm, and the length of the transition region 150 is greater than 10 mm. A Gaussian laser beam 'GLB' propagating through the second segment 130 is converted into a ring shaped beam RSB (or the near-field version of the Bessel beam) propagating through the first segment 110, which when focused forms a Bessel laser beam 'BLB'. That is, according to the embodiments described herein, the ring shaped beam is situated in what is optically as the "near field", and hence is a near-field version of a Bessel beam. The focusing lens(es) transform this ring shaped beam into the optical "far field", which creates the typical Bessel profile, or the Bessel laser beam 'BLB'. In embodiments, the first segment 110, second segment 130 and transition region 150 are integrally formed with one another and the taper ratio ($d_0/D_0$) of the optical fiber 100 is greater than or equal to about 0.2 and less than or equal to about 0.9. In other embodiments, the taper ratio of the optical fiber 100 is greater than or equal to about 0.3 and less than or equal to 0.9. In still other embodiments, the taper ratio of the optical fiber 100 is greater than or equal to 0.3 and less than or equal to 0.8 (for example, 0.3, 0.4, 0.5, 0.6, 0.7, 0.8, or therebetween). According to some embodiments, transition region 150 has a length is, for example, 1 mm to 10 mm, or 1-5 mm, (e.g., 1 mm, 2 mm, 3 mm, 4 mm, 5 mm, 6 mm, 7 mm, 8 mm, 9 mm, 10 mm or therebetween). If the taper is created during fiber draw the tapered region 150 can be longer, for example 10 mm-5 m in length). In some embodiments the tapered region 150 is has an adiabatic shape. The first segment 110 (FIGS. 2 and 3) of the optical fiber 100 has a first core portion 112 centered on an axial centerline 2 of the optical fiber 100. The first core portion 112 may include a first annular core region 113. A first cladding portion 122 may extend around the first core portion 112. The second segment 130 (FIGS. 4 and 5) of the optical fiber 100 may have a second core portion 132 and at least a portion of the second core portion 132 is optically coupled to the first core portion 112. A second cladding portion 142 may extend around the second core portion 132.

Referring to FIGS. 1A, 2 and 3, a radial cross section of the first segment 110 of the optical fiber 100 of FIG. 1A is schematically depicted in FIG. 2 and the relative refractive index profile of the radial cross section relative to the centerline of the cross section is graphically depicted in FIG. 3. The first segment 110 generally includes a first core portion 112 and a first cladding portion 122. The first core portion 112 is positioned within the first cladding portion 122 with the first cladding portion 122 extending around the first core portion 112. The first core portion 112 and the first cladding portion 122 may be generally concentric such that a cross section of the first segment 110 of the optical fiber 100 is generally circular symmetric with respect to the center of the first core portion 112 of the optical fiber 100. Also, the first core portion 112 and the first cladding portion 122 may be generally axisymmetric with respect to the center of the first core portion 112 of the optical fiber 100. In the embodiment depicted in FIGS. 1A, 2 and 3, the first core portion 112 may include a first annular core region 113 and a channel 114. The channel 114 is positioned within the first annular core region 113 and the channel 114 is directly adjacent to and in direct contact with the first annular core region 113.

In some embodiments, the first cladding portion 122 may optionally include a first low-index trench 124 and a first outer cladding portion 123. The first low-index trench 124 is positioned within the first outer cladding 123 and the first low-index trench 124 may be directly adjacent to and in direct contact with the first outer cladding 123. The first low-index trench 124, when included, improves the bend performance of the optical fiber 100. That is, the first low-index trench 124 reduces attenuation of light propagating in the optical fiber 100 when the optical fiber 100 is coiled, thereby permitting the optical fiber 100 to be coiled to a tighter (i.e., smaller) radius without increasing the attenuation of light propagating in the optical fiber 100 relative to an optical fiber having a similar structure without the first low-index trench 124.

In some embodiments (not depicted), the first low-index trench 124 may be directly adjacent to and in direct contact with the first core portion 112. In some other embodiments, such as the embodiment depicted in FIGS. 2 and 3, the first low-index trench 124 may be spaced apart from the first core portion 112 by a first inner cladding portion 125, i.e., the first inner cladding portion 125 is positioned within the first low-index trench 124 between the first low-index trench 124 and the first core portion 112. In embodiments, the first inner cladding portion 125 is directly adjacent to and in direct contact with the first low-index trench 124 and the first annular core region 113.

The first segment 110 has a radius $R_4$ from the axial centerline 2 of the optical fiber 100. The first core portion 112 has a radius $R_1$ that is less than the radius $R_4$. The channel 114 of the first core portion 112 has a radius $R_0$ that is less than the radius $R_1$. The first annular core region 113 has an inner radius $R_0$, an outer radius $R_1$ and a radial thickness $T_{AC}=R_1-R_0$. The radii $R_0$ and $R_1$ of the first core portion 112 and first annular core region 113, respectively, are defined at the points at which the lines tangent to the maximum slopes of the relative refractive index profile (FIG. 3) of the first core portion 112 and first annular core region 113, respectively, cross the reference relative refractive index line $\Delta_{OCL}$ % discussed in greater detail below. The first cladding portion 122 has an inner radius $R_1$, an outer radius $R_4$ and a radial thickness $T_{CL}=R_4-R_1$. In embodiments where the first cladding portion 122 includes the first low-index trench 124 and the first outer cladding portion 123, the first low-index trench 124 has an inner radius $R_2$, an outer radius $R_3$ and a radial thickness $T_{LIT}=R_3-R_2$. The first outer cladding portion 123 has an inner radius $R_3$, an outer radius $R_4$ and a radial thickness $T_{OCL}=R_4-R_3$. In embodiments (not depicted) where the first low-index trench 124 is directly adjacent to and in direct contact with the first core portion 112, the inner radius $R_2$ of the first low-index trench 124 may be equal to the radius $R_1$ of the first core portion 112. In embodiments where the first low-index trench 124 is spaced apart from the first core portion 112 by the first inner cladding portion 125, the first inner cladding portion 125 has an inner radius $R_1$, an outer radius $R_2$ and a radial thickness $T_{ICL}=R_2-R_1$.

The radius $R_4$ of the first segment 110 is from about 50 μm to about 250 μm. In some embodiments, the radius $R_4$ of the first segment 110 is from about 60 μm to about 150 μm. The radius $R_1$ of the first core portion 112 is from about 5 μm to about 55 μm. In some embodiments, the radius $R_1$ is from about 10 μm to about 50 μm. The radius $R_0$ of the channel 114 is from about 2 μm to about 40 μm. In some embodiments, the radius $R_0$ of the channel 114 is from about 5 μm to about 35 μm. The radial thickness $T_{AC}$ ($R_1-R_0$) of the first annular core region 113 is from about 1 μm to about 20 μm. In some embodiments the radial thickness $T_{AC}$ is from about 2 μm to about 15 μm. The radial thickness $T_{CL}$ ($R_4-R_1$) of the first cladding portion 122 is from about 20 μm to about 150 μm. In some embodiments the radial thickness $T_{CL}$ is from about 25 μm to about 125 μm. In embodiments where the first cladding portion 122 includes the first low-index trench 124 and the first outer cladding portion 123, the inner radius $R_2$ of the first low-index trench 124 is from about 10 μm to about 60 μm, the outer radius $R_3$ is from about 20 μm to about 75 μm and the radial thickness $T_{LIT}$ ($R_3-R_2$) is from about 1.0 μm to about 15 μm. In embodiments, the inner radius $R_2$ is from about 15 μm to about 55 μm, the outer radius $R_3$ is from about 25 μm to about 65 μm and the radial thickness $T_{LIT}$ is from about 1.0 μm to about 10 μm. The inner radius $R_3$ of the first outer cladding portion 123 is from about 20 μm to about 75 μm, the outer radius $R_4$ is from about 50 μm to about 250 μm and the radial thickness $T_{OCL}$ ($R_4-R_3$) is from about 25 μm to about 150 μm. In embodiments, the inner radius $R_3$ is from about 25 μm to about 55 μm, the outer radius $R_4$ is from about 60 μm to about 150 μm and the radial thickness $T_{OCL}$ is from about 30 μm to about 125 μm. In embodiments where the first low-index trench 124 is spaced apart from the first core portion 112 by the first inner cladding portion 125, the inner radius $R_1$ of the first inner cladding portion 125 is from about 5 μm to about 55 μm, the outer radius $R_2$ is from about 10 μm to about 60 μm and the radial thickness $T_{ICL}$ ($R_2-R_1$) is from about 1.0 μm to about 20 μm. In embodiments, the inner radius $R_1$ is from about 10 μm to about 50 μm, the outer radius $R_2$ is from about 15 μm to about 55 m and the radial thickness $T_{ICL}$ is from about 1.0 μm to about 15 μm.

Referring to FIGS. 1A, 4 and 5, a radial cross section of the second segment 130 of the optical fiber 100 of FIG. 1A is schematically depicted in FIG. 4 and the relative refractive index profile of the radial cross section relative to the centerline of the cross section is graphically depicted in FIG. 5. The second segment 130 generally includes a second core portion 132 and a second cladding portion 142. The second core portion 132 is positioned within the second cladding portion 142 with the second cladding portion 142 extending around the second core portion 132. The second core portion 132 and the second cladding portion 142 may be generally concentric such that a cross section of the second segment 130 of the optical fiber 100 is generally circular symmetric with respect to the center of the second core portion 132 of the optical fiber 100. The second core portion 132 and the second cladding portion 142 may be generally axisymmetric with respect to the center of the second core portion 132 of the optical fiber 100.

In some embodiments, the second cladding portion 142 may optionally include a second low-index trench 144 and a second outer cladding portion 143. The second low-index trench 144 is positioned within the second outer cladding 143 and the second low-index trench 144 may be directly adjacent to and in direct contact with the second outer cladding 143. The second low-index trench 144, when included, improves the bend performance of the optical fiber 100. That is, the second low-index trench 144 reduces attenuation of light propagating in the optical fiber 100 when the optical fiber 100 is coiled, thereby permitting the optical fiber 100 to be coiled to a tighter (i.e., smaller) radius without increasing the attenuation of light propagating in the optical fiber 100 relative to an optical fiber having a similar structure without the second low-index trench 144. It should be understood that, when the first segment 110 of the optical fiber 100 includes the first low-index trench 124, the second segment 130 of the optical fiber 100 will include a second low-index trench 144 and vice-versa.

In some embodiments (not depicted), the second low-index trench 144 may be directly adjacent to and in direct contact with the second core portion 132. In some other embodiments, the second low-index trench 144 may be spaced apart from the second core portion 132 by a second inner cladding portion 145 as depicted in FIGS. 4 and 5. That is, the second inner cladding portion 145 is positioned within the second low-index trench 144 and is positioned between the second low-index trench 144 and the second core portion 132. In embodiments, the second inner cladding portion 145 is directly adjacent to and in direct contact with the second low-index trench 144 and the second core portion 132.

The second segment 130 has a radius $r_4$ from the axial centerline 2 of the optical fiber 100. The second core portion 132 has a radius $r_1$ that is less than the radius $r_4$. The radius $r_1$ of the second core portion 132 is defined at the point at which the line tangent to the maximum slope of the relative refractive index profile (FIG. 5) of the second core portion 132 crosses the reference relative refractive index line $\Delta_{ocl}$ %. The second cladding portion 142 has an inner radius $r_1$, an outer radius $r_4$ and a radial thickness $t_{cl}=r_4-r_1$. In embodiments where the second cladding portion 142 includes the second low-index trench 144 and the second outer cladding portion 143, the second low-index trench 144 has an inner radius $r_2$, an outer radius $r_3$ and a radial thickness $t_{lit}=r_3-r_2$. The second outer cladding portion 143 has an inner radius $r_3$, an outer radius $r_4$ and a radial thickness $t_{ocl}=r_4-r_3$. In embodiments (not depicted) where the second low-index trench 144 is directly adjacent to and in direct contact with the second core portion 132, the inner radius $r_2$ of the second low-index trench 144 may be equal to the radius $r_1$ of the second core portion 132. In embodiments where the second low-index trench 144 is spaced apart from the second core portion 132 by the second inner cladding portion 145, the second inner cladding portion 145 has an inner radius $r_1$, an outer radius $r_2$ and a radial thickness $t_{icl}=r_2-r_1$.

The radius $r_4$ of the second segment 130 is from about 25 µm to about 80 µm. In some embodiments, the radius $r_4$ of the second segment 130 is from about 35 µm to about 70 µm. The radius $r_1$ of the second core portion 132 is from about 2 µm to about 35 µm. In some embodiments, the radius $r_1$ is from about 4 µm to about 30 µm. The radial thickness $t_{cl}$ ($r_4-r_1$) of the second cladding portion 142 is from about 20 µm to about 75 µm. In some embodiments the radial thickness $t_{cl}$ is from about 25 µm to about 65 µm. In embodiments where the second cladding portion 142 includes the second low-index trench 144 and the second outer cladding portion 143, the inner radius $r_2$ of the second low-index trench 133 is from about 4 µm to about 35 µm, the outer radius $r_3$ is from about 5 µm to about 40 µm and the radial thickness $t_{lit}$ ($r_3-r_2$) is from about 1.0 µm to about 15 µm. In embodiments, the inner radius $r_2$ is from about 5 µm to about 30 µm, the outer radius $r_3$ is from about 10 µm to about 35 µm and the radial thickness $t_{lit}$ is from about 1.0 µm to about 12.5 µm. The inner radius $r_3$ of the second outer cladding portion 143 is from about 5 µm to about 40 µm, the outer radius $r_4$ is from about 25 µm to about 80 µm and the radial thickness $t_{ocl}$ ($r_4-r_3$) is from about 15 µm to about 75 µm. In embodiments, the inner radius $r_3$ is from about 10 µm to about 35 µm, the outer radius $r_4$ is from about 35 µm to about 70 µm and the radial thickness $t_{ocl}$ is from about 20 µm to about 60 µm. In embodiments where the second low-index trench 144 is spaced apart from the second core portion 132 by the second inner cladding portion 145, the inner radius $r_1$ of the second inner cladding portion 145 is from about 2 µm to about 35 µm, the outer radius $r_2$ is from about 4 µm to about 35 µm and the radial thickness $t_{icl}$ ($r_2-r_1$) is from about 1.0 µm to about 20 µm. In embodiments, the inner radius $r_1$ is from about 4 µm to about 30 µm, the outer radius $r_2$ is from about 5 µm to about 30 µm and the radial thickness $t_{icl}$ is from about 1.0 µm to about 15 µm.

Referring to FIGS. 1A and 2-5, although the first segment 110 and the second segment 130 both have a core portion and a cladding portion, it should be appreciated that the first core portion 112 of the first segment 110 includes a first annular core region 113 with a channel 114 positioned within the first annular core region 113, whereas as the second core portion 132 does not include a channel or an annular core region. It should also be appreciated that the first core portion 112 is optically coupled with the second core portion 132 and the first cladding portion 122 is optically coupled to the second cladding portion 142 through the transition region 150. Particularly, the first annular core region 113 is optically coupled to the second core portion 132, the first outer cladding portion 123 is optically coupled to the second outer cladding portion 143, the first low-index trench 124 is optically coupled to the second low-index trench 144, and the first inner cladding portion 125 is optically coupled to the second inner cladding portion 145 through the transition region 150.

The channel 114 of the first segment 110 may be a void space extending along the axial centerline 2 of the first segment 110. In embodiments, the channel 114 may be filled with a gas, such as, for example, air or another gas. The channel 114 has a much lower relative refractive index than other portions and regions of the optical fiber 100. Specifically, the channel 114 has a refractive index $n_{CH}$ and relative refractive index $\Delta_{CH}$ % relative to the first outer cladding portion 123. The refractive index $n_{CH}$ is about 1.0 and the relative refractive index $\Delta_{CH}$ % is about −26%. The first annular core region 113 has a refractive index $n_{AC}$ and a relative refractive index $\Delta_{AC}$ %, and the second core portion 132 has a refractive index $n_c$ and a relative refractive index $\Delta_c$ %. In embodiments, the first annular core region 113 and the second core portion 132 are made from the same material and the relative refractive index $\Delta_{AC}$ % is substantially equal to the relative refractive index $\Delta_c$ % (i.e., $\Delta_{AC}$ %=$\Delta_c$ %). The relative refractive index $\Delta_{AC}$ % and the relative refractive index $\Delta_c$ % are much greater than the relative refractive index $\Delta_{CH}$ % (i.e., $\Delta_{AC}$ %>>$\Delta_{CH}$ %, $\Delta_c$ %>>$\Delta_{CH}$ %). The relative refractive index $\Delta_{AC}$ % and the relative refractive index $\Delta_c$ % are from about 0.2% to about 1.0%. In embodiments, the relative refractive index $\Delta_{AC}$ % and the relative refractive index $\Delta_c$ % are from about 0.3% to about 0.75%.

The first cladding portion 122 has a refractive index $n_{CL}$ and a relative refractive index $\Delta_{CL}$ % relative to pure silica glass. The refractive index $n_{CL}$ of the first cladding portion 122 is used as the reference for the relative refractive indices of the other glass portions of the first segment 110 of the optical fiber 100. In embodiments where the first cladding portion 122 includes a first outer cladding portion 123, a first low-index trench 124, and (optionally) a first inner cladding portion 125, the relative refractive indices of the other glass portions of the first segment 110 of the optical fiber 100 are determined relative to the first outer cladding portion 123, as described in further detail herein.

In embodiments where the first cladding portion 122 includes the first inner cladding portion 125 and the first low-index trench 124, the first inner cladding portion 125 has a refractive index $n_{ICL}$ and a relative refractive index $\Delta_{ICL}$ %, and the first low-index trench 124 has a refractive index $n_{LIT}$ and a relative refractive index $\Delta_{LIT}$ %. The relative refractive index $\Delta_{ICL}$ % is generally greater than the relative refractive index $\Delta_{LIT}$ % and generally less than the relative refractive index $\Delta_{AC}$ % (i.e., $\Delta_{AC}$ %>$\Delta_{ICL}$ %>$\Delta_{LIT}$ %) as generally depicted in FIG. 3. The relative refractive index $\Delta_{ICL}$ % is from about −0.1% to about 0.1% and the relative refractive index $\Delta_{LIT}$ % is from about −0.1% to about −1.0%. In embodiments, the relative refractive index $\Delta_{ICL}$ % is from about −0.05% to about 0.05% and the relative refractive index $\Delta_{LIT}$ % is from about −0.3% to about −0.5%.

The second cladding portion 142 has a refractive index $n_{cl}$ and a relative refractive index $\Delta_{cl}$ % relative to pure silica glass. The refractive index $n_{cl}$ of the second cladding portion 142 may be used as the reference for the relative refractive indices of the other glass portions of the second segment 130 of the optical fiber 100 and thus is determined relative to itself. In embodiments where the second cladding portion 142 includes a second outer cladding portion 143, a second low-index trench 144, and (optionally) a second inner cladding portion 145, the relative refractive indices of the other glass portions of the second segment 130 of the optical fiber 100 are determined relative to the second outer cladding portion 143, as described in further detail herein.

In embodiments where the second cladding portion 142 includes the second inner cladding portion 145 and the second low-index trench 144, the second inner cladding portion 145 has a refractive index $n_{icl}$ and a relative refractive index $\Delta_{icl}$ %, and the second low-index trench 144 has a refractive index $n_{lit}$ and a relative refractive index $\Delta_{lit}$ %. The relative refractive index $\Delta_{icl}$ % is generally greater than the relative refractive index $\Delta_{lit}$ % and less than the relative refractive index $\Delta_c$ % (i.e., $\Delta_c$ %>$\Delta_{icl}$ %>$\Delta_{lit}$ %) as generally depicted in FIG. 5. In embodiments, the second inner cladding portion 145 is made from the same material as the first inner cladding portion 125 and the second low-index trench 144 is made from the same material as the first low-index trench 124. Accordingly, the refractive indices $n_{icl}$ and $n_{lit}$ may be substantially equal to the refractive indices, $n_{ICL}$ and $n_{LIT}$, respectively (i.e., $n_{icl}$=$n_{ICL}$; $n_{lit}$=$n_{LIT}$), and the relative refractive indices $\Delta_{icl}$ % and $\Delta_{lit}$ % may be substantially equal to the relative refractive indices $\Delta_{ICL}$ % and $\Delta_{LIT}$ %, respectively (i.e., $\Delta_{icl}$ %=$\Delta_{ICL}$ %; $\Delta_{lit}$ %=$\Delta_{LIT}$ %). For example, the relative refractive index $\Delta_{icl}$ % may be from about −0.1% to about 0.1% and the relative refractive index $\Delta_{lit}$ % may be from about −0.1% to about −1.0%. In embodiments, the relative refractive index $\Delta_{icl}$ % may be from about −0.05% to about 0.05% and the relative refractive index $\Delta_{lit}$ % may be from about −0.3% to about −0.5%.

In embodiments where the first cladding portion 122 includes the first outer cladding portion 123, the first outer cladding portion 123 has a refractive index $n_{OCL}$ and a relative refractive index $\Delta_{OCL}$ %. In these embodiments, the relative refractive index $\Delta_{OCL}$ % may be used as the reference for determining the relative refractive indices of the other glass portions of the first segment 110 of the optical fiber 100. In the embodiments described herein, the relative refractive index $\Delta_{OCL}$ % of the first outer cladding portion 123 is greater than the relative refractive index $\Delta_{LIT}$ % of the first low-index trench 124 (i.e., $\Delta_{OCL}$ %>$\Delta_{LIT}$ %). In some embodiments, the relative refractive index $\Delta_{OCL}$ % of the first outer cladding portion 123 may be greater than the relative refractive index $\Delta_{ICL}$ % of the first inner cladding portion 125, such as when the first inner cladding portion 125 comprises silica glass down-doped with one or more down-dopants which decrease the index of refraction $n_{ICL}$ of the first inner cladding portion 125 relative to the index of refraction $n_{OCL}$ of the first outer cladding portion 123. In other embodiments, the relative refractive index $\Delta_{OCL}$ % of the first outer cladding portion 123 may be substantially equal to the relative refractive index $\Delta_{ICL}$ % of the first inner cladding portion 125. In such embodiments, the composition of the first outer cladding portion 123 may be the same as the composition of the first inner cladding portion 125 or different than the composition of the first inner cladding portion 125, so long as $\Delta_{OCL}$ %=$\Delta_{ICL}$ %. Based on the foregoing, it should be understood that the relative refractive index $\Delta_{OCL}$ % of the first outer cladding portion 123 is greater than or substantially equal to the relative refractive index $\Delta_{ICL}$ % of the first inner cladding portion 125.

In embodiments where the second cladding portion 142 includes the second outer cladding portion 143, the second outer cladding portion 143 has a refractive index $n_{ocl}$ and a relative refractive index $\Delta_{ocl}$ %. Accordingly, the relative refractive index $\Delta_{ocl}$ % may be used as the reference for the relative refractive indices of the other glass portions of the second segment 130 of the optical fiber 100. In the embodiments described herein, the relative refractive index $\Delta_{ocl}$ % of the second outer cladding portion 143 is greater than the relative refractive index $\Delta_{lit}$ % of the second low-index trench 144 (i.e., $\Delta_{ocl}$ %>$\Delta_{lit}$ %). In some embodiments, the relative refractive index $\Delta_{ocl}$ % of the second outer cladding portion 143 may be greater than the relative refractive index $\Delta_{icl}$ % of the second inner cladding portion 145, such as when the second inner cladding portion 145 comprises silica glass down-doped with one or more down-dopants which decrease the index of refraction $n_{icl}$ of the second inner cladding portion 145 relative to the index of refraction $n_{ocl}$ of the second outer cladding portion 143. In other embodiments, the relative refractive index $\Delta_{ocl}$ % of the second outer cladding portion 143 may be substantially equal to the relative refractive index $\Delta_{icl}$ % of the second inner cladding portion 145. In such embodiments, the composition of the second outer cladding portion 143 may be the same as the composition of the second inner cladding portion 145 or different than the composition of the second inner cladding portion 145, so long as $\Delta_{ocl}\% = \Delta_{icl}\%$. Based on the foregoing, it should be understood that the relative refractive index $\Delta_{ocl}\%$ of the second outer cladding portion 143 is greater than or substantially equal to the relative refractive index $\Delta_{icl}\%$ of the second inner cladding portion 145. In embodiments, the second outer cladding portion 143 is made from the same material as the first outer cladding portion 123, and as such, the refractive index $n_{ocl}$ of the second outer cladding portion 143 may be substantially equal to the refractive index $n_{OCL}$ of the first outer cladding portion 123 (i.e., $n_{ocl} = n_{OCL}$) and the relative refractive index $\Delta_{ocl}\%$ of the second outer cladding portion 143 may be substantially equal to the relative refractive index $\Delta_{OCL}\%$ of the first outer cladding portion 123, (i.e., $\Delta_{ocl}\% = \Delta_{OCL}\% = 0$).

The first annular core region 113 of the first segment 110 and the second core portion 132 of the second segment 130 comprise silica glass with one or more up-dopants which increase the index of refraction of silica glass. Suitable up-dopants include, for example and without limitation, germanium (Ge), titanium (Ti), aluminum (Al), chlorine (Cl), phosphorous (P), germanium oxide (e.g., $GeO_2$), titanium oxide (e.g., $TiO_2$), phosphorous oxide (e.g., $P_2O_5$), and various combinations thereof. In embodiments, at least one of the first annular core region 113 and the second core portion 132 contain between about 3 wt. % to about 17 wt. % $GeO_2$. In some other embodiments, at least one of the first annular core region 113 and the second core portion 132 contain between about 5 wt. % to about 13 wt. % $GeO_2$. In embodiments, the first annular core region 113 and the second core portion 132 are made from the same materials and the dopant concentration in the first annular core region 113 is substantially equal to the dopant concentration in the second core portion 132.

The first inner cladding portion 125 of the first segment 110 and the second inner cladding portion 145 of the second segment 130 may comprise pure silica glass, silica glass with one or more up-dopants which increase the index of refraction of silica glass, or silica glass with one or more down-dopants that decrease the index of refraction of silica glass. Non-limiting examples of suitable up-dopants include Ge, Ti, Al, Cl, P, $GeO_2$, $TiO_2$, $P_2O_5$, combinations thereof or the like. In embodiments, at least one of the first inner cladding portion 125 and the second inner cladding portion 145 contain Cl as an up-dopant. Non-limiting examples of suitable down-dopants include fluorine (F), boron (B), or the like. In embodiments, at least one of the first inner cladding portion 125 and the second inner cladding portion 145 contain F as a down-dopant. As used herein, the phrase "pure silica glass" means that the silica glass comprises $SiO_2$ with less than 1000 ppm by weight of other elements.

The radial thickness of a particular glass portion of an optical fiber may be interrelated with a relative refractive index of the particular glass portion. Specifically, a glass portion 'i' with a relative refractive index $\Delta_i\%$, an inner radius $R_{in}$ and an outer radius $R_{out}$ may have a trench volume $V_i$ defined as:

$$V_i = 2\int_{R_{in}}^{R_{out}} \Delta_i \% (R) dR \qquad (32)$$

which may be rewritten as:

$$V_i = \Delta_i \% (R_{out}^2 - R_{in}^2). \qquad (33)$$

Accordingly, the first low-index trench 124 may have a trench volume $V_{LIT}$ of:

$$V_{LIT} = \Delta_{LIT}\%(R_3^2 - R_2^2) \qquad (34)$$

and the second low-index trench 144 may have a trench volume $v_{lit}$ of:

$$v_{lit} = \Delta_{lit}\%(r_3^2 - r_2^2) \qquad (35)$$

In the embodiments described herein, the trench volume $V_{LIT}$ of the first low-index trench 124 may be greater than or equal to about 80%-$\mu m^2$, such as greater than or equal to about 100%-$\mu m^2$. In some embodiments, the trench volume $V_{LIT}$ may be greater than or equal to about 110%-$\mu m^2$ or even greater than or equal to about 120%-$\mu m^2$. In some embodiments, the trench volume $V_{LIT}$ may be greater than or equal to about 80%-$\mu m^2$ and less than or equal to about 220%-$\mu m^2$. In some embodiments, the trench volume $V_{LIT}$ may be greater than or equal to about 100%-$\mu m^2$ and less than or equal to about 200%-$\mu m^2$. In still other embodiments, the trench volume profile $V_{LIT}$ may be greater than or equal to about 110%-$\mu m^2$ and less than or equal to about 180%-$\mu m^2$.

In the embodiments described herein, the trench volume $v_{lit}$ of the second low-index trench 144 may be greater than or equal to about 40%-$\mu m^2$, such as greater than or equal to about 50%-$\mu m^2$. In some embodiments, the trench volume $v_{lit}$ may be greater than or equal to about 55%-$\mu m^2$ or even greater than or equal to about 60%-$\mu m^2$. In some embodiments, the trench volume $v_{lit}$ may be greater than or equal to about 40%-$\mu m^2$ and less than or equal to about 110%-$\mu m^2$. In some embodiments, the trench volume $v_{lit}$ may be greater than or equal to about 50%-$\mu m^2$ and less than or equal to about 100%-$\mu m^2$. In still other embodiments, the trench volume profile $v_{lit}$ may be greater than or equal to about 55%-$\mu m^2$ and less than or equal to about 90%-$\mu m^2$.

In the embodiments of the optical fibers described herein, the first low-index trench 124, the second low-index trench 144, or both the first low-index trench 124 and the second low-index trench 144 comprise silica glass with one or more down-dopants which decrease the index of refraction of silica glass. Non-limiting examples of down-dopants include F, B, or the like. The first low-index trench 124, the second low-index trench 144, or both the first low-index trench 124 and the second low-index trench 144, may comprise F in a concentration between about 0.1 wt. % to about 2.5 wt. %. In embodiments, at least one of the first low-index trench 124 and the second low-index trench 144 comprise F in a concentration between about 0.1 wt. % to about 1.8 wt. %. In some embodiments, at least one of the first low-index trench 124 and the second low-index trench 144 comprise F in a concentration between about 0.1 wt. % to about 1.5 wt. %. In still other embodiments, at least one of the first low-index trench 124 and the second low-index trench 144 comprise F in a concentration between about 0.5 wt. % to about 1.8 wt. %. In still yet other embodiments, at least one of the first low-index trench 124 and the second low-index trench 144 comprise F in a concentration between about 0.7 wt. % to about 1.8 wt. %.

In some embodiments, at least one of the relative refractive index $\Delta_{LIT}\%$ of the first low-index trench 124 and the relative refractive index $\Delta_{lit}\%$ of the second low-index trench 144 is achieved by forming the silica glass of at least one of the first low-index trench 124 and the second low-index trench 144, respectively, with voids which are either non-periodically disposed, or periodically disposed, or both, throughout the silica glass. The phrase "non-periodically disposed" or "non-periodic distribution", as used herein, means that for a cross section of the optical fiber 100 (such as a cross section perpendicular to the longitudinal axis), the non-periodically disposed voids are randomly or non-periodically distributed across the silica glass. Similar cross sections taken at different points along the length of the fiber will have different cross-sectional void patterns. That is, various cross sections will have different void patterns, wherein the distribution of voids and the sizes of voids do not match when the cross sections are compared to one another. As such, the voids are non-periodically disposed within the fiber structure. These voids are stretched (elongated) along the length (i.e. parallel to the longitudinal axis) of the optical fiber 100, but do not extend the entire length of the entire fiber. While not wishing to be bound by theory, it is believed that the voids extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. In some embodiments, these voids may contain one or more gases, such as argon, krypton, $CO_2$, $SO_2$, $O_2$, or mixtures thereof. In some other embodiments, the voids are substantially free of gas. Regardless of the presence or absence of gas, the refractive index $n_{LIT}$ of the first low-index trench 124, the refractive index $n_{lit}$ of the second low-index trench 144, or both of the refractive indices $n_{LIT}$ and $n_{lit}$, are decreased due to the presence of the voids. Alternatively or additionally, the refractive index $n_{LIT}$ of the first low-index trench 124, the refractive index $n_{lit}$ of the second low-index trench 144, or both of the refractive indices $n_{LIT}$ and $n_{lit}$, are decreased by forming a down-doped silica glass with a non-periodic, periodic, or both a non-periodic and periodic distribution of voids, as described herein.

The relative refractive index $\Delta_{LIT}$% of the first low-index trench 124 is less than the relative refractive index $\Delta_{ICL}$% of the first inner cladding portion 125 (i.e., $\Delta_{LIT}$%<$\Delta_{ICL}$%) and less than the relative refractive index $\Delta_{OCL}$% of the first outer cladding portion 123 (i.e., $\Delta_{LIT}$%<$\Delta_{OCL}$%). In some embodiments, the relative refractive index $\Delta_{ICL}$% is substantially equal to the relative refractive index $\Delta_{OCL}$% and $\Delta_{LIT}$%<$\Delta_{ICL}$%=$\Delta_{OCL}$%. In other embodiments, the relative refractive index $\Delta_{ICL}$% is less than the relative refractive index $\Delta_{OCL}$% and $\Delta_{LIT}$%<$\Delta_{ICL}$%<$\Delta_{OCL}$%.

The relative refractive index $\Delta_{lit}$% of the second low-index trench 144 is less than the relative refractive index $\Delta_{icl}$% of the second inner cladding portion 145 (i.e., $\Delta_{lit}$%<$\Delta_{icl}$%) and less than the relative refractive index $\Delta_{ocl}$% of the second outer cladding portion 143 (i.e., $\Delta_{lit}$%<$\Delta_{ocl}$%). In some embodiments, the relative refractive index $\Delta_{icl}$% is substantially equal to the relative refractive index $\Delta_{ocl}$% and $\Delta_{lit}$%<$\Delta_{icl}$%=$\Delta_{ocl}$%. In other embodiments, the relative refractive index $\Delta_{icl}$% is less than the relative refractive index $\Delta_{ocl}$% and $\Delta_{lit}$%<$\Delta_{icl}$%<$\Delta_{ocl}$%. In embodiments where the second low-index trench 144, the second inner cladding portion 145 and the second outer cladding portion 143 are made from the same materials as the first low-index trench 124, the first inner cladding portion 125 and the first outer cladding portion 123, respectively, it should be appreciated that the relative refractive index $\Delta_{lit}$% may be substantially equal to the relative refractive index $\Delta_{LIT}$% (i.e., $\Delta_{lit}$%=$\Delta_{LIT}$%), the relative refractive index $\Delta_{icl}$% may be substantially equal to the relative refractive index $\Delta_{ICL}$% (i.e., $\Delta_{icl}$%=$\Delta_{ICL}$%) and the relative refractive index $\Delta_{ocl}$% may be substantially equal to the relative refractive index $\Delta_{OCL}$% (i.e., $\Delta_{ocl}$%=$\Delta_{OCL}$%). Also, in embodiments where the relative refractive index $\Delta_{ICL}$% is substantially equal to the relative refractive index $\Delta_{OCL}$%, $\Delta_{lit}$%<$\Delta_{ICL}$%=$\Delta_{OCL}$% and $\Delta_{LIT}$%<$\Delta_{icl}$%=$\Delta_{ocl}$%. In embodiments where the relative refractive index $\Delta_{ICL}$% is less than the relative refractive index $\Delta_{OCL}$%, $\Delta_{lit}$%<$\Delta_{ICL}$%<$\Delta_{OCL}$% and $\Delta_{LIT}$%<$\Delta_{icl}$%<$\Delta_{ocl}$%.

The first outer cladding 123 of the first segment 110 and the second outer cladding 143 of the second segment 130 may comprise pure silica glass, silica glass with one or more up-dopants which increase the index of refraction of silica glass, or silica glass with one or more down-dopants that decrease the index of refraction of silica glass. Non-limiting examples of suitable up-dopants include Ge, Ti, Al, Cl, P, $GeO_2$, $TiO_2$, $P_2O_5$, combinations thereof or the like. In embodiments, at least one of first outer cladding 123 and the second outer cladding 143 contain Cl as an up-dopant. Non-limiting examples of suitable down-dopants include F, B, combinations thereof, or the like. In embodiments, at least one of the first outer cladding 123 and the second outer cladding 143 contain F as a down-dopant.

The various embodiments of the optical fiber 100 described herein have improved bend performance due to the incorporation of the first low-index trench 124 within the first cladding portion 122 and the second low-index trench 144 within the second cladding portion 142. Macrobend performance of the optical fiber 100 may be determined according to FOTP-62 (JEC-60793-1-47) by wrapping 2 turns of optical fiber around a 15 mm and/or a 30 mm diameter mandrel and measuring the increase in attenuation due to the bending.

In embodiments, the optical fiber 100 is manufactured using a conventional fiber manufacturing process to make a fiber preform having a desired structure and composition. Non-limiting examples of processes used to make the fiber preform include outside vapor deposition (OVD), modified chemical vapor deposition (MCVD), physical chemical vapor deposition (PCVD), or the like. Once formed, the fiber preform is drawn into a fiber having the dimensions of the first segment 110. The fiber having the dimensions of the first segment 110 is clamped and a portion of the fiber is further drawn down to the dimensions of the second segment 130 with the transition region 150 positioned between the first segment 110 and the second segment 130.

For example, in one embodiment, the optical fiber 100 may be initially formed such that the optical fiber 100 initially has the channel 114, first annular core region 113, first inner cladding portion 125, first low-index trench 124 and first outer cladding portion 123. The optical fiber 100 may then be clamped and a portion of the fiber heated and further drawn to create an optical fiber having the first segment 110 with the channel 114, first annular core region 113, first inner cladding portion 125, first low-index trench 124 and first outer cladding portion 123, and a second segment 130 having the second core portion 132, the second inner cladding portion 145, second low-index trench 144 and second outer cladding portion 143. In this procedure, further drawing the optical fiber collapses the channel 114 thereby forming the second core portion 132 (without a channel) of the second segment 130 of the optical fiber 100 while simultaneously reducing the dimensions of the second segment 130 of the optical fiber 100 relative to the first segment 110. In another embodiment, the optical fiber 100 may be formed by splicing the first segment 110 and the second segment 130 together. In such an embodiment, it is understood that the outer diameter $D_0$ of the first segment 110 and the outer diameter $d_0$ of the second segment 130 may be generally equal to each other so long as the first core portion 112, second core portion 132, first cladding portion 122 and second cladding portion 142 have the attributes and properties discussed above.

Referring to FIGS. 1A, 3 and 5, the optical fiber 100 may be used to transform a Gaussian laser beam into a Bessel laser beam. Specifically, a Gaussian laser beam GLB may be optically coupled to an inlet end 131 of the optical fiber 100 and propagates through the second segment 130 of the optical fiber 100 towards the first segment 110. The Gaussian laser beam GLB is generally confined within the second core portion 132 while propagating through the second segment 130. As the second segment 130 transitions into the first segment 110, the second core portion 132 transitions into the first annular core region 113, i.e., the second core portion 132 transitions into the first annular core region 113 positioned around the channel 114 along the length of the first segment 110 of the optical fiber 100. The Gaussian laser beam GLB propagating through the second segment 130 seeks to propagate through a high-index core portion and thereby propagates or "follows" the second core portion 132 as it transitions into the first annular core region 113. Accordingly, the Gaussian laser beam GLB is converted into a ring-shaped beam RSB propagating through the first segment 110 and generally confined within the first annular core region 113 due to the relative geometries and relative refractive indices of the first core portion 112 and the second core portion 132. When focused, the ring shaped beam RSB forms the Bessel laser beam BLB. If the outlet end 111 is planar (no focusing power), the ring shaped beam laser beam exits the optical fiber 100 at an outlet end 111 having undergone the transformation from the Gaussian laser beam to a ring shaped laser beam (RSB). If the outlet 110 has curved, and/or forms a focusing lens surface, then the ring-shaped beam forms the Bessel laser beam BLB and the Bessel laser beam BLB exits the optical fiber 100 at an outlet end 111 having undergone the transformation from the Gaussian laser beam to a Bessel laser beam. In embodiments, the Gaussian laser beam GLB can be coupled to the inlet end 131 of the optical fiber 100 through a lens system (not shown), direct butt-coupling (not shown) or fusion splicing (not shown). Thus, the ring shaped beam provided to the outlet end 111 of the optical fiber 100 can be focused with free space bulk optics (not shown) or a fiber lens directly formed on the outlet end 111, or attached to the outlet end 111 (not shown).

Figure 6:
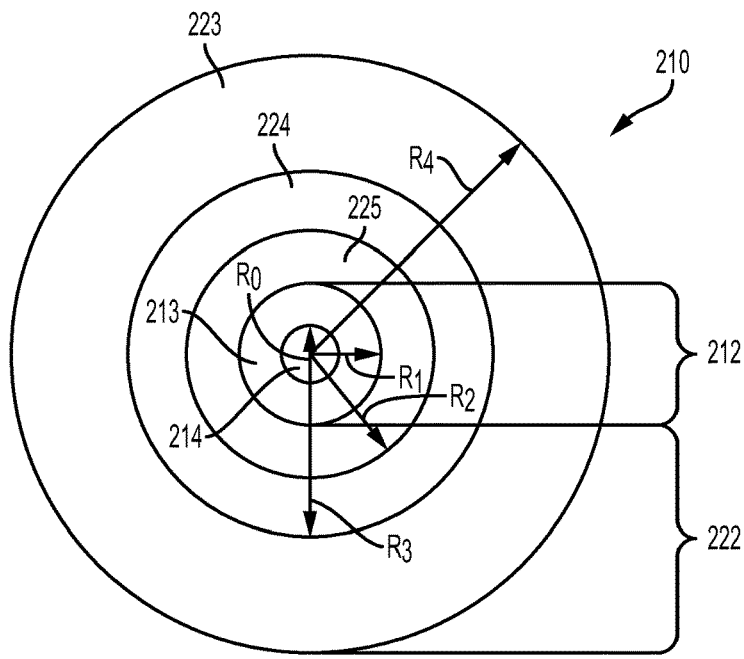
FIG. 6 schematically depicts a radial cross section of a first segment of the optical fiber of FIG. 1A to one or more embodiments shown and described herein.
Figure 7:
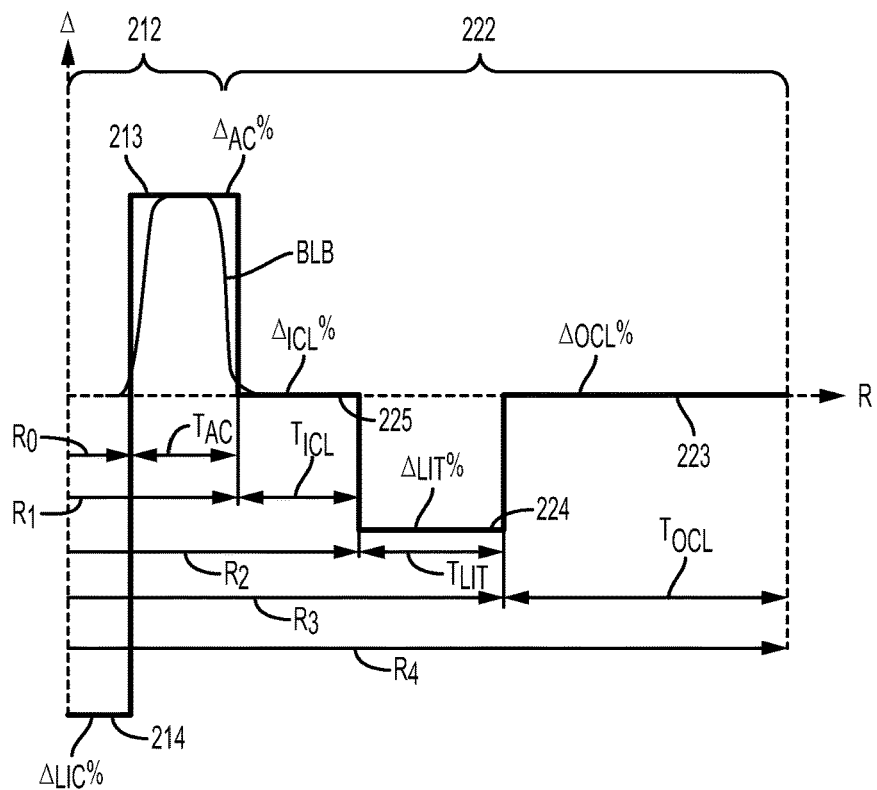
FIG. 7 graphically depicts the relative refractive index profile of the first segment of the optical fiber of FIG. 6 as a function of the radius R of the glass portion of the optical fiber according to one or more embodiments shown and described herein.
Figure 8:
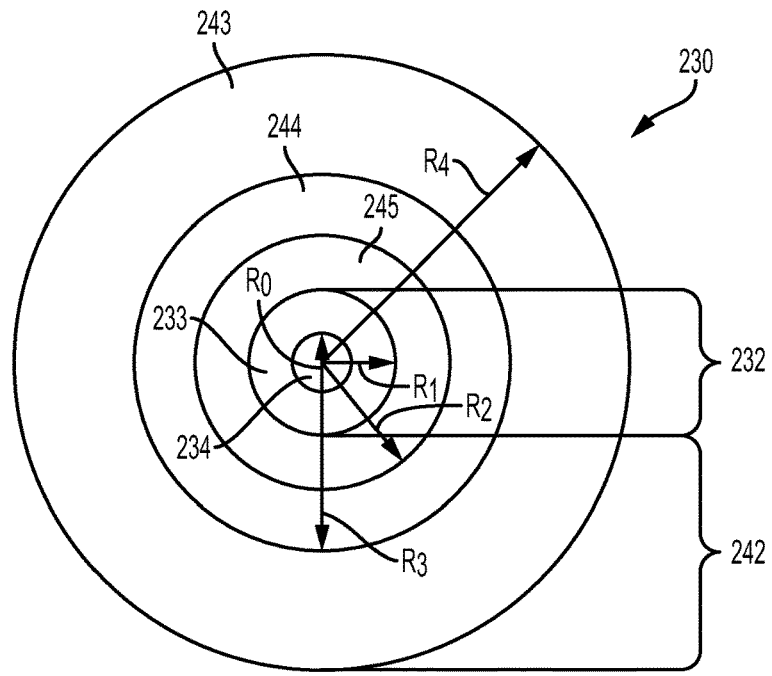
FIG. 8 schematically depicts a radial cross section of a second segment of the optical fiber of FIG. 1A according to one or more embodiments shown and described herein.
Figure 9:
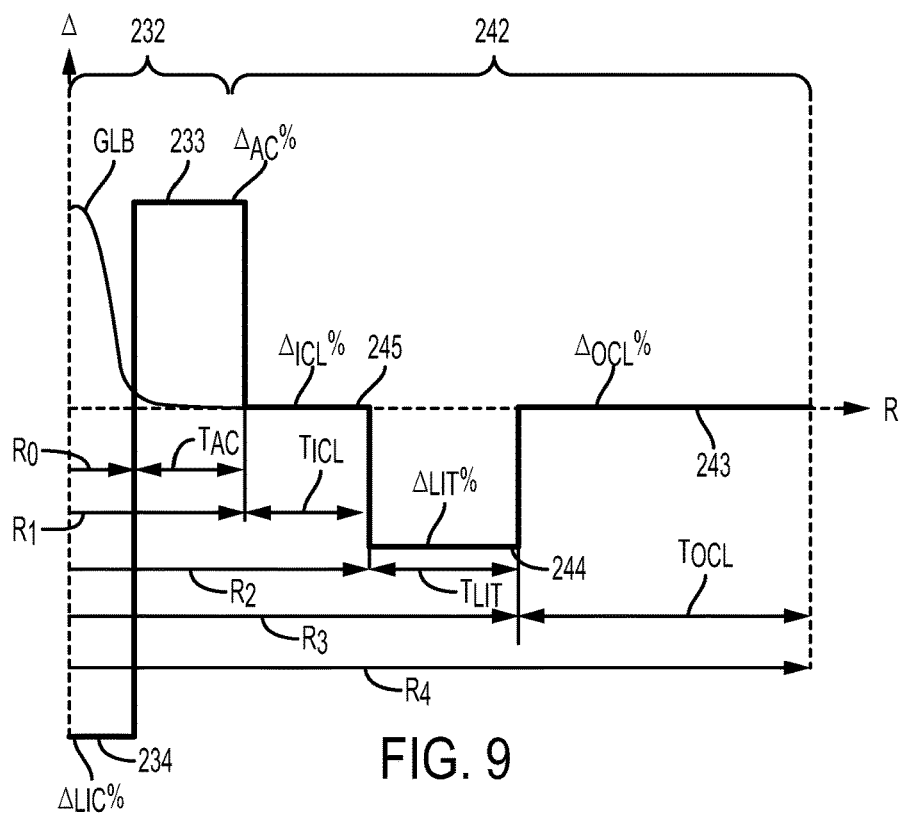
FIG. 9 graphically depicts the relative refractive index profile of the second segment of the optical fiber of FIG. 8 as a function of the radius r of the glass portion of the optical fiber according to one or more embodiments shown and described herein.

Referring to FIGS. 1A and 6-9, an embodiment of an optical fiber 200 with a first segment 210 optically coupled to a second segment 230 with a transition region 250 is shown. The optical fiber 200 may be similar to the optical fiber 100 except the first segment 210 may include a first core portion with a first low-index core region, instead of a channel, positioned within a first annular core region, and the second segment 230 may include a second core portion with a second low-index core region positioned within a second annular core region. A side view of at least a portion of the optical fiber 200 is shown in FIG. 1A, radial cross sections of the first segment 210 and the second segment 230 of the optical fiber 200 are shown in FIGS. 6 and 8, respectively, and corresponding relative refractive index profiles for the first segment 210 and second segment 230 are shown in FIGS. 7 and 9, respectively. The first segment 210 has a first outer diameter '$D_0$' and the second segment 230 has a second outer diameter '$d_0$' (FIG. 1A). The first outer diameter $D_0$ is greater than the second outer diameter $d_0$. In embodiments, the first outer diameter $D_0$ may be from about 0.2 millimeters (mm) to about 5.0 mm, the second outer diameter $d_0$ may be from about 0.1 to about 4.5 mm, and the length of the transition region 250 may be from about 0.5 mm to about 20 mm. In embodiments, the first outer diameter $D_0$ is from about 0.4 mm to about 1.0 mm, the second outer diameter $d_0$ is from about 0.2 mm to about 0.9 mm, and the length of the transition region 250 is from about 1 mm to about 10 mm. In other embodiments, the first outer diameter $D_0$ is from about 150 µm to about 250 µm, the second outer diameter $d_0$ is from about 75 µm to about 225 µm, and the length of the transition region 250 is greater than 10 mm. A Gaussian laser beam GLB propagating through the second segment 230 is converted into ring-shaped beam propagating through the first segment 210. In embodiments, the first segment 210, second segment 230 and transition region 250 are integrally formed with one another and the taper ratio ($d_0/D_0$) of the optical fiber 200 is greater than or equal to about 0.2 and less than or equal to about 0.9 (e.g., 0.2, 0.3, 0.4, 0.5, 0.5, 0.7, 0.8 0.9, or in therebetween). For example, in some embodiments, the taper ratio of the optical fiber 200 is greater than or equal to about 0.3 and less than or equal to 0.9. In still other embodiments, the taper ratio of the optical fiber 200 is greater than or equal to 0.3 and less than or equal to 0.8. The first segment 210 (FIGS. 6 and 7) of the optical fiber 200 has a first core portion 212 centered on the axial centerline 2 of the optical fiber 200. The first core portion 212 may include a first annular core region 213. A first cladding portion 222 may extend around the first core portion 212. The second segment 230 (FIGS. 8 and 9) of the optical fiber 200 may have a second core portion 232 and at least a portion of the second core portion 232 is optically coupled to the first core portion 212. A second cladding portion 242 may extend around the second core portion 232.

Referring to FIGS. 1A, 6 and 7, a radial cross section of the first segment 210 of the optical fiber 200 of FIG. 1A is schematically depicted in FIG. 6 and the relative refractive index of the radial cross section relative to the centerline of the cross section is graphically depicted in FIG. 7. The first segment 210 generally includes a first core portion 212 and a first cladding portion 222. The first core portion 212 is positioned within the first cladding portion 222 with the first cladding portion 222 extending around the first core portion 212. The first core portion 212 and the first cladding portion 222 may be generally concentric such that a cross section of the first segment 210 of the optical fiber 200 is generally circular symmetric with respect to the center of the first core portion 212 of the optical fiber 200. Also, the first core portion 212 and the first cladding portion 222 may be generally axisymmetric with respect to the center of the first core portion 212 of the optical fiber 200. In embodiments, the first core portion 212 may include a first annular core region 213 and a first low-index core region 214. The first low-index core region 214 is positioned within the first annular core region 213 and the first low-index core region 214 is directly adjacent to and in direct contact with the first annular core region 213.

In some embodiments, the first cladding portion 222 may optionally include a first low-index trench 224 and a first outer cladding portion 223. The first low-index trench 224 is positioned within the first outer cladding 223 and the first low-index trench 224 may be directly adjacent to and in direct contact with the first outer cladding 223. The first low-index trench 224, when included, improves the bend performance of the optical fiber 200. That is, the first low-index trench 224 reduces attenuation of light propagating in the optical fiber 200 when the optical fiber 200 is coiled, thereby permitting the optical fiber 200 to be coiled to a tighter (i.e., smaller) radius without increasing the attenuation of light propagating in the optical fiber 200 relative to an optical fiber having a similar structure without the first low-index trench 224.

In some embodiments (not depicted), the first low-index trench 224 may be directly adjacent to and in direct contact with the first core portion 212. In some other embodiments, such as the embodiment depicted in FIGS. 6 and 7, the first low-index trench 224 may be spaced apart from the first core portion 212 by a first inner cladding portion 225, i.e., the first inner cladding portion 225 is positioned within the first low-index trench 224 between the first low-index trench 224 and the first core portion 212. In embodiments, the first inner cladding portion 225 is directly adjacent to and in direct contact with the first low-index trench 224 and the first annular core region 213.

The first segment 210 has a radius $R_4$ from the axial centerline 2 of the optical fiber 200. The first core portion 212 has a radius $R_1$ that is less than the radius $R_4$. The first low-index core region 214 of the first core portion 212 has a radius $R_0$ that is less than the radius $R_1$. The first annular core region 213 has an inner radius $R_0$, an outer radius $R_1$ and a radial thickness $T_{AC}=R_1-R_0$. The radii $R_0$ and $R_1$ of the first low-index core region 214 and first annular core region 213, respectively, are defined at the points at which the lines tangent to the maximum slopes of the relative refractive index profile (FIG. 6) of the first low-index core region 214 and first annular core region 213, respectively, cross the reference relative refractive index line $\Delta_{OCL}$ %. The first cladding portion 222 has an inner radius $R_1$, an outer radius $R_4$ and a radial thickness $T_{CL}=R_4-R_1$. In embodiments where the first cladding portion 222 includes the first low-index trench 224 and the first outer cladding portion 223, the first low-index trench 224 has an inner radius $R_2$, an outer radius $R_3$ and a radial thickness $T_{LIT}=R_3-R_2$. The first outer cladding portion 223 has an inner radius $R_3$, an outer radius $R_4$ and a radial thickness $T_{OCL}=R_4-R_3$. In embodiments (not depicted) where the first low-index trench 224 is directly adjacent to and in direct contact with the first core portion 212, the inner radius $R_2$ of the first low-index trench 224 may be equal to the radius $R_1$ of the first core portion 212. In embodiments where the first low-index trench 224 is spaced apart from the first core portion 212 by the first inner cladding portion 225, the first inner cladding portion 225 has an inner radius $R_1$, an outer radius $R_2$ and a radial thickness $T_{ICL}=R_2-R_1$.

The radius $R_4$ of the first segment 210 is from about 50 μm to about 250 μm. In some embodiments, the radius $R_4$ of the first segment 210 is from about 100 μm to about 150 μm. The radius $R_1$ of the first core portion 212 is from about 5 μm to about 25 μm. In some embodiments, the radius $R_1$ is from about 7.5 μm to about 15 μm. The radius $R_0$ of the first low-index core region 214 is from about 1 μm to about 10 μm. In some embodiments, the radius $R_0$ of the first low-index core region 214 is from about 2 μm to about 7 μm. The radial thickness $T_{AC}$ ($R_1-R_0$) of the first annular core region 213 is from about 2 μm to about 15 μm. In some embodiments the radial thickness $T_{AC}$ is from about 5 μm to about 10 μm. The radial thickness $T_{CL}$ ($R_4-R_1$) of the first cladding portion 222 is from about 75 μm to about 175 μm. In some embodiments the radial thickness $T_{CL}$ is from about 90 μm to about 125 μm. In embodiments where the first cladding portion 222 includes the first low-index trench 224 and the first outer cladding portion 223, the inner radius $R_2$ of the first low-index trench 224 is from about 5 μm to about 50 μm, the outer radius $R_3$ is from about 7 μm to about 50 μm and the radial thickness $T_{LIT}(R_3-R_2)$ is from about 1 μm to about 20 μm. In embodiments, the inner radius $R_2$ is from about 10 μm to about 30 μm, the outer radius $R_3$ is from about 10 μm to about 40 μm and the radial thickness $T_{LIT}$ is from about 1 μm to about 15 μm. The inner radius $R_3$ of the first outer cladding portion 223 is from about 7 μm to about 50 μm, the outer radius $R_4$ is from about 50 μm to about 250 μm and the radial thickness $T_{OCL}$ ($R_4-R_3$) is from about 75 μm to about 150 μm. In embodiments, the inner radius $R_3$ is from about 10 μm to about 40 μm, the outer radius $R_4$ is from about 100 μm to about 150 μm and the radial thickness $T_{OCL}$ is from about 85 μm to about 125 μm. In embodiments where the first low-index trench 224 is spaced apart from the first core portion 212 by the first inner cladding portion 225, the inner radius $R_1$ of the first inner cladding portion 225 is from about 5 μm to about 25 μm, the outer radius $R_2$ is from about 5 μm to about 50 μm and the radial thickness $T_{ICL}$ ($R_2-R_1$) is from about 1 μm to about 15.0 μm. In embodiments, the inner radius $R_1$ is from about 7.5 μm to about 15 μm, the outer radius $R_2$ is from about 10 μm to about 30 μm and the radial thickness $T_{ICL}$ is from about 1 μm to about 10 μm.

Referring to FIGS. 1A, 8 and 9, a radial cross section of the second segment 230 of the optical fiber 200 of FIG. 1A is schematically depicted in FIG. 8 and the relative refractive index of the radial cross section relative to the centerline of the cross section is graphically depicted in FIG. 9. The second segment 230 generally includes a second core portion 232 and a second cladding portion 242. The second core portion 232 is positioned within the second cladding portion 242 with the second cladding portion 242 extending around the second core portion 232. The second core portion 232 and the second cladding portion 242 may be generally concentric such that a cross section of the second segment 230 of the optical fiber 200 is generally circular symmetric with respect to the center of the second core portion 232 of the optical fiber 200. Also, the second core portion 232 and the second cladding portion 242 may be generally axisymmetric with respect to the center of the second core portion 232 of the optical fiber 200. In embodiments, the second core portion 232 may include a second annular core region 233 and a second low-index core region 234. The second low-index core region 234 is positioned within the second annular core region 233 and the second low-index core region 234 is directly adjacent to and in direct contact with the second annular core region 233.

In some embodiments, the second cladding portion 242 may optionally include a second low-index trench 244 and a second outer cladding portion 243. The second low-index trench 244 is positioned within the second outer cladding 243 and the second low-index trench 244 may be directly adjacent to and in direct contact with the second outer cladding 243. The second low-index trench 244, when included, improves the bend performance of the optical fiber 200. That is, the second low-index trench 244 reduces attenuation of light propagating in the optical fiber 200 when the optical fiber 200 is coiled, thereby permitting the optical fiber 200 to be coiled to a tighter (i.e., smaller) radius without increasing the attenuation of light propagating in the optical fiber 200 relative to an optical fiber having a similar structure without the second low-index trench 244. It should be understood that, when the first segment 210 of the optical fiber 200 includes the first low-index trench 224, the second segment 230 of the optical fiber 200 will include a second low-index trench 244 and vice-versa.

In some embodiments (not depicted), the second low-index trench 244 may be directly adjacent to and in direct contact with the second core portion 232. In some other embodiments, the second low-index trench 244 may be spaced apart from the second core portion 232 by a second inner cladding portion 245 as depicted in FIGS. 8 and 9. That is, the second inner cladding portion 245 is positioned within the second low-index trench 244 and is positioned between the second low-index trench 244 and the second core portion 232. In embodiments, the second inner cladding portion 245 is directly adjacent to and in direct contact with the second low-index trench 244 and the second annular core region 233.

Referring to FIGS. 1A and 6-9, it should be appreciated that the first core portion 212 is optically coupled with the second core portion 232 and the first cladding portion 222 is optically coupled to the second cladding portion 242 through the transition region 250. Particularly, the first low-index core region 214 is optically coupled to the second low-index core region 234, the first annular core region 213 is optically coupled to the second annular core region 233, the first outer cladding portion 223 is optically coupled to the second outer cladding portion 243, the first low-index trench 224 is optically coupled to the second low-index trench 244, and the first inner cladding portion 225 is optically coupled to the second inner cladding portion 245 through the transition region 250.

The second segment 230 has a radius $r_4$ from the axial centerline 2 of the optical fiber 200. The second core portion 232 has a radius $r_1$ that is less than the radius $r_4$. The second low-index core region 234 of the second core portion 232 has a radius $r_0$ that is less than the radius $r_1$. The second annular core region 233 has an inner radius $r_0$, an outer radius $r_1$ and a radial thickness $t_{ac}=r_1-r_0$. The radii $r_0$ and $r_1$ of the second low-index core region 234 and second annular core region 233 are defined at the points at which the lines tangent to the maximum slope of the relative refractive index profile (FIG. 9) of the second low-index core region 234 and second annular core region 233, respectively, cross the reference relative refractive index line $\Delta_{ocl}$ %. The second cladding portion 242 has an inner radius $r_1$, an outer radius $r_4$ and a radial thickness $t_{cl}=r_4-r_1$. In embodiments where the second cladding portion 242 includes the second low-index trench 244 and the second outer cladding portion 243, the second low-index trench 244 has an inner radius $r_2$, an outer radius $r_3$ and a radial thickness $t_{lit}=r_3-r_2$. The second outer cladding portion 243 has an inner radius $r_3$, an outer radius $r_4$ and a radial thickness $t_{ocl}=r_4-r_3$. In embodiments (not depicted) where the second low-index trench 244 is directly adjacent to and in direct contact with the second core portion 232, the inner radius $r_2$ of the second low-index trench 244 may be equal to the radius $r_1$ of the second core portion 232. In embodiments where the second low-index trench 244 is spaced apart from the second core portion 232 by the second inner cladding portion 245, the second inner cladding portion 245 has an inner radius $r_1$, an outer radius $r_2$ and a radial thickness $t_{icl}=r_2-r_1$.

The radius $r_4$ of the second segment 230 is from about 20 µm to about 100 µm. In some embodiments, the radius $r_4$ of the second segment 230 is from about 30 µm to about 70 µm. The radius $r_1$ of the second core portion 232 is from about 1 µm to about 10 µm. In some embodiments, the radius $r_1$ is from about 2.5 µm to about 7.5 µm. The radial thickness $t_{cl}$ ($r_4-r_1$) of the second cladding portion 242 is from about 20 µm to about 80 µm. In some embodiments the radial thickness $t_{cl}$ is from about 35 µm to about 60 µm. In embodiments where the second cladding portion 242 includes the second low-index trench 244 and the second outer cladding portion 243, the inner radius $r_2$ of the second low-index trench 244 is from about 2 µm to about 15 µm, the outer radius $r_3$ is from about 2 µm to about 25 µm and the radial thickness $t_{lit}$ ($r_3-r_2$) is from about 1 µm to about 10 µm. In embodiments, the inner radius $r_2$ is from about 3 µm to about 10 µm, the outer radius $r_3$ is from about 3 µm to about 20 µm and the radial thickness $t_{lit}$ is from about 1 µm to about 8 µm. The inner radius $r_3$ of the second outer cladding portion 243 is from about 2 µm to about 25 µm, the outer radius $r_4$ is from about 20 µm to about 100 µm and the radial thickness $t_{ocl}$ ($r_4-r_3$) is from about 25 µm to about 75 µm. In embodiments, the inner radius $r_3$ is from about 3 µm to about 20 µm, the outer radius $r_4$ is from about 30 µm to about 70 µm and the radial thickness $t_{ocl}$ is from about 30 µm to about 50 µm. In embodiments where the second low-index trench 244 is spaced apart from the second core portion 232 by the second inner cladding portion 245, the inner radius $r_1$ of the second inner cladding portion 245 is from about 1 µm to about 10 µm, the outer radius $r_2$ is from about 2 µm to about 15 µm and the radial thickness $t_{icl}$ ($r_2-r_1$) is from about 1 µm to about 8 µm. In embodiments, the inner radius $r_1$ is from about 2.5 µm to about 7.5 µm, the outer radius $r_2$ is from about 3 µm to about 10 µm and the radial thickness $t_{icl}$ is from about 1 µm to about 4 µm.

The first low-index core region 214 of the first segment 210 has a refractive index $n_{LIC}$ and a relative refractive index $\Delta_{LIC}$ %, and the second low-index core region 234 of the second segment 230 has a refractive index $n_{lic}$ and a relative refractive index $\Delta_{lic}$ %. In embodiments, the first low-index core region 214 and the second low-index core region 234 are made from the same material and the relative refractive index $\Delta_{LIC}$ % is substantially equal to the relative refractive index $\Delta_{lic}$ % (i.e., $\Delta_{LIC}$ %=$\Delta_{lic}$ %). The relative refractive index $\Delta_{LIC}$ % and the relative refractive index $\Delta_{lic}$ % are from about 0.2% to about −1.0%. In embodiments, the relative refractive index $\Delta_{LIC}$ % and the relative refractive index $\Delta_{lic}$ % are from about 0.1% to about −0.5%.

The first annular core region 213 has a refractive index $n_{AC}$ and a relative refractive index $\Delta_{AC}$ %, and the second annular core region 233 has a refractive index $n_{ac}$ and a relative refractive index $\Delta_{ac}$ %. In embodiments, the first annular core region 213 and the second annular core region 233 are made from the same material and the relative refractive index $\Delta_{AC}$ % is substantially equal to the relative refractive index $\Delta_{ac}$ % (i.e., $\Delta_{AC}$ %=$\Delta_{ac}$ %). The relative refractive index $\Delta_{AC}$ % and the relative refractive index $\Delta_{ac}$ % are greater than the relative refractive index $\Delta_{LIC}$ % and the relative refractive index $\Delta_{lic}$ %, respectively (i.e., $\Delta_{AC}$ %>$\Delta_{LIC}$ %; $\Delta_{ac}$ %>$\Delta_{lic}$ %). In embodiments where the first low-index core region 214 and the second low-index core region 234 are made from the same material, and the first annular core region 213 and the second annular core region 233 are made from the same material, $\Delta_{AC}$ %>$\Delta_{lic}$ % and $\Delta_{ac}$ %>$\Delta_{LIC}$ %. The relative refractive index $\Delta_{AC}$ % and the relative refractive index $\Delta_{ac}$ % are from about 0.2% to about 1.0%. In embodiments, the relative refractive index $\Delta_{AC}$ % and the relative refractive index $\Delta_{ac}$ % are from about 0.3% to about 0.75%.

The first cladding portion 222 has a refractive index $n_{CL}$ and a relative refractive index $\Delta_{CL}$ % relative to pure silica glass. The refractive index $n_{CL}$ of the first cladding portion 222 may be used as the reference for the relative refractive indices of the other glass portions of the first segment 210 of the optical fiber 200. In embodiments where the first cladding portion 222 includes a first outer cladding portion 223, a first low-index trench 224, and (optionally) a first inner cladding portion 225, the relative refractive indices of the other glass portions of the first segment 210 of the optical fiber 200 are determined relative to the first outer cladding portion 223, as described in further detail herein.

In embodiments where the first cladding portion 222 includes the first inner cladding portion 225 and the first low-index trench 224, the first inner cladding portion 225 has a refractive index $n_{ICL}$ and a relative refractive index $\Delta_{ICL}$ %, and the first low-index trench 224 has a refractive index $n_{LIT}$ and a relative refractive index $\Delta_{LIT}$ %. The relative refractive index $\Delta_{ICL}$ % is generally greater than the relative refractive index $\Delta_{LIT}$ % and generally less than the relative refractive index $\Delta_{AC}$ % (i.e., $\Delta_{AC}$ %>$\Delta_{ICL}$ %>$\Delta_{LIT}$ %) as generally depicted in FIG. 7. The relative refractive index $\Delta_{ICL}$ % is from about −0.1% to about 0.1% and the relative refractive index $\Delta_{LIT}$ % is from about −0.1% to about −1.0%. In embodiments, the relative refractive index $\Delta_{ICL}$ % is from about −0.05% to about 0.05% and the relative refractive index $\Delta_{LIT}$ % is from about −0.3% to about −0.5%.

The second cladding portion 242 has a refractive index $n_{cl}$ and a relative refractive index $\Delta_{cl}$ % relative to pure silica glass. The refractive index $n_{cl}$ of the second cladding portion 242 may be used as the reference for the relative refractive indices of the other glass portions of the second segment 230 of the optical fiber 200. In embodiments where the second cladding portion 242 includes a second outer cladding portion 243, a second low-index trench 244, and (optionally) a second inner cladding portion 245, the relative refractive indices of the other glass portions of the second segment 230 of the optical fiber 200 are determined relative to the second outer cladding portion 243, as described in further detail herein.

In embodiments where the second cladding portion 242 includes the second inner cladding portion 245 and the second low-index trench 244, the second inner cladding portion 245 has a refractive index $n_{icl}$ and a relative refractive index $\Delta_{icl}$ %, and the second low-index trench 244 has a refractive index $n_{lit}$ and a relative refractive index $\Delta_{lit}$ %. The relative refractive index $\Delta_{icl}$ % is generally greater than the relative refractive index $\Delta_{lit}$ % and generally less than the relative refractive index $\Delta_{ac}$ % (i.e., $\Delta_{ac}$ %>$\Delta_{icl}$ %>$\Delta_{lit}$ %) as generally depicted in FIG. 9. In embodiments, the second inner cladding portion 245 is made from the same material as the first inner cladding 225 and the second low-index trench 244 is made from the same material as the first low-index trench 224. Accordingly, the refractive indices $n_{icl}$ and $n_{lit}$ may be substantially equal to the refractive indices, $n_{ICL}$ and $n_{LIT}$, respectively (i.e., $n_{icl}=n_{ICL}$; $n_{lit}=n_{LIT}$), and the relative refractive indices $\Delta_{icl}$ % and $\Delta_{lit}$ % may be substantially equal to the relative refractive indices $\Delta_{ICL}$ % and $\Delta_{LIT}$ %, respectively (i.e., $\Delta_{icl}$ %=$\Delta_{ICL}$ %; $\Delta_{lit}$ %=$\Delta_{LIT}$ %). For example, the relative refractive index $\Delta_{icl}$ % may be from about −0.1% to about 0.1% and the relative refractive index $\Delta_{lit}$ % may be from about 0.1% to about −1.0%. In embodiments, the relative refractive index $\Delta_{icl}$ % may be from about −0.05% to about 0.05% and the relative refractive index $\Delta_{lit}$ % may be from about −0.3% to about −0.5%.

In embodiments where the first cladding portion 222 includes the first outer cladding portion 223, the first outer cladding portion 223 has a refractive index $n_{OCL}$ and a relative refractive index $\Delta_{OCL}$ %. In these embodiments, the relative refractive index $\Delta_{OCL}$ % may be used as the reference for determining the relative refractive indices of the other glass portions of the first segment 210 of the optical fiber 200. In the embodiments described herein, the relative refractive index $\Delta_{OCL}$ % of the first outer cladding portion 223 is greater than the relative refractive index $\Delta_{LIT}$ % of the first low-index trench 224 (i.e., $\Delta_{OCL}$ %>$\Delta_{LIT}$ %). In some embodiments, the relative refractive index $\Delta_{OCL}$ % of the first outer cladding portion 223 may be greater than the relative refractive index $\Delta_{ICL}$ % of the first inner cladding portion 225, such as when the first inner cladding portion 225 comprises silica glass down-doped with one or more down-dopants which decrease the index of refraction $n_{ICL}$ of the first inner cladding portion 225 relative to the index of refraction $n_{OCL}$ of the first outer cladding portion 223. In other embodiments, the relative refractive index $\Delta_{OCL}$ % of the first outer cladding portion 223 may be substantially equal to the relative refractive index $\Delta_{ICL}$ % of the first inner cladding portion 225. In such embodiments, the composition of the first outer cladding portion 223 may be the same as the composition of the first inner cladding portion 225 or different than the composition of the first inner cladding portion 225, so long as $\Delta_{OCL}$ %=$\Delta_{ICL}$ %. Based on the foregoing, it should be understood that the relative refractive index $\Delta_{OCL}$ % of the first outer cladding portion 223 is greater than or substantially equal to the relative refractive index $\Delta_{ICL}$ % of the first inner cladding portion 225.

In embodiments where the second cladding portion 242 includes the second outer cladding portion 243, the second outer cladding portion 243 has a refractive index $n_{ocl}$ and a relative refractive index $\Delta_{ocl}$ %. Accordingly, the relative refractive index $\Delta_{ocl}$ % may be used as the reference for the relative refractive indices of the other glass portions of the second segment 230 of the optical fiber 200. In the embodiments described herein, the relative refractive index $\Delta_{ocl}$ % of the second outer cladding portion 243 is greater than the relative refractive index $\Delta_{lit}$ % of the second low-index trench 244 (i.e., $\Delta_{ocl}$ %>$\Delta_{lit}$ %). In some embodiments, the relative refractive index $\Delta_{ocl}$ % of the second outer cladding portion 243 may be greater than the relative refractive index $\Delta_{icl}$ % of the second inner cladding portion 245, such as when the second inner cladding portion 245 comprises silica glass down-doped with one or more down-dopants which decrease the index of refraction $n_{icl}$ of the second inner cladding portion 245 relative to the index of refraction $n_{ocl}$ of the second outer cladding portion 243. In other embodiments, the relative refractive index $\Delta_{ocl}$ % of the second outer cladding portion 243 may be substantially equal to the relative refractive index $\Delta_{icl}$ % of the second inner cladding portion 245. In such embodiments, the composition of the second outer cladding portion 243 may be the same as the composition of the second inner cladding portion 245 or different than the composition of the second inner cladding portion 245, so long as $\Delta_{ocl}$ %=$\Delta_{icl}$ %. Based on the foregoing, it should be understood that the relative refractive index $\Delta_{ocl}$ % of the second outer cladding portion 243 is greater than or substantially equal to the relative refractive index $\Delta_{icl}$ % of the second inner cladding portion 245. In embodiments, the second outer cladding portion 243 is made from the same material as the first outer cladding portion 223, and as such, the refractive index $n_{ocl}$ of the second outer cladding portion 243 may be substantially equal to the refractive index $n_{OCL}$ of the first outer cladding portion 223 (i.e., $n_{ocl}=n_{OCL}$) and the relative refractive index $\Delta_{ocl}$ % of the second outer cladding portion 243 may be substantially equal to the relative refractive index $\Delta_{OCL}$ % of the first outer cladding portion 223, (i.e., $\Delta_{ocl}$ %=$\Delta_{OCL}$ %=0).

The first low-index core region 214 of the first segment 210 and the second low-index core region 234 of the second segment 230 comprise silica glass with one or more down-dopants which decrease the index of refraction of silica glass, for example and without limitation, F, B, combinations thereof, or the like. In embodiments, at least one of the first low-index core region 214 and the second low-index core region 234 may comprise F in a concentration between about 0.1 wt. % to about 2.5 wt. %. In some embodiments, at least one of the first low-index core region 214 and the second low-index core region 234 comprise F in a concentration between about 0.1 wt. % to about 1.8 wt. %. In some other embodiments, at least one of the first low-index core region 214 and the second low-index core region 234 comprise F in a concentration between about 0.1 wt. % to about 1.5 wt. %. In still other embodiments, at least one of the first low-index core region 214 and the second low-index core region 234 comprise F in a concentration between about 0.5 wt. % to about 1.8 wt. %. In still yet other embodiments, at least one of the first low-index core region 214 and the second low-index core region 234 comprise F in a concentration between about 0.7 wt. % to about 1.8 wt. %.

The first annular core region 213 of the first segment 210 and the second annular core region 233 of the second segment 230 comprise silica glass with one or more up-dopants which increase the index of refraction of silica glass. Suitable up-dopants include, for example and without limitation, Ge, Ti, Al, Cl, P, $GeO_2$, $TiO_2$, $P_2O_5$, and various combinations thereof. In embodiments, at least one of the first annular core region 213 and the second annular core region 233 contain between about 3 wt. % to about 17 wt. % $GeO_2$. In some other embodiments, at least one of the first annular core region 213 and the second annular core region 233 contain between about 5 wt. % to about 13 wt. % $GeO_2$. In embodiments, the first annular core region 213 and the second annular core region 233 are made from the same materials and the dopant concentration in the first annular core region 213 is substantially equal to the dopant concentration in the second annular core region 233.

The first inner cladding 225 of the first segment 210 and the second inner cladding portion 245 of the second segment 230 may comprise pure silica glass, silica glass with one or more up-dopants which increase the index of refraction of silica glass, or silica glass with one or more down-dopants that decrease the index of refraction of silica glass. Non-limiting examples of suitable up-dopants include Ge, Ti, Al, Cl, P, $GeO_2$, $TiO_2$, $P_2O_5$, combinations thereof or the like. In embodiments, at least one of the first inner cladding 225 and the second inner cladding 245 contain Cl as an up-dopant. Non-limiting examples of suitable down-dopants include F, B, combinations thereof, or the like. In embodiments, at least one of the first inner cladding 225 and the second inner cladding 245 contain F as a down-dopant.

As discussed in relation to expressions (32) and (33) above, the radial thickness of a particular glass portion of an optical fiber may be interrelated with a relative refractive index of the particular glass portion. In the embodiments described herein, the trench volume $V_{LIT}$ of the first low-index trench 224 may be greater than or equal to about 80%-$\mu m^2$, such as greater than or equal to about 100%-$\mu m^2$. In some embodiments, the trench volume $V_{LIT}$ may be greater than or equal to about 110%-$\mu m^2$ or even greater than or equal to about 120%-$\mu m^2$. In some embodiments, the trench volume $V_{LIT}$ may be greater than or equal to about 80%-$\mu m^2$ and less than or equal to about 220%-$\mu m^2$. In some embodiments, the trench volume $V_{LIT}$ may be greater than or equal to about 100%-$\mu m^2$ and less than or equal to about 200%-$\mu m^2$. In still other embodiments, the trench volume profile $V_{LIT}$ may be greater than or equal to about 110%-$\mu m^2$ and less than or equal to about 180%-$\mu m^2$.

In the embodiments described herein, the trench volume $v_{lit}$ of the second low-index trench 244 may be greater than or equal to about 40%-$\mu m^2$, such as greater than or equal to about 50%-$\mu m^2$. In some embodiments, the trench volume $v_{lit}$ may be greater than or equal to about 55%-$\mu m^2$ or even greater than or equal to about 60%-$\mu m^2$. In some embodiments, the trench volume $v_{lit}$ may be greater than or equal to about 40%-$\mu m^2$ and less than or equal to about 110%-$\mu m^2$. In some embodiments, the trench volume $v_{lit}$ may be greater than or equal to about 50%-$\mu m^2$ and less than or equal to about 100%-$\mu m^2$. In still other embodiments, the trench volume profile $v_{lit}$ may be greater than or equal to about 55%-$\mu m^2$ and less than or equal to about 90%-$\mu m^2$.

In the embodiments of the optical fibers described herein, the first low-index trench 224, the second low-index trench 244, or both the first low-index trench 224 and the second low-index trench 244, comprise silica glass with one or more down-dopants which decrease the index of refraction of silica glass. Non-limiting examples of down-dopants include F, B, combinations thereof, or the like. In embodiments, at least one of the first low-index trench 224 and the second low-index trench 244 comprise F in a concentration between about 0.1 wt. % to about 2.5 wt. %. In some embodiments, at least one of the first low-index trench 224 and the second low-index trench 244 comprise F in a concentration between about 0.1 wt. % to about 1.8 wt. %. In other embodiments, at least one of the first low-index trench 224 and the second low-index trench 244 comprise F in a concentration between about 0.1 wt. % to about 1.5 wt. %. In still other embodiments, at least one of the first low-index trench 224 and the second low-index trench 244 comprise F in a concentration between about 0.5 wt. % to about 1.8 wt. %. In still yet other embodiments, at least one of the first low-index trench 224 and the second low-index trench 244 comprise F in a concentration between about 0.7 wt. % to about 1.8 wt. %.

In some embodiments, at least one of the relative refractive index $\Delta_{LIC}$ % of the first low-index core region 214, the relative refractive index $\Delta_{LIT}$ % of the first low-index trench 224, the relative refractive index $\Delta_{lic}$ % of the second low-index core region 234 and the relative refractive index $\Delta_{lit}$ % of the second low-index trench 244 is achieved by forming the silica glass of at least one of the first low-index core region 214, the first low-index trench 224, the second low-index core region 234 and the second low-index trench 244, respectively, with voids which are either non-periodically disposed, or periodically disposed, or both, throughout the silica glass. The voids are stretched (elongated) along the length (i.e. parallel to the longitudinal axis) of the optical fiber 200, but do not extend the entire length of the entire fiber. While not wishing to be bound by theory, it is believed that the voids extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. In some embodiments, these voids may contain one or more gases, such as argon, krypton, $CO_2$, $SO_2$, $O_2$, or mixtures thereof. In some other embodiments, the voids are substantially free of gas. Regardless of the presence or absence of gas, at least one of the refractive index $n_{LIC}$ of the first low-index core region 214, the refractive index $n_{LIT}$ of the first low-index trench 224, the refractive index $n_{lic}$ of the second low-index core region 234 and the refractive index $n_{lit}$ of the second low-index trench 244 are decreased due to the presence of the voids. Alternatively or additionally, at least one of the $n_{LIC}$ of the first low-index core region 214, the refractive index $n_{LIT}$ of the first low-index trench 224, the refractive index $n_{lic}$ of the second low-index core region 234 and the refractive index $n_{lit}$ of the second low-index trench 244 is decreased by forming a down-doped silica glass with a non-periodic, periodic, or both a non-periodic and periodic distribution of voids, as described herein.

The relative refractive index $\Delta_{LIT}$ % of the first low-index trench 224 is less than the relative refractive index $\Delta_{ICL}$ % of the first inner cladding portion 225 (i.e., $\Delta_{LIT}$ %<$\Delta_{ICL}$ %) and less than the relative refractive index $\Delta_{OCL}$ % of the first outer cladding portion 223 (i.e., $\Delta_{LIT}$ %<$\Delta_{OCL}$ %). In some embodiments, the relative refractive index $\Delta_{ICL}$ % is substantially equal to the relative refractive index $\Delta_{OCL}$ % and $\Delta_{LIT}$ %<$\Delta_{ICL}$ %=$\Delta_{OCL}$ %. In other embodiments, the relative refractive index $\Delta_{ICL}$ % is less than the relative refractive index $\Delta_{OCL}$ % and $\Delta_{LIT}$ %<$\Delta_{ICL}$ %<$\Delta_{OCL}$ %.

The relative refractive index $\Delta_{lit}$ % of the second low-index trench 244 is less than the relative refractive index $\Delta_{icl}$ % of the second inner cladding portion 245 (i.e., $\Delta_{lit}$ %<$\Delta_{icl}$ %) and less than the relative refractive index $\Delta_{ocl}$ % of the second outer cladding portion 243 (i.e., $\Delta_{lit}$ %<$\Delta_{ocl}$ %). In some embodiments, the relative refractive index $\Delta_{icl}$ % is substantially equal to the relative refractive index $\Delta_{ocl}$ % and $\Delta_{lit}$ %<$\Delta_{icl}$ %=$\Delta_{ocl}$ %. In other embodiments, the relative refractive index $\Delta_{icl}$ % is less than the relative refractive index $\Delta_{ocl}$ % and $\Delta_{lit}$ %<$\Delta_{icl}$ %<$\Delta_{ocl}$ %. In embodiments where the second low-index trench 244, the second inner cladding portion 245 and the second outer cladding portion 243 are made from the same materials as the first low-index trench 224, the first inner cladding portion 225 and the first outer cladding portion 223, respectively, it should be appreciated that the relative refractive index $\Delta_{lit}$ % may be substantially equal to the relative refractive index $\Delta_{LIT}$ % (i.e., $\Delta_{lit}$ %=$\Delta_{LIT}$ %), the relative refractive index $\Delta_{icl}$ % may be substantially equal to the relative refractive index $\Delta_{ICL}$ % (i.e., $\Delta_{icl}$ %=$\Delta_{ICL}$ %) and the relative refractive index $\Delta_{ocl}$ % may be substantially equal to the relative refractive index $\Delta_{OCL}$ % (i.e., $\Delta_{ocl}$ %=$\Delta_{OCL}$ %). Also, in embodiments where the relative refractive index $\Delta_{ICL}$ % is substantially equal to the relative refractive index $\Delta_{OCL}$ %, then $\Delta_{lit}$ %<$\Delta_{ICL}$ %=$\Delta_{OCL}$ % and $\Delta_{LIT}$ %<$\Delta_{icl}$ %=$\Delta_{ocl}$ %. In embodiments where the relative refractive index $\Delta_{ICL}$ % is less than the relative refractive index $\Delta_{OCL}$ %, then $\Delta_{lit}$ %<$\Delta_{ICL}$ %<$\Delta_{OCL}$ % and $\Delta_{LIT}$ %<$\Delta_{icl}$ %<$\Delta_{ocl}$ %.

The first outer cladding 223 of the first segment 210 and the second outer cladding 243 of the second segment 230 may comprise pure silica glass, silica glass with one or more up-dopants which increase the index of refraction of silica glass, or silica glass with one or more down-dopants that decrease the index of refraction of silica glass. Non-limiting examples of suitable up-dopants include Ge, Ti, Al, Cl, P, $GeO_2$, $TiO_2$, $P_2O_5$, combinations thereof or the like. In embodiments, at least one of the first outer cladding 223 and the second outer cladding 243 contain Cl as an up-dopant. Non-limiting examples of suitable down-dopants include F, B, combinations thereof, or the like. In embodiments, at least one of the first outer cladding 223 and the second outer cladding 243 contain F as a down-dopant.

The various embodiments of the optical fiber 200 described herein have improved bend performance due to the incorporation of the first low-index trench 224 within the first cladding portion 222 and the second low-index trench 244 within the second cladding portion 242. Macrobend performance of the optical fiber 200 may be determined according to FOTP-62 (JEC-60793-1-47) as described above.

In embodiments, the optical fiber 200 is manufactured using a conventional fiber manufacturing process to make a fiber preform having a desired structure. Non-limiting examples of processes used to make the fiber preform include outside vapor deposition (OVD), modified chemical vapor deposition (MCVD), physical chemical vapor deposition (PCVD), or the like. Once formed, the fiber preform is drawn into a fiber having the dimensions of the first segment 210. The fiber having the dimensions of the first segment 210 is clamped and a portion of the fiber is further drawn down to the dimensions of the second segment 230 with the transition region 250 positioned between the first segment 210 and the second segment 230.

For example, in one embodiment, the optical fiber 200 may be initially formed such that the optical fiber 200 initially has the first low-index core region 214, first annular core region 213, first inner cladding portion 225, first low-index trench 224 and first outer cladding portion 223. The optical fiber 200 may then be clamped and a portion of the fiber heated and further drawn to create an optical fiber having the first segment 210 with the first low-index core region 214, first annular core region 213, first inner cladding portion 225, first low-index trench 224 and first outer cladding portion 223, and a second segment 230 having the second low-index core region 234, the second annular core region 233, the second inner cladding portion 245, second low-index trench 244 and second outer cladding portion 243. In this procedure, further drawing the optical fiber reduces the dimensions of the second segment 230 of the optical fiber 200 relative to the first segment 210. In particular, the dimensions of the second low-index core region 234 are significantly reduced relative to the first low-index core region 214. In another embodiment, the optical fiber 200 may be formed from splicing the first segment 210 and the second segment 230 together. In such an embodiment, it is understood that the outer diameter $D_0$ of the first segment 210 and the outer diameter $d_0$ of the second segment 230 may be generally equal to each other so long as the first core portion 212, second core portion 232, first cladding portion 222 and second cladding portion 242 have the attributes and properties discussed above.

Referring to FIGS. 1A, 7 and 9, the optical fiber 200 may be used to transform a Gaussian laser beam into a Bessel laser beam. In these embodiments $F_D$ value of the Bessel laser beam BLB is at least 10. For example, $F_D$ value of at least 50, at least 100, at least 250, at least 500, at least 1000, in the range from 10 to 2000, in the range from 50 to 1500, or in the range from 100 to 1000.

Specifically, a Gaussian laser beam GLB is optically coupled to an inlet end 231 of the optical fiber 200 and propagates through the second segment 230 towards the first segment 210. The Gaussian laser beam GLB may be incident on the second low-index core region 234. It is understood that the Gaussian laser beam GLB seeks to propagate through a high-index region rather than a low-index region. Also, as the radius of the second low-index core region 234 increases in size (radius) as it transitions into the first low-index core region 214, the Gaussian laser beam GLB propagating in the first low-index core region 214 decreases in intensity. A combination of the Gaussian laser beam GLB seeking to propagate through a high-index region and its intensity decreasing as it propagates through the first low-index core region 214 results in the Gaussian laser beam GLB penetrating through the first low-index core region 214 and propagating through the first annular core region 213 such that a ring-shaped beam RSB is formed and the light exits the optical fiber 200 through an outlet end 211 either as: (a) a ring-shaped beam if the outlet end 211 of the fiber has no optical focusing power (e.g., if it is planar), or (b) as a Bessel laser beam, if the outlet end 211 has a fiber lens directly formed on the outlet end 211, or if such lens is attached to the outlet end 211 (not shown). The Gaussian laser beam GLB can be coupled to the inlet end 231 of the optical fiber 200 through a lens system (not shown), direct butt-coupling (not shown) or fusion splicing (not shown). As stated above, the ring-shaped laser beam (RSB) exiting the outlet end 211 of the optical fiber 200 can be focused with free space bulk optics (not shown) or a fiber lens directly formed or attached to the outlet end 211 (not shown), forming the Bessel laser beam BLB.

Figure 1B:
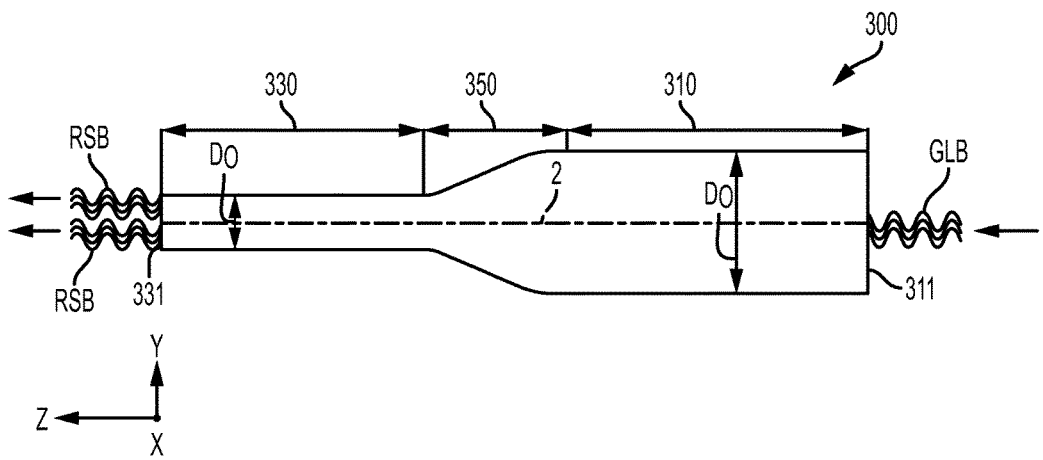
FIG. 1B schematically depicts a side view of an optical fiber according to one or more embodiments shown and described herein.
Figure 10:
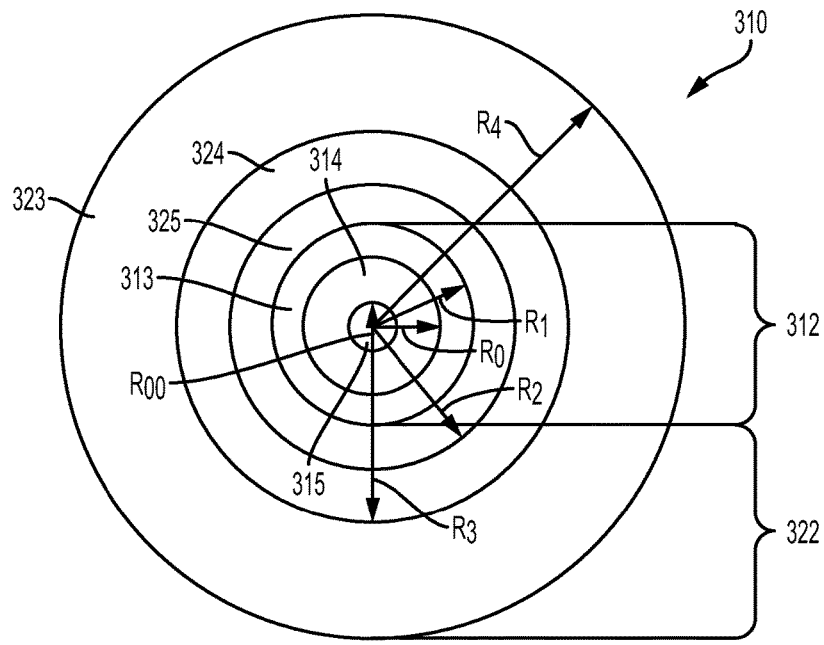
FIG. 10 schematically depicts a radial cross section of a first segment of the optical fiber of FIG. 1B according to one or more embodiments shown and described herein.
Figure 11:
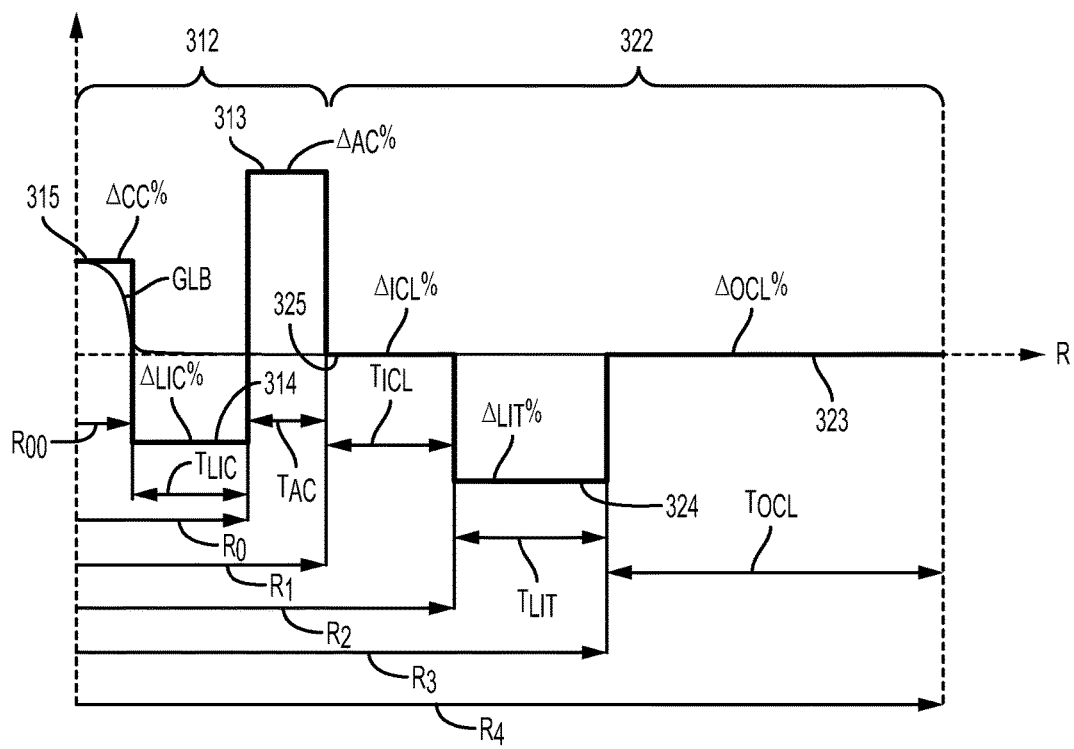
FIG. 11 graphically depicts the relative refractive index profile of the first segment of the optical fiber of FIG. 10 as a function of the radius R of the glass portion of the optical fiber according to one or more embodiments shown and described herein.
Figure 12:
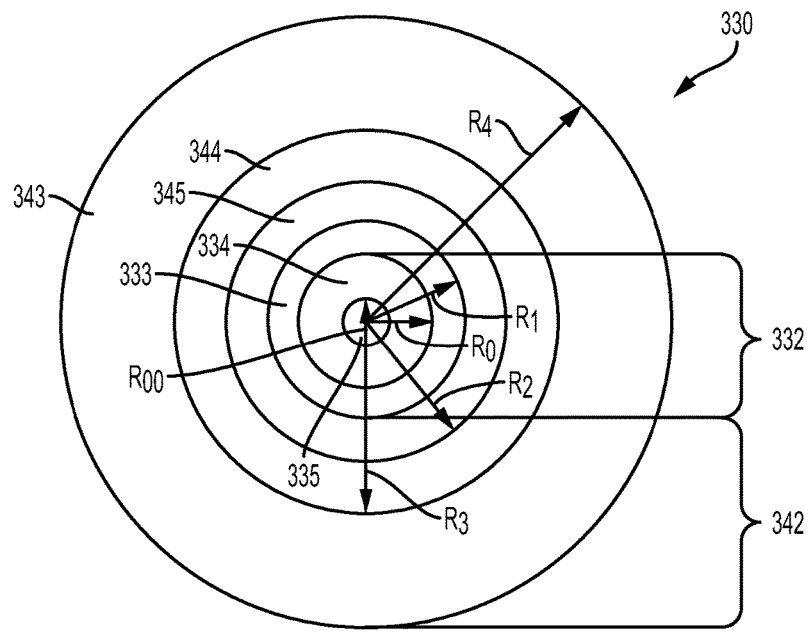
FIG. 12 schematically depicts a radial cross section of a second segment of the optical fiber of FIG. 1B according to one or more embodiments shown and described herein.
Figure 13:
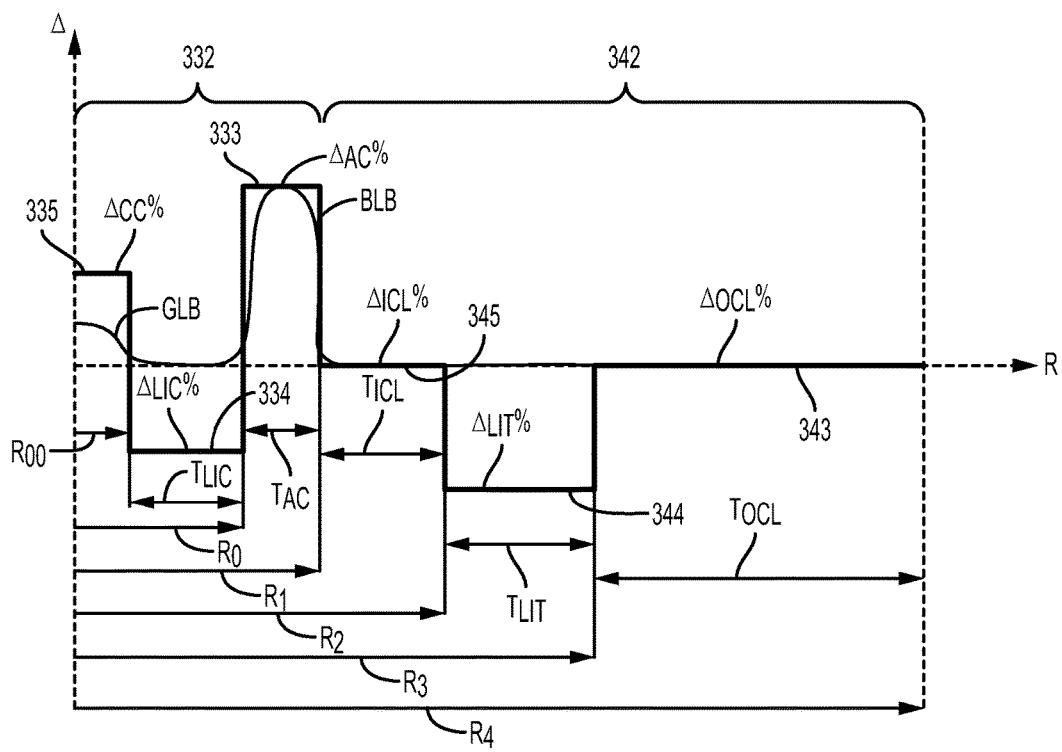
FIG. 13 graphically depicts the relative refractive index profile of the second segment of the optical fiber of FIG. 12 as a function of the radius r of the glass portion of the optical fiber according to one or more embodiments shown and described herein.

Referring to FIGS. 1B and 10-13, an embodiment of an optical fiber 300 with a first segment 310 optically coupled to a second segment 330 with a transition region 350 is shown. The optical fiber 300 may be similar to the optical fiber 200 except a first core portion of the first segment 310 and a second core portion of the second segment 330 have a double core configuration. Particularly, the first core portion of the first segment 310 and the second core portion of the second segment 330 may include a central core region positioned within and spaced apart from an annular core region by a low-index core region. A side view of at least a portion of the optical fiber 300 is shown in FIG. 1B, radial cross sections of the first segment 310 and the second segment 330 of the optical fiber 300 are shown in FIGS. 10 and 12, respectively, and corresponding relative refractive index profiles for the first segment 310 and second segment 330 are shown in FIGS. 11 and 13, respectively. The first segment 310 has a first outer diameter '$D_0$' and the second segment 330 has a second outer diameter '$d_0$' (FIG. 1B). The first outer diameter $D_0$ is greater than the second outer diameter $d_0$. In embodiments, the first outer diameter $D_0$ may be from about 0.2 millimeters (mm) to about 5.0 mm, the second outer diameter $d_0$ may be from about 0.1 to about 4.5 mm, and the length of the transition region 350 may be from about 0.5 mm to about 20 mm. In embodiments, the first outer diameter $D_0$ is from about 0.4 mm to about 1.0 mm, the second outer diameter $d_0$ is from about 0.2 mm to about 0.9 mm, and the length of the transition region 350 is from about 1 mm to about 10 mm. In other embodiments, the first outer diameter $D_0$ is from about 150 μm to about 350 μm, the second outer diameter $d_0$ is from about 75 μm to about 225 μm, and the length of the transition region 350 is greater than 10 mm. A Gaussian laser beam GLB propagating through the second segment 330 is converted into a ringed-shaped beam RSB propagating through the first segment 310. In embodiments, the first segment 310, second segment 330 and transition region 350 are integrally formed with one another and the taper ratio ($d_0/D_0$) of the optical fiber 300 is greater than or equal to about 0.2 and less than or equal to about 0.9. In other embodiments, the taper ratio of the optical fiber 300 is greater than or equal to about 0.3 and less than or equal to 0.9. In still other embodiments, the taper ratio of the optical fiber 300 is greater than or equal to 0.3 and less than or equal to 0.8. The first segment 310 (FIGS. 10 and 11) of the optical fiber 300 has a first core portion 312 centered on the axial centerline 2 of the optical fiber 300. The first core portion 312 may include a first annular core region 313. A first cladding portion 322 may extend around the first core portion 312. The second segment 330 (FIGS. 12 and 13) of the optical fiber 300 may have a second core portion 332 and at least a portion of the second core portion 332 is optically coupled to the first core portion 312. A second cladding portion 342 may extend around the second core portion 332.

Referring to FIGS. 1B, 10 and 11, a radial cross section of the first segment 310 of the optical fiber 300 of FIG. 1B is schematically depicted in FIG. 10 and the relative refractive index of the radial cross section relative to the centerline of the cross section is graphically depicted in FIG. 11. The first segment 310 generally includes a first core portion 312 and a first cladding portion 322. The first core portion 312 is positioned within the first cladding portion 322 with the first cladding portion 322 extending around the first core portion 312. The first core portion 312 and the first cladding portion 322 may be generally concentric such that a cross section of the first segment 310 of the optical fiber 300 is generally circular symmetric with respect to the center of the first core portion 312 of the optical fiber 300. Also, the first core portion 312 and the first cladding portion 322 may be generally axisymmetric with respect to the center of the first core portion 312 of the optical fiber 300. In embodiments, the first core portion 312 may include a first annular core region 313, a first low-index core region 314 and a first central core region 315. The first low-index core region 314 is positioned within the first annular core region 313 and the first central core region 315 is positioned within the first low-index core region 314. The first central core region 315 is spaced apart from the first annular core region 313 by the first low-index core region 314 as depicted in FIG. 10. In embodiments, the first low-index core region 314 is directly adjacent to and in direct contact with the first annular core region 313 and the first central core region 315 is directly adjacent to and in direct contact with the first low-index core region 314.

In some embodiments, the first cladding portion 322 may optionally include a first low-index trench 324 and a first outer cladding portion 323. The first low-index trench 324 is positioned within the first outer cladding 323 and the first low-index trench 324 may be directly adjacent to and in direct contact with the first outer cladding 323. The first low-index trench 324, when included, improves the bend performance of the optical fiber 300. That is, the first low-index trench 324 reduces attenuation of light propagating in the optical fiber 300 when the optical fiber 300 is coiled, thereby permitting the optical fiber 300 to be coiled to a tighter (i.e., smaller) radius without increasing the attenuation of light propagating in the optical fiber 300 relative to an optical fiber having a similar structure without the first low-index trench 324.

In some embodiments (not depicted), the first low-index trench 324 may be directly adjacent to and in direct contact with the first core portion 312. In some other embodiments, such as the embodiment depicted in FIGS. 10 and 11, the first low-index trench 324 may be spaced apart from the first core portion 312 by a first inner cladding portion 325, i.e., the first inner cladding portion 325 is positioned within the first low-index trench 324 between the first low-index trench 324 and the first core portion 312. In embodiments, the first inner cladding portion 325 is directly adjacent to and in direct contact with the first low-index trench 324 and the first annular core region 313.

The first segment 310 has a radius $R_4$ from the axial centerline 2 of the optical fiber 300. The first core portion 312 has a radius $R_1$ that is less than the radius $R_4$. The first central core region 315 has a radius $R_{00}$. The first low-index core region 314 has an inner radius $R_{00}$, an outer radius $R_0$ and a radial thickness $T_{LIC}=R_0-R_{00}$. The first annular core region 313 has an inner radius $R_0$, an outer radius $R_1$ and a radial thickness $T_{AC}=R_1-R_0$. The radii $R_{00}$, $R_0$ and $R_1$ of the first central core region 315, first low-index core region 314 and first annular core region 313, respectively, are defined at the points at which the lines tangent to the maximum slopes of the relative refractive index profile (FIG. 11) of the first central core region 315, first low-index core region 314 and first annular core region 313, respectively, cross the reference relative refractive index line $\Delta_{OCL}$ %. The first cladding portion 322 has an inner radius $R_1$, an outer radius $R_4$ and a radial thickness $T_{CL}=R_4-R_1$. In embodiments where the first cladding portion 322 includes the first low-index trench 324 and the first outer cladding portion 323, the first low-index trench 324 has an inner radius $R_2$, an outer radius $R_3$ and a radial thickness $T_{LIT}=R_3-R_2$. The first outer cladding portion 323 has an inner radius $R_3$, an outer radius $R_4$ and a radial thickness $T_{OCL}=R_4-R_3$. In embodiments (not depicted) where the first low-index trench 324 is directly adjacent to and in direct contact with the first core portion 312, the inner radius $R_2$ of the first low-index trench 324 may be equal to the radius $R_1$ of the first core portion 312. In embodiments where the first low-index trench 324 is spaced apart from the first core portion 312 by the first inner cladding portion 325, the first inner cladding portion 325 has an inner radius $R_1$, an outer radius $R_2$ and a radial thickness $T_{ICL}=R_2-R_1$.

The radius $R_4$ of the first segment 310 is from about 50 µm to about 250 µm. In some embodiments, the radius $R_4$ of the first segment 310 is from about 100 µm to about 150 µm. The radius $R_1$ of the first core portion 312 is from about 5 µm to about 40 µm. In some embodiments, the radius $R_1$ is from about 10 µm to about 35 µm. The radial thickness $T_{CL}$ ($R_4-R_1$) of the first cladding portion 322 is from about 75 µm to about 175 µm. In some embodiments the radial thickness $T_{CL}$ is from about 85 µm to about 150 µm. The radius $R_{00}$ of the first central core region 315 is from about 1 µm to about 15 µm. In some embodiments, the radius $R_{00}$ of the first central core region 315 is from about 2 µm to about 10 µm. The inner radius $R_{00}$ of the first low-index core region 314 is from about 1 µm to about 15 µm, the outer radius $R_0$ is from about 2 µm to about 30 µm and the radial thickness $T_{LIC}$ is from about 1 µm to about 20 µm. In some embodiments, the inner radius $R_{00}$ is from about 2 µm to about 10 µm, the outer radius $R_0$ is from about 5 µm to about 25 µm and the radial thickness $T_{LIC}$ is from about 2.5 µm to about 17.5 µm. The inner radius $R_0$ of the first annular core region 313 is from about 2 µm to about 30 µm, the outer radius $R_1$ is from about 5 µm to about 40 µm and the radial thickness $T_{AC}$ of the first annular core region 313 is from about 2 µm to about 20 µm. In embodiments, the inner radius $R_0$ is from about 5 µm to about 25 µm, the outer radius $R_1$ is from about 10 µm to about 35 µm and the radial thickness $T_{AC}$ is from about 2.5 µm to about 15 µm. In embodiments where the first cladding portion 322 includes the first low-index trench 324 and the first outer cladding portion 323, the inner radius $R_2$ of the first low-index trench 324 is from about 10 µm to about 50 µm, the outer radius $R_3$ is from about 15 µm to about 65 µm and the radial thickness $T_{LIT}$ ($R_3-R_2$) is from about 1 µm to about 40 µm. In embodiments, the inner radius $R_2$ is from about 15 µm to about 40 µm, the outer radius $R_3$ is from about 25 µm to about 55 µm and the radial thickness $T_{LIT}$ is from about 1 µm to about 35 µm. The inner radius $R_3$ of the first outer cladding portion 323 is from about 15 µm to about 65 µm, the outer radius $R_4$ is from about 50 µm to about 250 µm and the radial thickness $T_{OCL}$ ($R_4-R_3$) is from about 50 µm to about 150 µm. In embodiments, the inner radius $R_3$ is from about 25 µm to about 55 µm, the outer radius $R_4$ is from about 100 µm to about 150 µm and the radial thickness $T_{OCL}$ is from about 60 µm to about 125 µm. In embodiments where the first low-index trench 324 is spaced apart from the first core portion 312 by the first inner cladding portion 325, the inner radius $R_1$ of the first inner cladding portion 325 is from about 5 µm to about 40 µm, the outer radius $R_2$ is from about 10 µm to about 50 µm and the radial thickness $T_{ICL}$ ($R_2-R_1$) is from about 1 µm to about 15 µm. In embodiments, the inner radius $R_1$ is from about 10 µm to about 35 µm, the outer radius $R_2$ is from about 15 µm to about 40 µm and the radial thickness $T_{ICL}$ is from about 1 µm to about 10 µm.

Referring to FIGS. 1B, 12 and 13, a radial cross section of the second segment 330 of the optical fiber 300 of FIG. 1B is schematically depicted in FIG. 12 and the relative refractive index of the radial cross section relative to the centerline of the cross section is graphically depicted in FIG. 13. The second segment 330 generally includes a second core portion 332 and a second cladding portion 342. The second core portion 332 is positioned within the second cladding portion 342 with the second cladding portion 342 extending around the second core portion 332. The second core portion 332 and the second cladding portion 342 may be generally concentric such that a cross section of the second segment 330 of the optical fiber 300 is generally circular symmetric with respect to the center of the second core portion 332 of the optical fiber 300. Also, the second core portion 332 and the second cladding portion 342 may be generally axisymmetric with respect to the center of the second core portion 332 of the optical fiber 300. In embodiments, the second core portion 332 may include a second annular core region 333, a second low-index core region 334 and a second central core region 335. The second low-index core region 334 is positioned within the second annular core region 333 and the second central core region 335 is positioned within the second low-index core region 334. The second central core region 335 is spaced apart from the second annular core region 333 by the second low-index core region 334 as depicted in FIG. 12. In embodiments, the second low-index core region 334 is directly adjacent to and in direct contact with the second annular core region 333 and the second central core region 335 is directly adjacent to and in direct contact with the second low-index core region 334.

In some embodiments, the second cladding portion 342 may optionally include a second low-index trench 344 and a second outer cladding portion 343. The second low-index trench 344 is positioned within the second outer cladding 343 and the second low-index trench 344 may be directly adjacent to and in direct contact with the second outer cladding 343. The second low-index trench 344, when included, improves the bend performance of the optical fiber 300. That is, the second low-index trench 344 reduces attenuation of light propagating in the optical fiber 300 when the optical fiber 300 is coiled, thereby permitting the optical fiber 300 to be coiled to a tighter (i.e., smaller) radius without increasing the attenuation of light propagating in the optical fiber 300 relative to an optical fiber having a similar structure without the second low-index trench 344. It should be understood that, when the first segment 310 of the optical fiber 300 includes the first low-index trench 324, the second segment 330 of the optical fiber 300 will include a second low-index trench 344 and vice-versa.

In some embodiments (not depicted), the second low-index trench 344 may be directly adjacent to and in direct contact with the second core portion 332. In some other embodiments, the second low-index trench 344 may be spaced apart from the second core portion 332 by a second inner cladding portion 345 as depicted in FIGS. 12 and 13. That is, the second inner cladding portion 345 is positioned within the second low-index trench 344 and is positioned between the second low-index trench 344 and the second core portion 332. In embodiments, the second inner cladding portion 345 is directly adjacent to and in direct contact with the second low-index trench 344 and the second annular core region 333.

Referring to FIGS. 1B and 10-13, it should be appreciated that the first core portion 312 is optically coupled with the second core portion 332 and the first cladding portion 322 is optically coupled to the second cladding portion 342 through the transition region 350. Particularly, the first central core region 315 is optically coupled to the second central core region 335, the first low-index core region 314 is optically coupled to the second low-index core region 334, the first annular core region 313 is optically coupled to the second annular core region 333, the first outer cladding portion 323 is optically coupled to the second outer cladding portion 343, the first low-index trench 324 is optically coupled to the second low-index trench 344, and the first inner cladding portion 325 is optically coupled to the second inner cladding portion 345 through the transition region 350.

The second segment 330 has a radius $r_4$ from the axial centerline 2 of the optical fiber 300. The second core portion 332 has a radius $r_1$ that is less than the radius $r_4$. The second central core region 335 has a radius $r_{00}$. The second low-index core region 334 has an inner radius $r_{00}$, an outer radius $r_0$ and a radial thickness $t_{lic}=r_0-r_{00}$. The second annular core region 333 has an inner radius $r_0$, an outer radius $r_1$ and a radial thickness $t_{ac}=r_1-r_0$. The radii $r_{00}$, $r_0$ and $r_1$ of the second central core region 335, second low-index core region 334 and second annular core region 333 are defined at the points at which the lines tangent to the maximum slope of the relative refractive index profile (FIG. 13) of the second central core region 335, second low-index core region 334 and second annular core region 333, respectively, cross the reference relative refractive index line $\Delta_{ocl}$ %. The second cladding portion 342 has an inner radius $r_1$, an outer radius $r_4$ and a radial thickness $t_{cl}=r_4-r_1$. In embodiments where the second cladding portion 342 includes the second low-index trench 344 and the second outer cladding portion 343, the second low-index trench 344 has an inner radius $r_2$, an outer radius $r_3$ and a radial thickness $t_{lit}=r_3-r_2$. The second outer cladding portion 343 has an inner radius $r_3$, an outer radius $r_4$ and a radial thickness $t_{ocl}=r_4-r_3$. In embodiments (not depicted) where the second low-index trench 344 is directly adjacent to and in direct contact with the second core portion 332, the inner radius $r_2$ of the second low-index trench 344 may be equal to the radius $r_1$ of the second core portion 332. In embodiments where the second low-index trench 344 is spaced apart from the second core portion 332 by the second inner cladding portion 345, the second inner cladding portion 345 has an inner radius $r_1$, an outer radius $r_2$ and a radial thickness $t_{icl}=r_2-r_1$.

The radius $r_4$ of the second segment 330 is from about 30 μm to about 80 μm. In some embodiments, the radius $r_4$ of the second segment 330 is from about 40 μm to about 70 μm. The radius $r_1$ of the second core portion 332 is from about 3 μm to about 20 μm. In some embodiments, the radius $r_1$ is from about 5 μm to about 17.5 μm. The radial thickness $t_{cl}$ ($r_4-r_1$) of the second cladding portion 242 is from about 25 μm to about 70 μm. In some embodiments the radial thickness $t_{cl}$ is from about 35 μm to about 60 μm. The radius $r_{00}$ of the second central core region 335 is from about 0.5 μm to about 7.5 μm. In some embodiments, the radius $r_{00}$ of the second central core region 335 is from about 1 μm to about 5 μm. The inner radius $r_{00}$ of the second low-index core region 334 is from about 0.5 μm to about 7.5 μm, the outer radius $r_0$ is from about 2 μm to about 15 μm and the radial thickness $t_{lic}$ is from about 1 μm to about 10 μm. In some embodiments, the inner radius $r_{00}$ is from about 1 μm to about 5 μm, the outer radius $r_0$ is from about 3 μm to about 12 μm and the radial thickness $t_{lic}$ is from about 2 μm to about 7.5 μm. The inner radius $r_0$ of the second annular core region 333 is from about 2 μm to about 15 μm, the outer radius $r_1$ is from about 3 μm to about 20 μm and the radial thickness $t_{ac}$ of the second annular core region 333 is from about 1 μm to about 10 μm. In some embodiments, the inner radius $r_0$ is from about 3 μm to about 12 μm, the outer radius $r_1$ is from about 5 μm to about 17.5 μm and the radial thickness $t_{ac}$ is from about 2 μm to about 7 μm. In embodiments where the second cladding portion 342 includes the second low-index trench 344 and the second outer cladding portion 343, the inner radius $r_2$ of the second low-index trench 344 is from about 5 μm to about 25 μm, the outer radius $r_3$ is from about 7 μm to about 30 μm and the radial thickness $t_{lit}$ ($r_3-r_2$) is from about 1 μm to about 20 μm. In some embodiments, the inner radius $r_2$ is from about 7 μm to about 20 μm, the outer radius $r_3$ is from about 10 μm to about 25 μm and the radial thickness $t_{lit}$ is from about 1 μm to about 15 μm. The inner radius $r_3$ of the second outer cladding portion 343 is from about 7 μm to about 30 μm, the outer radius $r_4$ is from about 30 μm to about 80 μm and the radial thickness $t_{ocl}$ ($r_4-r_3$) is from about 20 μm to about 70 μm. In some embodiments, the inner radius $r_3$ is from about 10 μm to about 25 μm, the outer radius $r_4$ is from about 40 μm to about 70 μm and the radial thickness $t_{ocl}$ is from about 25 μm to about 65 μm. In embodiments where the second low-index trench 344 is spaced apart from the second core portion 332 by the second inner cladding portion 345, the inner radius $r_1$ of the second inner cladding portion 345 is from about 3 μm to about 20 μm, the outer radius $r_2$ is from about 5 Ξm to about 25 μm and the radial thickness $t_{icl}$ ($r_2-r_1$) is from about 1 μm to about 7.5 μm. In embodiments, the inner radius $r_1$ is from about 5 μm to about 17.5 μm, the outer radius $r_2$ is from about 7 μm to about 20 μm and the radial thickness $t_{icl}$ is from about 1 μm to about 5 μm.

The first central core region 315 of the first segment 310 has a refractive index $n_{CC}$ and a relative refractive index $\Delta_{CC}$ %, and the second central core region 335 of the second segment 330 has a refractive index $n_{cc}$ and a relative refractive index $\Delta_{cc}$ %. In embodiments, the first central core region 315 and the second central core region 335 are made from the same material and the relative refractive index $\Delta_{CC}$ % is substantially equal to the relative refractive index $\Delta_{cc}$ % (i.e., $\Delta_{CC}$ %=$\Delta_{cc}$ %). The relative refractive index $\Delta_{CC}$ % and the relative refractive index $\Delta_{cc}$ % are from about 0.0% to about 0.5%. In embodiments, the relative refractive index $\Delta_{CC}$ % and the relative refractive index $\Delta_{cc}$ % are from about 0.1% to about 0.4%.

The first low-index core region 314 of the first segment 310 has a refractive index $n_{LIC}$ and a relative refractive index $\Delta_{LIC}$ %, and the second low-index core region 334 of the second segment 330 has a refractive index $n_{lic}$ and a relative refractive index $\Delta_{lic}$ %. In embodiments, the first low-index core region 314 and the second low-index core region 334 are made from the same material and the relative refractive index $\Delta_{LIC}$ % is substantially equal to the relative refractive index $\Delta_{lic}$ % (i.e., $\Delta_{LIC}$ %=$\Delta_{lic}$ %). The relative refractive index $\Delta_{LIC}$ % and the relative refractive index $\Delta_{lic}$ % are from about 0.2% to about −1.0%. In embodiments, the relative refractive index $\Delta_{LIC}$ % and the relative refractive index $\Delta_{lic}$ % are from about 0.1% to about −0.5%.

The first annular core region 313 has a refractive index $n_{AC}$ and a relative refractive index $\Delta_{AC}$ %, and the second annular core region 333 has a refractive index $n_{ac}$ and a relative refractive index $\Delta_{ac}$ %. In embodiments, the first annular core region 313 and the second annular core region 333 are made from the same material and the relative refractive index $\Delta_{AC}$ % is substantially equal to the relative refractive index $\Delta_{ac}$ % (i.e., $\Delta_{AC}$ %=$\Delta_{ac}$ %). The relative refractive index $\Delta_{AC}$ % and the relative refractive index $\Delta_{ac}$ % are greater than the relative refractive index $\Delta_{LIC}$ % and the relative refractive index $\Delta_{lic}$ %, respectively (i.e., $\Delta_{AC}$ %>$\Delta_{LIC}$ %; $\Delta_{ac}$ %>$\Delta_{lic}$ %). In some embodiments, the relative refractive index $\Delta_{AC}$ % is greater than the relative refractive index $\Delta_{CC}$ % (i.e., $\Delta_{AC}$ %>$\Delta_{CC}$ %) and the relative refractive index $\Delta_{ac}$ % is greater than the relative refractive index $\Delta_{cc}$ % (i.e., $\Delta_{ac}$ %>$\Delta_{cc}$ %). In other embodiments, the relative refractive index $\Delta_{AC}$ % is substantially equal to the relative refractive index $\Delta_{CC}$ % (i.e., $\Delta_{AC}$ %=$\Delta_{CC}$ %) and the relative refractive index $\Delta_{ac}$ % is substantially equal to the relative refractive index $\Delta_{cc}$ % (i.e., $\Delta_{ac}$ %=$\Delta_{cc}$ %). In embodiments where the first low-index core region 314 and the second low-index core region 334 are made from the same material, and the first annular core region 313 and the second annular core region 333 are made from the same material, $\Delta_{AC}$ %>$\Delta_{lic}$ % and $\Delta_{ac}$ %>$\Delta_{LIC}$ %. The relative refractive index $\Delta_{AC}$ % and the relative refractive index $\Delta_{ac}$ % are from about 0.2% to about 2.0%. In embodiments, the relative refractive index $\Delta_{AC}$ % and the relative refractive index $\Delta_{ac}$ % are from about 0.3% to about 0.75%.

The first cladding portion 322 has a refractive index $n_{CL}$ and a relative refractive index $\Delta_{CL}$ % relative to pure silica glass. The refractive index $n_{CL}$ of the first cladding portion 322 may be used as the reference for the relative refractive indices of the other glass portions of the first segment 310 of the optical fiber 300. In embodiments where the first cladding portion 322 includes a first outer cladding portion 323, a first low-index trench 324, and (optionally) a first inner cladding portion 325, the relative refractive indices of the other glass portions of the first segment 310 of the optical fiber 300 are determined relative to the first outer cladding portion 323, as described in further detail herein.

In embodiments where the first cladding portion 322 includes the first inner cladding portion 325 and the first low-index trench 324, the first inner cladding portion 325 has a refractive index $n_{ICL}$ and a relative refractive index $\Delta_{ICL}$ %, and the first low-index trench 324 has a refractive index $n_{LIT}$ and a relative refractive index $\Delta_{LIT}$ %. The relative refractive index $\Delta_{ICL}$ % is generally greater than the relative refractive index $\Delta_{LIT}$ % and generally less than the relative refractive index $\Delta_{AC}$ % (i.e., $\Delta_{AC}$ %>$\Delta_{ICL}$ %>$\Delta_{LIT}$ %) as generally depicted in FIG. 11. The relative refractive index $\Delta_{ICL}$ % is from about −0.1% to about 0.1% and the relative refractive index $\Delta_{LIT}$ % is from about −0.1% to about −1.0%. In embodiments, the relative refractive index $\Delta_{ICL}$ % is from about −0.05% to about 0.05% and the relative refractive index $\Delta_{LIT}$ % is from about −0.3% to about −0.5%.

The second cladding portion 342 has a refractive index $n_{cl}$ and a relative refractive index $\Delta_{cl}$ % relative to pure silica glass. The refractive index $n_{cl}$ of the second cladding portion 342 may be used as the reference for the relative refractive indices of the other glass portions of the second segment 330 of the optical fiber 300. In embodiments where the second cladding portion 342 includes a second outer cladding portion 343, a second low-index trench 344, and (optionally) a second inner cladding portion 345, the relative refractive indices of the other glass portions of the second segment 330 of the optical fiber 300 are determined relative to the second outer cladding portion 343, as described in further detail herein.

In embodiments where the second cladding portion 342 includes the second inner cladding portion 345 and the second low-index trench 344, the second inner cladding portion 345 has a refractive index $n_{icl}$ and a relative refractive index $\Delta_{icl}$ %, and the second low-index trench 344 has a refractive index $n_{lit}$ and a relative refractive index $\Delta_{lit}$ %. The relative refractive index $\Delta_{icl}$ % is generally greater than the relative refractive index $\Delta_{lit}$ % and generally less than the relative refractive index $\Delta_{ac}$ % (i.e., $\Delta_{ac}$ %>$\Delta_{icl}$ %>$\Delta_{lit}$ %) as generally depicted in FIG. 13. In embodiments, the second inner cladding portion 345 is made from the same material as the first inner cladding portion 325 and the second low-index trench 344 is made from the same material as the first low-index trench 324. Accordingly, the refractive indices $n_{icl}$ and $n_{lit}$ may be substantially equal to the refractive indices, $n_{ICL}$ and $n_{LIT}$, respectively (i.e., $n_{icl}$=$n_{ICL}$; $n_{lit}$=$n_{LIT}$), and the relative refractive indices $\Delta_{icl}$ % and $\Delta_{lit}$ % may be substantially equal to the relative refractive indices $\Delta_{ICL}$ % and $\Delta_{LIT}$ %, respectively (i.e., $\Delta_{icl}$ %=$\Delta_{ICL}$ %; $\Delta_{lit}$ %=$\Delta_{LIT}$ %). For example, the relative refractive index $\Delta_{icl}$ % may be from about −0.1% to about 0.1% and the relative refractive index $\Delta_{lit}$ % may be from about −0.1% to about −1.0%. In embodiments, the relative refractive index $\Delta_{icl}$ % may be from about −0.05% to about 0.05% and the relative refractive index $\Delta_{lit}$ % may be from about −0.3% to about −0.5%.

In embodiments where the first cladding portion 322 includes the first outer cladding portion 323, the first outer cladding portion 323 has a refractive index $n_{OCL}$ and a relative refractive index $\Delta_{OCL}$ %. In these embodiments, the relative refractive index $\Delta_{OCL}$ % may be used as the reference for determining the relative refractive indices of the other glass portions of the first segment 310 of the optical fiber 300. In the embodiments described herein, the relative refractive index $\Delta_{OCL}$ % of the first outer cladding portion 323 is greater than the relative refractive index $\Delta_{LIT}$ % of the first low-index trench 324 (i.e., $\Delta_{OCL}$ %>$\Delta_{LIT}$ %). In some embodiments, the relative refractive index $\Delta_{OCL}$ % of the first outer cladding portion 323 may be greater than the relative refractive index $\Delta_{ICL}$ % of the first inner cladding portion 325, such as when the first inner cladding portion 325 comprises silica glass down-doped with one or more down-dopants which decrease the index of refraction $n_{ICL}$ of the first inner cladding portion 325 relative to the index of refraction $n_{OCL}$ of the first outer cladding portion 323. In other embodiments, the relative refractive index $\Delta_{OCL}$ % of the first outer cladding portion 323 may be substantially equal to the relative refractive index $\Delta_{ICL}$ % of the first inner cladding portion 325. In such embodiments, the composition of the first outer cladding portion 323 may be the same as the composition of the first inner cladding portion 325 or different than the composition of the first inner cladding portion 325, so long as $\Delta_{OCL}$ %=$\Delta_{ICL}$ %. Based on the foregoing, it should be understood that the relative refractive index $\Delta_{OCL}$ % of the first outer cladding portion 323 is greater than or substantially equal to the relative refractive index $\Delta_{ICL}$ % of the first inner cladding portion 325.

In embodiments where the second cladding portion 342 includes the second outer cladding portion 343, the second outer cladding portion 343 has a refractive index $n_{ocl}$ and a relative refractive index $\Delta_{ocl}$ %. Accordingly, the relative refractive index $\Delta_{ocl}$ % may be used as the reference for the relative refractive indices of the other glass portions of the second segment 330 of the optical fiber 300. In the embodiments described herein, the relative refractive index $\Delta_{ocl}$ % of the second outer cladding portion 343 is greater than the relative refractive index $\Delta_{lit}$ % of the second low-index trench 344 (i.e., $\Delta_{ocl}$ %>$\Delta_{lit}$ %). In some embodiments, the relative refractive index $\Delta_{ocl}$ % of the second outer cladding portion 343 may be greater than the relative refractive index $\Delta_{icl}$ % of the second inner cladding portion 345, such as when the second inner cladding portion 345 comprises silica glass down-doped with one or more down-dopants which decrease the index of refraction $n_{icl}$ of the second inner cladding portion 345 relative to the index of refraction $n_{ocl}$ of the second outer cladding portion 343. In other embodiments, the relative refractive index $\Delta_{ocl}$ % of the second outer cladding portion 343 may be substantially equal to the relative refractive index $\Delta_{icl}$ % of the second inner cladding portion 345. In such embodiments, the composition of the second outer cladding portion 343 may be the same as the composition of the second inner cladding portion 345 or different than the composition of the second inner cladding portion 345, so long as $\Delta_{ocl}$ %=$\Delta_{icl}$ %. Based on the foregoing, it should be understood that the relative refractive index $\Delta_{ocl}$ % of the second outer cladding portion 343 is greater than or substantially equal to the relative refractive index $\Delta_{icl}$ % of the second inner cladding portion 345. In embodiments, the second outer cladding portion 343 is made from the same material as the first outer cladding portion 323, and as such, the refractive index $n_{ocl}$ of the second outer cladding portion 343 may be substantially equal to the refractive index $n_{OCL}$ of the first outer cladding portion 323 (i.e., $n_{ocl}$=$n_{OCL}$) and the relative refractive index $\Delta_{ocl}$ % of the second outer cladding portion 343 may be substantially equal to the relative refractive index $\Delta_{OCL}$ % of the first outer cladding portion 323, (i.e., $\Delta_{ocl}$ %=$\Delta_{OCL}$ %=0).

The first central core region 315 of the first segment 310 and the second central core region 335 of the second segment 330 comprise silica glass with one or more up-dopants which increase the index of refraction of silica glass, for example and without limitation, Ge, Ti, Al, Cl, P, $GeO_2$, $TiO_2$, $P_2O_5$, combinations thereof or the like. In embodiments, at least one of the first central core region 315 and the second central core region 335 contain between about 3 wt. % to about 17 wt. % $GeO_2$. In some other embodiments, at least one of the first central core region 315 and the second central core region 335 contain between about 5 wt. % to about 13 wt. % $GeO_2$. In embodiments, the first central core region 315 and the second central core region 335 are made from the same materials and the dopant concentration in the first central core region 315 is substantially equal to the dopant concentration in the second central core region 335.

The first low-index core region 314 of the first segment 310 and the second low-index core region 334 of the second segment 330 comprise silica glass with one or more down-dopants which decrease the index of refraction of silica glass, for example and without limitation, F, B, combinations thereof, or the like. In embodiments, at least one of the first low-index core region 314 and the second low-index core region 334 comprise F in a concentration between about 0.1 wt. % to about 2.5 wt. %. In some embodiments, at least one of the first low-index core region 314 and the second low-index core region 334 comprise F in a concentration between about 0.1 wt. % to about 1.8 wt. %. In other embodiments, at least one of the first low-index core region 314 and the second low-index core region 334 comprise F in a concentration between about 0.1 wt. % to about 1.5 wt. %. In still other embodiments, at least one of the first low-index core region 314 and the second low-index core region 334 comprise F in a concentration between about 0.5 wt. % to about 1.8 wt. %. In still yet other embodiments, at least one of the first low-index core region 314 and the second low-index core region 334 comprise F in a concentration between about 0.7 wt. % to about 1.8 wt. %.

The first annular core region 313 of the first segment 310 and the second annular core region 333 of the second segment 330 comprise silica glass with one or more up-dopants which increase the index of refraction of silica glass, for example and without limitation, Ge, Ti, Al, Cl, P, $GeO_2$, $TiO_2$, $P_2O_5$, combinations thereof or the like. In embodiments, at least one of the first annular core region 313 and the second annular core region 333 contain between about 3 wt. % to about 17 wt. % $GeO_2$. In some other embodiments, at least one of the first annular core region 313 and the second annular core region 333 contain between about 5 wt. % to about 13 wt. % $GeO_2$. In embodiments, the first annular core region 313 and the second annular core region 333 are made from the same materials and the dopant concentration in the first annular core region 313 is substantially equal to the dopant concentration in the second annular core region 333.

The first inner cladding portion 325 of the first segment 310 and the second inner cladding portion 345 of the second segment 330 may comprise pure silica glass, silica glass with one or more up-dopants which increase the index of refraction of silica glass, or silica glass with one or more down-dopants that decrease the index of refraction of silica glass. Non-limiting examples of suitable up-dopants include Ge, Ti, Al, Cl, P, $GeO_2$, $TiO_2$, $P_2O_5$, combinations thereof or the like. In embodiments, at least one of the first inner cladding 325 and the second inner cladding 345 contain Cl as an up-dopant. Non-limiting examples of suitable down-dopants include F, B, combinations thereof, or the like. In embodiments, at least one of the first inner cladding 325 and the second inner cladding 345 contain F as a down-dopant.

As discussed in relation to expressions (32) and (33) above, the radial thickness of a particular glass portion of an optical fiber may be interrelated with a relative refractive index of the particular glass portion. In the embodiments described herein, the trench volume $V_{LIT}$ of the first low-index trench 324 may be greater than or equal to about 80%-$\mu m^2$, such as greater than or equal to about 100%-$\mu m^2$. In some embodiments, the trench volume $V_{LIT}$ may be greater than or equal to about 110%-$\mu m^2$ or even greater than or equal to about 120%-$\mu m^2$. In some embodiments, the trench volume $V_{LIT}$ may be greater than or equal to about 80%-$\mu m^2$ and less than or equal to about 220%-$\mu m^2$. In some embodiments, the trench volume $V_{LIT}$ may be greater than or equal to about 100%-$\mu m^2$ and less than or equal to about 200%-$\mu m^2$. In still other embodiments, the trench volume profile $V_{LIT}$ may be greater than or equal to about 110%-$\mu m^2$ and less than or equal to about 180%-$\mu m^2$.

In the embodiments described herein, the trench volume $v_{lit}$ of the second low-index trench 344 may be greater than or equal to about 40%-$\mu m^2$, such as greater than or equal to about 50%-$\mu m^2$. In some embodiments, the trench volume $v_{lit}$ may be greater than or equal to about 55%-$\mu m^2$ or even greater than or equal to about 60%-$\mu m^2$. In some embodiments, the trench volume $v_{lit}$ may be greater than or equal to about 40%-$\mu m^2$ and less than or equal to about 110%-$\mu m^2$. In some embodiments, the trench volume $v_{lit}$ may be greater than or equal to about 50%-$\mu m^2$ and less than or equal to about 100%-$\mu m^2$. In still other embodiments, the trench volume profile $v_{lit}$ may be greater than or equal to about 55%-$\mu m^2$ and less than or equal to about 90%-$\mu m^2$.

In the embodiments of the optical fibers described herein, the first low-index trench 324, the second low-index trench 344, or both the first low-index trench 324 and the second low-index trench 344, comprise silica glass with one or more down-dopants which decrease the index of refraction of silica glass. Non-limiting examples of down-dopants include F, B, combinations thereof, or the like. In embodiments, at least one of the first low-index trench 324 and the second low-index trench 344 comprise F in a concentration between about 0.1 wt. % to about 2.5 wt. %. In some embodiments, at least one of the first low-index trench 324 and the second low-index trench 344 comprise F in a concentration between about 0.1 wt. % to about 1.8 wt. %. In other embodiments, at least one of the first low-index trench 324 and the second low-index trench 344 comprise F in a concentration between about 0.1 wt. % to about 1.5 wt. %. In still other embodiments, at least one of the first low-index trench 324 and the second low-index trench 344 comprise F in a concentration between about 0.5 wt. % to about 1.8 wt. %. In still yet other embodiments, at least one of the first low-index trench 324 and the second low-index trench 344 comprise F in a concentration between about 0.7 wt. % to about 1.8 wt. %.

In some embodiments, at least one of the relative refractive index $\Delta_{LIC}$ % of the first low-index core region 314, the relative refractive index $\Delta_{LIT}$ % of the first low-index trench 324, the relative refractive index $\Delta_{lic}$ % of the second low-index core region 334 and the relative refractive index $\Delta_{lit}$ % of the second low-index trench 344 is achieved by forming the silica glass of at least one of the first low-index core region 314, the first low-index trench 324, the second low-index core region 334 and the second low-index trench 344, respectively, with voids which are either non-periodically disposed, or periodically disposed, or both, throughout the silica glass. The voids are stretched (elongated) along the length (i.e. parallel to the longitudinal axis) of the optical fiber 300, but do not extend the entire length of the entire fiber. While not wishing to be bound by theory, it is believed that the voids extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. In some embodiments, these voids may contain one or more gases, such as argon, krypton, $CO_2$, $SO_2$, $O_2$, or mixtures thereof. In some other embodiments, the voids are substantially free of gas. Regardless of the presence or absence of gas, at least one of the refractive index $n_{LIC}$ of the first low-index core region 314, the refractive index $n_{LIT}$ of the first low-index trench 324, the refractive index $n_{lic}$ of the second low-index core region 334 and the refractive index $n_{lit}$ of the second low-index trench 344 are decreased due to the presence of the voids. Alternatively or additionally, at least one of the $n_{LIC}$ of the first low-index core region 314, the refractive index $n_{LIT}$ of the first low-index trench 324, the refractive index $n_{lic}$ of the second low-index core region 334 and the refractive index $n_{lit}$ of the second low-index trench 344 is decreased by forming a down-doped silica glass with a non-periodic, periodic, or both non-periodic and periodic distribution of voids, as described herein.

The relative refractive index $\Delta_{LIT}$ % of the first low-index trench 324 is less than the relative refractive index $\Delta_{ICL}$ % of the first inner cladding portion 325 (i.e., $\Delta_{LIT}\% < \Delta_{ICL}\%$) and less than the relative refractive index $\Delta_{OCL}$ % of the first outer cladding portion 323 (i.e., $\Delta_{LIT}\% < \Delta_{OCL}\%$). In some embodiments, the relative refractive index $\Delta_{ICL}$ % is substantially equal to the relative refractive index $\Delta_{OCL}$ % and $\Delta_{LIT}\% < \Delta_{ICL}\% = \Delta_{OCL}\%$. In other embodiments, the relative refractive index $\Delta_{ICL}$ % is less than the relative refractive index $\Delta_{OCL}$ % and $\Delta_{LIT}\% < \Delta_{ICL}\% < \Delta_{OCL}\%$.

The relative refractive index $\Delta_{lit}$ % of the second low-index trench 344 is less than the relative refractive index $\Delta_{icl}$ % of the second inner cladding portion 345 (i.e., $\Delta_{lit}\% < \Delta_{icl}\%$) and less than the relative refractive index $\Delta_{ocl}$ % of the second outer cladding portion 343 (i.e., $\Delta_{lit}\% < \Delta_{ocl}\%$). In some embodiments, the relative refractive index $\Delta_{icl}$ % is substantially equal to the relative refractive index $\Delta_{ocl}$ % and $\Delta_{lit}\% < \Delta_{icl}\% = \Delta_{ocl}\%$. In other embodiments, the relative refractive index $\Delta_{icl}$ % is less than the relative refractive index $\Delta_{ocl}$ % and $\Delta_{lit}\% < \Delta_{icl}\% < \Delta_{ocl}\%$. In embodiments where the second low-index trench 344, the second inner cladding portion 345 and the second outer cladding portion 343 are made from the same materials as the first low-index trench 324, the first inner cladding portion 325 and the first outer cladding portion 323, respectively, it should be appreciated that the relative refractive index $\Delta_{lit}$ % may be substantially equal to the relative refractive index $\Delta_{LIT}$ % (i.e., $\Delta_{lit}\% = \Delta_{LIT}\%$), the relative refractive index $\Delta_{icl}$ % may be substantially equal to the relative refractive index $\Delta_{ICL}$ % (i.e., $\Delta_{icl}\% = \Delta_{ICL}\%$) and the relative refractive index $\Delta_{ocl}$ % may be substantially equal to the relative refractive index $\Delta_{OCL}$ % (i.e., $\Delta_{ocl}\% = \Delta_{OCL}\%$).

The first outer cladding 323 of the first segment 310 and the second outer cladding 343 of the second segment 330 may comprise pure silica glass, silica glass with one or more up-dopants which increase the index of refraction of silica glass, or silica glass with one or more down-dopants that decrease the index of refraction of silica glass. Non-limiting examples of suitable up-dopants include Ge, Ti, Al, Cl, P, $GeO_2$, $TiO_2$, $P_2O_5$, combinations thereof or the like. In embodiments, at least one of the first outer cladding 323 and the second outer cladding 343 contain Cl as an up-dopant. Non-limiting examples of suitable down-dopants include F, B, combinations thereof, or the like. In embodiments, at least one of the first outer cladding 323 and the second outer cladding 343 contain F as a down-dopant.

The various embodiments of the optical fiber 300 described herein have improved bend performance due to the incorporation of the first low-index trench 324 within the first cladding portion 322 and the second low-index trench 344 within the second cladding portion 342. Macrobend performance of the optical fiber 200 may be determined according to FOTP-62 (JEC-60793-1-47) as described above.

In embodiments, the optical fiber 300 is manufactured using a conventional fiber manufacturing process to make a fiber preform having a desired structure. Non-limiting examples of processes used to make the fiber preform include outside vapor deposition (OVD), modified chemical vapor deposition (MCVD), physical chemical vapor deposition (PCVD), or the like. Once formed, the fiber preform is drawn into a fiber having the dimensions of the first segment 310. The fiber having the dimensions of the first segment 310 is clamped and a portion of the fiber is further drawn down to the dimensions of the second segment 330 with the transition region 350 positioned between the first segment 310 and the second segment 330.

For example, in one embodiment, the optical fiber 300 may be initially formed such that the optical fiber 300 initially has the first central core region 315, first low-index core region 314, first annular core region 313, first inner cladding portion 325, first low-index trench 324 and first outer cladding portion 323. The optical fiber 300 may then be clamped and a portion of the fiber heated and further drawn to create an optical fiber having the first segment 310 with the first central core region 315, first low-index core region 314, first annular core region 313, first inner cladding portion 325, first low-index trench 324 and first outer cladding portion 323, and a second segment 330 having the second central core region 335, second low-index core region 334, second annular core region 333, second inner cladding portion 345, second low-index trench 344 and second outer cladding portion 343. In this procedure, further drawing the optical fiber reduces the dimensions of the second segment 330 of the optical fiber 300 relative to the first segment 310. In particular, the dimensions of the second central core region 335 are significantly reduced relative to the first central core region 315.

Referring to FIGS. 1B, 11 and 13, a Gaussian laser beam GLB is optically coupled to an inlet end 311 of the optical fiber 300 and propagates through the first segment 310 towards the second segment 330. Specifically, the Gaussian laser beam GLB is introduced into the first central core region 315 and propagates through the first segment 310 and into the transition region 350. As the Gaussian laser beam GLB propagates through the transition region 350 and into the second segment 330, the decreased size of second central core region 335 is unable to support propagation of the Gaussian laser beam GLB and the optical power of the Gaussian laser beam GLB propagates, instead, in the second annular core region 333, thereby converting the Gaussian laser beam GLB into a ring-shaped laser beam (RSB). The ring-shaped laser beam propagates through the second segment 330 within the second annular core region 333. In embodiments, a portion of the optical power of the Gaussian laser beam GLB is maintained within the second central core region 335 of the second segment 330 as depicted in FIG. 11. The portion of the Gaussian laser beam GLB maintained within the second central core region 335 may be less than 10% of the Gaussian laser beam GLB propagating through the first central core region 315 of the first segment 310. In embodiments, the portion of the Gaussian laser beam GLB maintained within the second central core region 335 may be less than 10% of the Gaussian laser beam GLB propagating through the first central core region 315 of the first segment 310. The ring-shaped laser beam RSB exits the optical fiber 300 through an outlet end 331. The Gaussian laser beam GLB can be coupled to the inlet end 311 of the optical fiber 300 through a lens system (not shown), direct butt-coupling (not shown) or fusion splicing (not shown). The ring-shaped laser beam incident on the outlet end 331 of the optical fiber 300 can be focused with free space bulk optics (not shown) or a fiber lens directly formed or attached to the outlet end 331 (not shown). In embodiments, the portion of the Gaussian laser beam GLB maintained within the second central core region 335 may be blocked from exiting the outlet end 331 using paint to cover the second central core region 335 at the outlet end 331, forming an aperture in the second central core region 335 at the outlet end 331, etc.

Figure 14:
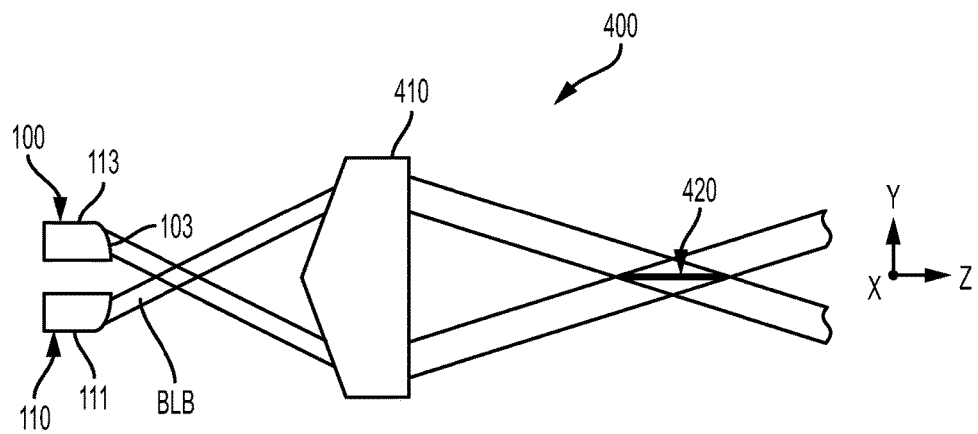
FIG. 14 schematically depicts an optical system for generating a "diffraction-free" beam using an optical fiber according to one or more embodiments shown and described herein.

FIGS. 1A and 14 illustrate schematically an optical system 400 for generating a non-diffracting and/or a quasi non-diffracting laser beam(s). The optical system 400 includes an optical fiber 100 with a first segment 110 optically coupled to a second segment 130 with a transition region 150, as described hereinabove with respect to FIGS. 1A and 2-5. It should be appreciated that the optical system 400 may include an optical fiber 200 as described with respect to FIGS. 1A and 6-9 or an optical fiber 300 as described with respect to FIGS. 1B and 10-13 instead of the optical fiber 100. For clarity, only the first annular core region 113 at the outlet end 111 of the first segment 110 is depicted in FIG. 14, i.e., the first cladding portion 122 is not shown. The outlet end 111 has an endface lens 103 that can greatly increase the beam size of the Bessel laser beam BLB on the surface of the outlet end 111 of the optical fiber 100 in order to mitigate potential surface damage of the outlet end 111 due to high intensity of the incident ring-shaped laser beam (RSB). The endface lens 103 may be formed directly on the outlet end 111 (not shown) of the optical fiber 100, or in the alternative, the endface lens 103 may be attached to the outlet end 111 of the optical fiber 100. For example, the endface lens 103 can be made with conventional polishing or laser based processes that shape the outlet end 111 of the optical fiber 100 or by forming a desired surface shape on a separate fused silica rod which is then fusion spliced to the outlet end 111 of the optical fiber 100. In FIG. 14 embodiment, a Bessel laser beam BLB converted from an original Gaussian laser beam GLB is imaged by the endface lens 103 and projected on to an axicon prism 410. In these embodiments, the endface lens 103 has a focal length of less than 10 millimeters (mm). The Bessel laser beam BLB passes through the axicon prism 410 which re-focuses the Bessel laser beam BLB to a line (laser focal line), rather than to a point, and re-shapes the Bessel laser beam BLB into a "diffraction-free" beam 420 (i.e., into a quasi-non-diffracting beam). In these embodiments the $F_D$ value of the Bessel laser beam BLB is at least 10. For example $F_D$ value of the Bessel laser beam BLB may be 10 to 5000. For example, at least 50, at least 100, at least 250, at least 500, at least 1000, in the range from 10 to 2000, in the range from 50 to 1500, or in the range from 100 to 1000.

Figure 15:
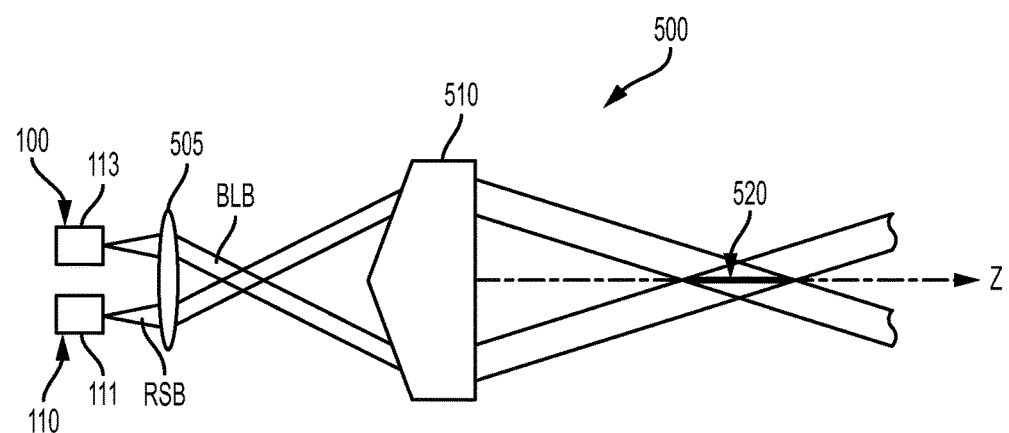
FIG. 15 schematically depicts an optical system for generating a "diffraction-free" beam using an optical fiber according to one or more embodiments shown and described herein.
Figure 16:
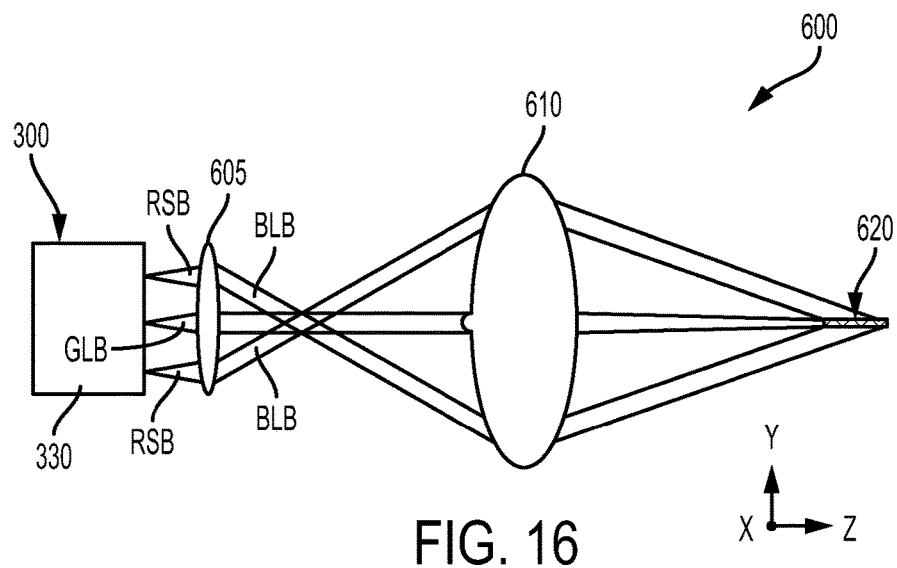
FIG. 16 schematically depicts an optical system for generating a "hybrid" Gauss-Bessel laser beam using an optical fiber according to one or more embodiments shown and described herein.
Figure 17:
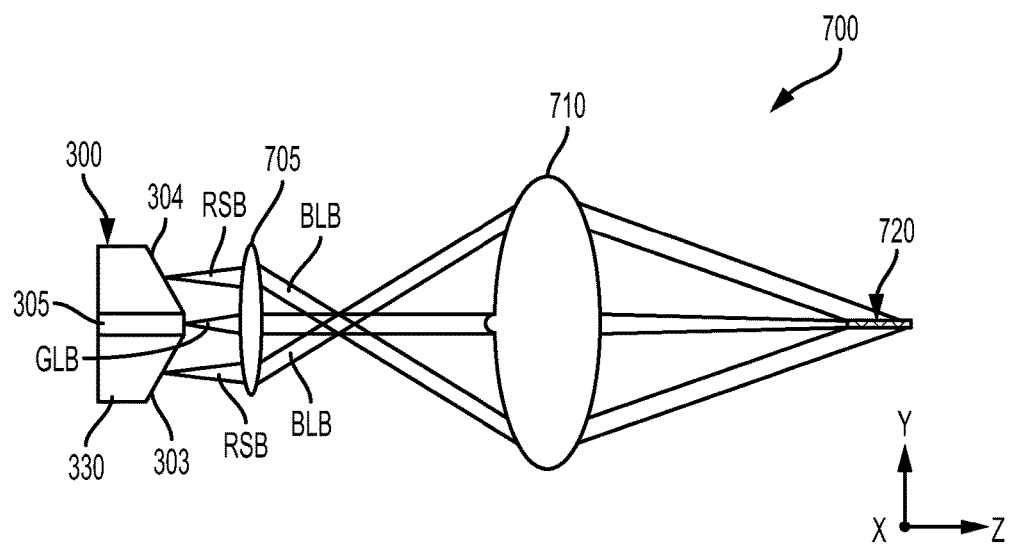
FIG. 17 schematically depicts an optical system for generating a "hybrid" Gauss-Bessel laser beam using an optical fiber according to one or more embodiments shown and described herein.

Referring to FIGS. 1A and 15, another embodiment of an optical system 500 for generating a "diffraction-free" beam is shown. The optical system 500 includes an optical fiber 100 with a first segment 110 optically coupled to a second segment 130 (not shown) with a transition region 150 (not shown). For clarity, only the first annular core region 113 at the outlet end 111 of the first segment 110 is depicted in FIG. 15, i.e., the first cladding portion 122 is not shown. It should be appreciated that the optical system 500 may include an optical fiber 200 as described with respect to FIGS. 1A and 6-9 or an optical fiber 300 as described with respect to FIGS. 1B and 10-13 instead of the optical fiber 100. A laser beam converted from a Gaussian laser beam GLB to a ring-shaped beam RSB is emitted by the optical fiber 100 and is imaged by the lens 505 which may be, for example, a spherical lens, an aspherical lens with a surface profile that does not include portions of a sphere or cylinder, or the like. In some embodiments, the aspheric lens may comprise a conical wavefront producing optical element, such as an axicon lens, for example, a negative refractive axicon lens, a positive refractive axicon lens, a reflective axicon lens, a diffractive axicon lens, a programmable spatial light modulator axicon lens (e.g., a phase axicon), or the like. In embodiments, the Bessel laser beam BLB propagates from the optical fiber 100 and the lens 505 reimages the Bessel laser beam BLB such that the diameter of the Bessel laser beam BLB is at least ten times larger than the diameter $D_0$ of the optical fiber 100. The imaged Bessel laser beam BLB is incident on the axicon prism 510 which focuses the Bessel laser beam BLB to a line (rather than to a point) and reshapes the Bessel laser beam BLB into a desirable "diffraction-free" beam 520 (in this embodiment, into a quasi non-diffracting beam) forming a laser focal line.

It should be appreciated that when the Bessel laser beam BLB reaches the axicon prism 410 shown in FIG. 14 and axicon prism 510 shown in FIG. 15, the optical signal in a central region of the Bessel laser beam BLB is minimized. As a result, the configuration of the optical systems 400, 500 are insensitive to the shape of a central apex area of the axicon prism 410, 510. This is especially beneficial for optical system configurations using an axicon prism since most axicon prisms suffer from quality control issues near the apex region due to manufacturing process limitations and the central apex area may perform like a conventional lens which greatly deteriorates beam quality of the "diffraction-free" beam. Accordingly, the optical system configurations shown in FIGS. 14 and 15 effectively avoid axicon prism central apex area issues and produce a high quality "diffraction-free" beam (i.e., a quasi non-diffracting beam). According to this embodiment the $F_D$ value of the laser beam is at least 10. For example, at least 50, at least 100, at least 250, at least 500, at least 1000, or for example in the range from 10 to 2000, in the range from 50 to 1500, or in the range from 100 to 1000.

Referring to FIGS. 1B, 10-13, and 16, an optical system 600 for generating a "hybrid" Gauss-Bessel laser beam which has both "diffraction-free" and Gaussian properties is shown. The optical system 600 includes an optical fiber 300 with a first segment 310 optically coupled to a second segment 330 with a transition region 350. The optical system 600 also includes at least one lens 605 and a bifocal lens 610. A beam exiting the second segment 330 of the optical fiber 300 has a ring-shaped portion and a Gaussian laser beam GLB portion, as described herein. The is ring-shaped beam (RSB) portion emitted by the optical fiber 300 is reimaged by the at least one lens 605 which may be, for example, a spherical lens, an aspherical lens, or the like. In embodiments, the ring shape beam RSB portion propagates from the optical fiber 30, and the lens 605 forms the Bessel laser beam BLB such that the outer diameter of the Bessel laser beam BLB portion is at least ten times larger than the diameter $D_0$ of the optical fiber 300. The Bessel laser beam BLB formed by the lens 605 is incident on an outer portion of the bifocal lens 610 which reshapes the Bessel laser beam BLB into a desirable "diffraction-free" beam (i.e., in this embodiment, into a quasi non-diffracting beam). Simultaneously, the Gaussian laser beam GLB portion of the beam exiting the second segment 330 of the optical fiber 300 passes through the at least one lens and is reimaged by a central portion of the bifocal lens 610. The bifocal lens 610 effectively combines the Bessel laser beam BLB portion and the Gaussian laser beam GLB portion together to form a hybrid beam 620 in which a majority of the hybrid beam 620 is "diffraction-free". Also, in embodiments where the Gaussian laser beam GLB is not desired or need, the Gaussian laser beam GLB can be blocked by paint, an aperture, etc.

Referring to FIGS. 1A, 1B, 10-13, and 17, another optical system 700 for generating a "hybrid" Gauss-Bessel laser beam which has both "diffraction-free" and Gaussian properties is shown. The optical system 700 includes an optical fiber 300 with a first segment 310 optically coupled to a second segment 330 with a transition region 350. The second segment 330 has an endface 303 with a tapered surface portion 304 and a flat core region 305 such that a Bessel laser beam BLB portion and a Gaussian laser beam GLB portion exiting from an endface 303 of the optical fiber 300 have different optical paths and focal points which assists in converging and combining the Bessel laser beam BLB portion and the Gaussian laser beam GLB portion into a single beam which is "diffraction free". The optical system 700 also includes at least one lens 705 and a bifocal lens 710. A beam exiting the second segment 330 of the optical fiber 300 has a Bessel laser beam BLB portion and a Gaussian laser beam GLB portion, as described herein. The Bessel laser beam BLB portion emitted by the optical fiber 300 is initially reimaged by the endface 303 of the optical fiber 300 and then reimaged by the at least one lens 705 which may be, for example, a spherical lens, an aspherical lens, or the like. In embodiments, the lens 705 reimages the Bessel laser beam BLB such that the outer diameter of the Bessel laser beam BLB portion is at least ten times larger than the diameter $D_0$ of the optical fiber 300. The reimaged Bessel laser beam BLB is incident on an outer portion of the bifocal lens 710 which reshapes the Bessel laser beam BLB into a desirable non-diffracting beam or quasi non-diffracting beam. Simultaneously, the Gaussian laser beam GLB portion of the beam exiting the second segment 330 of the optical fiber 300 is initially reimaged by the flat core region 305 and thereafter passes through the at least one lens 705 and is reimaged by a central portion of the bifocal lens 710. The bifocal lens 710 effectively combines the Bessel laser beam BLB portion and the Gaussian laser beam GLB portion together to form a hybrid beam 720 in which a majority of the hybrid beam 720 is a "diffraction-free" beam (a quasi non-diffracting beam). In embodiments where the Gaussian laser beam GLB is not desired or need, the Gaussian laser beam GLB can be blocked by paint, an aperture, etc. It should be appreciated that the endface 303 of the second segment 330 may simplify the configuration of the lenses used to focus the beam emitted from the optical fiber 300. In embodiments, the endface 303 may be used eliminate the at least one lens 705 and the bifocal lens 710 entirely.

EXAMPLES

The embodiments described herein will be further clarified by the following examples.

A summary of radii and relative refractive indices for five examples (Examples 1-5) of the optical fiber 100 depicted in FIGS. 1A and 2-5 are shown in Table 1 below.

TABLE 1

|  | Example 1 | Example 2 | Example 3 | Example 4 | Example 5 |
|---|---|---|---|---|---|
| $\Delta_{CH}$% | −26% | −26% | −26% | −26% | −26% |
| $\Delta_{AC}$% | 0.12% | 0.2% | 0.34% | 0.5% | 1% |
| $\Delta_{LIT}$% | −0.6% | −0.5% | −0.4% | −0.4% | 0% |
| $R_0$ (μm) | 10 | 20 | 15 | 25 | 30 |
| $R_1$ (μm) | 15 | 22.5 | 20 | 32 | 40 |
| $R_2$ (μm) | 20 | 34 | 25 | 32 | 40 |
| $R_3$ (μm) | 28 | 42.5 | 32 | 40 | 40 |
| $R_4$ (μm) | 125 | 80 | 75 | 83.3 | 73.5 |
| Taper ratio | 0.5 | 0.781 | 0.533 | 0.750 | 0.85 |
| $r_1$ (μm) | 5.7 | 8.3 | 7.2 | 15.7 | 24.6 |
| $r_2$ (μm) | 8.8 | 22.2 | 10.9 | 15.7 | 24.6 |
| $r_3$ (μm) | 13.2 | 30.2 | 15.4 | 24.6 | 24.6 |
| $r_4$ (μm) | 62.5 | 62.5 | 40.0 | 62.5 | 62.5 |

As shown in Table 1, the relative refractive index $\Delta_{CH}$% for the channel 114 was −26% for Examples 1-5. The relative refractive index $\Delta_{AC}$% for the first annular core region 113 ranged from 0.12% to 1% and the relative refractive index $\Delta_{LIT}$% for the first low-index trench 124 ranged from 0% to −0.6%. The radius $R_0$ ranged from 10 μm to 30 μm; the radius $R_1$ ranged from 15 μm to 40 μm; the radius $R_2$ ranged from 20 μm to 40 μm; the radius $R_3$ ranged from 28 μm to 42.5 μm; and the radius $R_4$ ranged from 73.5 μm to 125 μm. The radial thickness $T_{AC}$ of the first annular core region 113 ranged from 2.5 μm to 10 μm; radial thickness $T_{ICL}$ of the first inner cladding portion 125 ranged from 0.0 μm to 12.5 μm; the radial thickness $T_{LIC}$ of the first low-index trench 124 ranged from 0.0 μm to 8.5 μm; and the radial thickness $T_{OCL}$ of the first outer cladding portion 123 ranged from 33.5 μm to 100 μm.

The taper ratio between the first segment 110 and the second segment 130 ranged from 0.5 to 0.85. The relative refractive index $\Delta_c$% for the second core portion 132 and the relative refractive index $\Delta_{lit}$ % for the second low-index trench 144 were substantially equal to the relative refractive index $\Delta_{AC}$ % for the first annular core region 113 and the relative refractive index $\Delta_{LIT}$% for the first low-index trench 124, respectively. The radius $r_1$ ranged from 5.7 μm to 24.6 μm; the radius $r_2$ ranged from 8.8 μm to 24.6 μm; the radius $r_3$ ranged from 13.2 μm to 30.2 μm; and the radius $r_4$ ranged from 40 μm to 62.5 μm. The radial thickness $t_{icl}$ of the second inner cladding portion 145 ranged from 0.0 μm to 13.9 μm; the radial thickness $t_{lic}$ of the second low-index trench 144 ranged from 0.0 μm to 8.9 μm; and the radial thickness $t_{ocl}$ of the second outer cladding portion 143 ranged from 24.6 μm to 49.3 μm.

A summary of radii and relative refractive indices for three examples (Examples 6-8) of the optical fiber 200 depicted in FIGS. 1A and 6-9 are shown in Table 2 below.

TABLE 2

|  | Example 6 | Example 7 | Example 8 |
|---|---|---|---|
| $\Delta_{LIC}$% | −0.5% | −0.5% | 0% |
| $\Delta_{AC}$% | 0.34% | 0.5% | 1% |
| $\Delta_{LIT}$% | −0.5% | −0.4% | 0% |
| $R_0$ (μm) | 3 | 5 | 4 |
| $R_1$ (μm) | 10 | 12 | 10 |
| $R_2$ (μm) | 18 | 12 | 10 |
| $R_3$ (μm) | 30 | 12 | 10 |
| $R_4$ (μm) | 125 | 125 | 125 |
| Taper ratio | 0.5 | 0.4 | 0.32 |
| $r_0$ (μm) | 1.5 | 2.0 | 1.3 |
| $r_1$ (μm) | 5.0 | 4.8 | 3.2 |
| $r_2$ (μm) | 9.0 | 4.8 | 3.2 |
| $r_3$ (μm) | 15.0 | 4.8 | 3.2 |
| $r_4$ (μm) | 62.5 | 50.0 | 40.0 |

As shown in Table 2, the relative refractive index $\Delta_{LIC}$% for the first low-index core region 214 ranged from 0% to −0.5%; the relative refractive index $\Delta_{AC}$ % for the first annular core region 213 ranged from 0.34% to 1% and the relative refractive index $\Delta_{LIT}$% for the first low-index trench 224 ranged from 0% to −0.5%. The radius $R_0$ ranged from 3 μm to 5 μm; the radius $R_1$ ranged from 10 μm to 12 μm; the radius $R_2$ ranged from 10 μm to 18 μm; the radius $R_3$ ranged from 10 μm to 30 μm; and the radius $R_4$ was 125 μm for Examples 6-8. The radial thickness $T_{AC}$ of the first annular core region 213 ranged from 6 μm to 7 μm; radial thickness $T_{ICL}$ of the first inner cladding portion 225 ranged from 0.0 μm to 8 μm; the radial thickness $T_{LIC}$ of the first low-index trench 224 ranged from 0.0 μm to 12 μm; and the radial thickness $T_{OCL}$ of the first outer cladding portion 223 ranged from 95 μm to 115 μm.

The taper ratio between the first segment 210 and the second segment 230 ranged from 0.32 to 0.5. The relative refractive index $\Delta_{lic}$% for the second low-index core region 234, the relative refractive index $\Delta_{ac}$ % for the second annular core region 233 and the relative refractive index $\Delta_{lit}$ % for the second low-index trench 244 were substantially equal to the relative refractive index $\Delta_{LIC}$ % for the first low-index core region 214, the relative refractive index $\Delta_{AC}$ % for the first annular core region 213 and the relative refractive index $\Delta_{LIT}$ % for the first low-index trench 224, respectively. The radius $r_0$ ranged from 1.3 μm to 2 μm; the radius $r_1$ ranged from 3.2 Ξm to 5 μm; the radius $r_2$ ranged from 3.2 μm to 9 μm; the radius $r_3$ ranged from 3.2 μm to 15 μm; and the radius $r_4$ ranged from 40 μm to 62.5 μm. The radial thickness $t_{ac}$ of the second annular core region 233 ranged from 1.9 μm to 3.5 μm; the radial thickness $t_{icl}$ of the second inner cladding portion 245 ranged from 0.0 μm to 4 μm; the radial thickness $t_{lic}$ of the second low-index trench 244 ranged from 0.0 μm to 6 μm; and the radial thickness $t_{ocl}$ of the second outer cladding portion 243 ranged from 36.8 μm to 47.5 μm.

A summary of radii and relative refractive indices for three examples (Examples 9-11) of the optical fiber 300 depicted in FIGS. 1B and 10-13 are shown in Table 3 below.

TABLE 3

|  | Example 9 | Example 10 | Example 11 |
|---|---|---|---|
| $\Delta_{CC}$% | 0.34% | 0.1% | 0.2% |
| $\Delta_{LIC}$% | 0% | −0.2% | 0% |
| $\Delta_{AC}$% | 0.5% | 0.75% | 1% |
| $\Delta_{LIT}$% | −0.5% | −0.4% | 0% |
| $R_{00}$ (μm) | 4 | 6 | 7 |
| $R_0$ (μm) | 9 | 12 | 20 |
| $R_1$ (μm) | 15 | 22 | 30 |
| $R_2$ (μm) | 20 | 22 | 30 |
| $R_3$ (μm) | 30 | 50 | 30 |
| $R_4$ (μm) | 125 | 125 | 125 |
| Taper ratio | 0.5 | 0.4 | 0.5 |
| $r_{00}$ (μm) | 2.0 | 2.4 | 3.5 |
| $r_0$ (μm) | 4.5 | 4.8 | 10.0 |
| $r_1$ (μm) | 7.5 | 8.8 | 15.0 |
| $r_2$ (μm) | 10.0 | 8.8 | 15.0 |
| $r_3$ (μm) | 15.0 | 20.0 | 15.0 |
| $r_4$ (μm) | 62.5 | 50.0 | 62.5 |

As shown in Table 3, the relative refractive index $\Delta_{CC}$ % for the first central core region 315 ranged from 0.1% to 0.34%; the relative refractive index $\Delta_{LIC}$ % for the first low-index core region 314 ranged from 0% to −0.2%; the relative refractive index $\Delta_{AC}$ % for the first annular core region 313 ranged from 0.5% to 1%; and the relative refractive index $\Delta_{LIT}$ % for the first low-index trench 324 ranged from 0% to −0.5%. The radius $R_{00}$ ranged from 4 μm to 7 μm; the radius $R_0$ ranged from 9 μm to 20 μm; the radius $R_1$ ranged from 15 μm to 30 μm; the radius $R_2$ ranged from 20 μm to 30 μm; the radius $R_3$ ranged from 30 μm to 50 μm; and the radius $R_4$ was 125 μm for Examples 9-11. The radial thickness $T_{LIC}$ of the first low-index core region 314 ranged from 5 μm to 13 μm; radial thickness $T_{AC}$ of the first annular core region 313 ranged from 6 μm to 10 μm; the radial thickness $T_{ICL}$ of the first inner cladding portion 325 ranged from 0.0 μm to 5 μm; the radial thickness $T_{LIC}$ of the first low-index trench 324 ranged from 0.0 μm to 28 μm; and the radial thickness $T_{OCL}$ of the first outer cladding portion 323 ranged from 75 Ξm to 95 μm.

The taper ratio between the first segment 310 and the second segment 330 ranged from 0.4 to 0.5. The relative refractive index $\Delta_{cc}$ % for the second central core region 335, the relative refractive index $\Delta_{lic}$ % for the second low-index core region 334, the relative refractive index $\Delta_{ac}$ % for the second annular core region 333, and the relative refractive index $\Delta_{lit}$ % for the second low-index trench 344 were substantially equal to the relative refractive index $\Delta_{CC}$ % for the first central core region 315, the relative refractive index $\Delta_{LIC}$ % for the first low-index core region 314, the relative refractive index $\Delta_{AC}$ % for the first annular core region 313, and the relative refractive index $\Delta_{LIT}$ % for the first low-index trench 324, respectively. The radius $r_{00}$ ranged from 2 μm to 3.5 μm; the radius $r_0$ ranged from 4.5 μm to 10 μm; the radius $r_1$ ranged from 7.5 μm to 15 μm; the radius $r_2$ ranged from 8.8 μm to 15 μm; the radius $r_3$ ranged from 15 μm to 20 μm; and the radius $r_4$ ranged from 50 μm to 62.5 μm. The radial thickness $t_{lic}$ of the second low-index core region 334 ranged from 2.4 μm to 6.5 μm; the radial thickness $t_{ac}$ of the second annular core region 333 ranged from 3 µm to 5 µm; the radial thickness $t_{icl}$ of the second inner cladding portion 345 ranged from 0.0 µm to 2.5 µm; the radial thickness $t_{lic}$ of the second low-index trench 344 ranged from 0.0 µm to 11.2 µm; and the radial thickness $t_{ocl}$ of the second outer cladding portion 343 ranged from 30 µm to 47.5 µm.

Based on the foregoing, it should now be understood that the optical fibers described herein convert a Gaussian laser beam into a Bessel laser beam. It should also be understood that the optical fibers have relatively low bend losses. The optical fibers are particularly suitable for applications requiring a large depth of focus such as laser inspection techniques, laser processing techniques, and the like.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. An optical fiber comprising:
a first segment comprising:
a first core portion having a radius $R_1$ from an axial centerline of the optical fiber, the first core portion comprising a first annular core region centered on the axial centerline of the optical fiber and having an inner radius $R_0$ and a first radial thickness $T_{AC}=R_1-R_0$, wherein the first core portion further comprises a first low-index core region having a relative refractive index $\Delta_{LIC}\%$ relative to the first cladding portion, wherein the first low-index core region is disposed within the first annular core region and $\Delta_{AC}\%$ is greater than $\Delta_{LIC}\%$; and
a first cladding portion extending around the first core portion, the first cladding portion having a radial thickness $T_{CL}$, the first annular core region having a relative refractive index $\Delta_{AC}\%$ relative to the first cladding portion; a second segment comprising:
a second core portion having a radius $r_1$ from the axial centerline of the optical fiber, wherein at least a portion of the second core portion is optically coupled to the first annular core region and the radius $R_1$ is greater than the radius $r_1$; and
a second cladding portion extending around the second core portion, the second cladding portion having a radial thickness $t_{cl}$ that is less than the radial thickness $T_{CL}$ of the first cladding portion, the second core portion having a relative refractive index $\Delta_c\%$ relative to the second cladding portion, wherein $\Delta_{AC}\%$ is substantially equal to $\Delta_c\%$,
wherein the second core portion of the second segment comprises:
a second annular core region centered on the axial centerline of the optical fiber and having an inner radius $r_0$ and a radial thickness $t_{ac}=r_1-r_0$, the second annular core region having a relative refractive index $\Delta_{ac}\%$ relative to the second cladding portion, wherein $\Delta_{ac}\%$ is equal to $\Delta_c\%$; and
a second low-index core region having a relative refractive index $\Delta_{lic}\%$ relative to the second cladding portion, wherein the second low-index core region is disposed within the second annular core region and $\Delta_{ac}\%$ is greater than $\Delta_{lic}\%$ and $\Delta_{AC}\%$ is substantially equal to $\Delta_{ac}\%$.

2. The optical fiber of claim 1, wherein the first segment is optically coupled to the second segment with a transition region.

3. The optical fiber of claim 2, wherein the first segment has a first outer diameter $D_0$, the second segment has a second outer diameter $d_0$ and the first outer diameter $D_0$ is generally equal to the second outer diameter $d_0$.

4. The optical fiber of claim 2, wherein the first segment has a first outer diameter $D_0$, the second segment has a second outer diameter $d_0$ and the first outer diameter $D_0$ is greater than the second outer diameter $d_0$.

5. The optical fiber of claim 1, wherein the first annular core region is disposed around a channel extending through at least a portion of the first segment.

6. The optical fiber of claim 1, wherein $\Delta_{AC}\%$ is from about 0.2% to about 1.0%.

7. The optical fiber of claim 1, wherein:
the first cladding portion comprises a first outer cladding region and a first low-index trench disposed between the first core portion and the first outer cladding region; and
the second cladding portion comprises a second outer cladding region and a second low-index trench disposed between the second core portion and the second outer cladding region.

8. The optical fiber of claim 7, wherein:
the first low-index trench is spaced apart from the first core portion by a first inner cladding portion; and
the second low-index trench is spaced apart from the second core portion by a second inner cladding portion.

9. The optical fiber of claim 8, wherein:
a radial thickness of the first inner cladding portion is greater than or equal to 1 µm and less than or equal to 15 µm; and
a radial thickness of the second inner cladding portion is greater than or equal to 1 µm and less than or equal to 20 µm.

10. The optical fiber of claim 7, wherein:
the first low-index trench has a trench volume $V_{LIT}$ greater than or equal to about 80%-µm² and less than or equal to about 200%-µm²; and
the second low-index trench has a trench volume $v_{lit}$ greater than or equal to about 40%-µm² and less than or equal to about 110%-µm².

11. The optical fiber of claim 1, wherein at least the second annular core region is optically coupled to the first annular core region.

12. The optical fiber of claim 1, wherein:
the first core portion further comprises a first central core region having a relative refractive index $\Delta_{CC}\%$ relative to the first cladding portion, wherein the first central core region is disposed within the first annular core region and is spaced apart from the first annular core region by the first low-index core region and $\Delta_{LIC}\%$ is less than $\Delta_{CC}\%$; and
the second core portion further comprises a second central core region having a relative refractive index $\Delta_{cc}\%$ relative to the second cladding portion, wherein the second central core region is disposed within the second annular core region and is spaced apart from the second annular core region by the second low-index core region and $\Delta_{lic}\%$ is less than $\Delta_{cc}\%$.

13. The optical fiber of claim 12, wherein the relative refractive index of the first annular core region $\Delta_{AC}\%$ is greater than or substantially equal to the relative refractive index of the first central core region $\Delta_{CC}\%$ and the relative refractive index of the second annular core region $\Delta_{ac}\%$ is greater than or substantially equal to the relative refractive index of the second central core region $\Delta_{cc}$%.

14. An optical fiber comprising:
a first segment comprising:
  a first core portion comprising a first central core region, a first annular core region, and a first low-index core region, wherein the first central core region is disposed within the first annular core region and is spaced apart from the first annular core region by the first low-index core region; and
  a first cladding portion extending around the first core portion, the first central core region having a relative refractive index $\Delta_{CC}$% relative to the first cladding portion, the first annular core region having a relative refractive index $\Delta_{AC}$% relative to the first cladding portion, and the first low-index core region having a relative refractive index $\Delta_{LIC}$% relative to the first cladding portion, wherein $\Delta_{LIC}$% is less than $\Delta_{CC}$% and $\Delta_{AC}$%;
a second segment comprising:
  a second core portion comprising a second central core region, a second annular core region, and a second low-index core region, wherein the second central core region is disposed within the second annular core region and is spaced apart from the second annular core region by the second low-index core region, wherein at least the second central core region is optically coupled to the first annular core region; and
  a second cladding portion extending around the second core portion, the second central core region having a relative refractive index $\Delta_{cc}$% relative to the second cladding portion, the second annular core region having a relative refractive index $\Delta_{ac}$% relative to the second cladding portion, and the second low-index core region having a relative refractive index $\Delta_{lic}$% relative to the first cladding portion, wherein $\Delta_{lic}$% is less than $\Delta_{cc}$% and $\Delta_{ac}$%.

15. The optical fiber of claim 14, wherein the first segment is optically coupled to the second segment with a transition region, the first segment having a first outer diameter $D_0$, the second segment having a second outer diameter $d_0$, wherein the first outer diameter $D_0$ is greater than the second outer diameter $d_0$.

16. An optical system comprising:
a laser light source emitting an output beam having a Gaussian profile; and
an optical fiber coupled to the output beam of the laser light source, the optical fiber comprising:
  a first segment having a first outer diameter $D_0$, wherein the first segment further comprises:
    a first cladding portion extending around the first core portion, wherein the first core portion comprises a first low-index core region disposed within the first annular core region, wherein the first annular core region has a relative refractive index $\Delta_{AC}$% relative to the first cladding portion, and the first low-index core region has a relative refractive index $\Delta_{AC}$% relative to the first cladding portion, wherein $\Delta_{LIC}$% is less than $\Delta_{AC}$%;
  a second segment having a second outer diameter do, wherein the first outer diameter $D_0$ is greater than the second outer diameter $d_0$ and a ratio of the second outer diameter $d_0$ to the first outer diameter $D_0$ is greater than or equal to 0.2 and less than or equal to 0.9, wherein the second segment comprises a second cladding portion extending around the second core portion, the second core portion comprising a second annular core region and a second low-index core region disposed within the second annular core region, wherein the second annular core region has a relative refractive index $\Delta_{ac}$% relative to the second cladding portion, and the second low-index core region has a relative refractive index $\Delta_{lic}$% relative to the second cladding portion, wherein $\Delta_{lic}$% is less than $\Delta_{ac}$%, wherein $\Delta_{AC}$% is substantially the same as $\Delta_{ac}$%; and
  a transition region integrally formed with and optically coupling the first segment and the second segment, wherein the first segment comprises a first core portion having a first annular core region optically coupled to a second core portion of the second segment, the optical fiber converting the output beam of the laser light source from the Gaussian profile to a Bessel profile.

17. The optical system of claim 16, the first cladding portion further comprising:
a first outer cladding region, a first low-index trench disposed within the first outer cladding region and spaced apart from the first core portion by a first inner cladding portion, the first low-index trench having a relative refractive index $\Delta_{LIT}$% relative to the first outer cladding region and the first inner cladding portion having a relative refractive index $\Delta_{ICL}$% relative to the first outer cladding region, wherein $\Delta_{AC}$% is greater than $\Delta_{ICL}$% and $\Delta_{ICL}$% is greater than $\Delta_{LIT}$%;
the second cladding portion further comprising:
a second outer cladding region, a second low-index trench disposed within the second outer cladding region and spaced apart from the second core portion by a second inner cladding portion, the second low-index trench having a relative refractive index $\Delta_{lit}$% relative to the second outer cladding region and the second inner cladding portion having a relative refractive index $\Delta_{icl}$% relative to the second outer cladding region, wherein $\Delta_{ac}$% is greater than $\Delta_{icl}$% and $\Delta_{icl}$% is greater than $\Delta_{lit}$%.

18. The optical system of claim 16, the first segment further comprising
a first cladding portion extending around the first core portion;
the first core portion comprising a first central core region disposed within the first annular core region, the first annular core region spaced apart from the first central core region by a first low-index core region, wherein the first central core region has a relative refractive index $\Delta_{CC}$% relative to the first cladding portion, the first annular core region has a relative refractive index $\Delta_{AC}$% relative to the first cladding portion, and the first low-index core region has a relative refractive index $\Delta_{LIC}$% relative to the first cladding portion, wherein $\Delta_{AC}$% is greater than or substantially equal to the $\Delta_{CC}$% and $\Delta_{CC}$% is greater than $\Delta_{LIT}$%;
the second segment further comprising:
a second cladding portion extending around the second core portion, the second core portion comprising a second central core region disposed within a second annular core region, the second annular core region spaced apart from the second central core region by a second low-index core region, wherein the second central core region has a relative refractive index $\Delta_{cc}$% relative to the second cladding portion, the second annular core region has a relative refractive index $\Delta_{ac}$% relative to the second cladding portion, and the second low-index core region has a relative refractive index $\Delta_{lic}\%$ relative to the second cladding portion, wherein $\Delta_{ac}\%$ is greater than or substantially equal to $\Delta_{cc}\%$ and $\Delta_{cc}\%$ is greater than $\Delta_{lic}\%$.

* * * * *

UNITED STATES PATENT AND TRADEMARK OFFICE
CERTIFICATE OF CORRECTION

PATENT NO. : 10,345,604 B2
APPLICATION NO. : 15/874363
DATED : July 9, 2019
INVENTOR(S) : Ming-Jun Li et al.

It is certified that error appears in the above-identified patent and that said Letters Patent is hereby corrected as shown below:

On the Title Page

In Column 2, item (56), other publications, Line 1, delete ""All-Fier" and insert -- "All-Fiber --, therefor.

In the Claims

In Column 54, Line 6, Claim 3, delete "do" and insert -- $d_0$ --, therefor.

In Column 54, Line 10, Claim 4, delete "do" and insert -- $d_0$ --, therefor.

In Column 54, Line 16, Claim 6, delete "1. 0%." and insert -- 1.0%. --, therefor.

In Column 55, Line 59, Claim 16, delete "$\Delta_{AC}\%$" and insert -- $\Delta_{LIC}\%$ --, therefor.

In Column 55, Line 61, Claim 16, delete "do," and insert -- $d_0$, --, therefor.

Signed and Sealed this
Eighteenth Day of February, 2020

Andrei Iancu
*Director of the United States Patent and Trademark Office*